US011496478B2

(12) United States Patent
Tokuchi

(10) Patent No.: US 11,496,478 B2
(45) Date of Patent: *Nov. 8, 2022

(54) INFORMATION PROCESSING DEVICE AND NON-TRANSITORY COMPUTER READABLE MEDIUM

(71) Applicant: FUJIFILM Business Innovation Corp., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 427 days.

This patent is subject to a terminal disclaimer.

(21) Appl. No.: 15/997,702

(22) Filed: Jun. 5, 2018

(65) Prior Publication Data
US 2019/0036936 A1    Jan. 31, 2019

(30) Foreign Application Priority Data

Jul. 28, 2017  (JP) .............................. JP2017-146924

(51) Int. Cl.
*H04L 9/40*      (2022.01)
*H04W 12/06*     (2021.01)
(Continued)

(52) U.S. Cl.
CPC ............ *H04L 63/102* (2013.01); *H04L 63/08* (2013.01); *H04N 1/00514* (2013.01);
(Continued)

(58) Field of Classification Search
CPC ........ H04L 63/08; H04L 63/102; H04W 4/08; H04W 4/80; H04W 12/06; H04N 1/4406;
(Continued)

(56) References Cited

U.S. PATENT DOCUMENTS

2007/0216943 A1*  9/2007  Funamizu ............... H04L 29/08
                                                    358/1.15
2012/0140284 A1   6/2012  Tashiro et al.
(Continued)

FOREIGN PATENT DOCUMENTS

CN          106257396         12/2016
CN          106462464          2/2017
(Continued)

OTHER PUBLICATIONS

"Office Action of Japan Counterpart Application", dated Jul. 13, 2021, with English translation thereof, p. 1-p. 6.
(Continued)

*Primary Examiner* — Linglan Edwards
(74) *Attorney, Agent, or Firm* — JCIPRNET

(57) ABSTRACT

An information processing device includes a controller that, when a first device is identified by an identification operation by a first user and a second device is identified by an identification operation by a second user, controls display of a linkage function executable using the first device and the second device. In a further modification of the invention, when the first user and the second user belong to a linkable group and the first device and the second device are identified, the controller may control the display of the linkage function.

21 Claims, 21 Drawing Sheets

(51) Int. Cl.
  *H04W 4/08* (2009.01)
  *H04W 4/80* (2018.01)
  *H04N 1/44* (2006.01)
  *H04N 1/00* (2006.01)

(52) U.S. Cl.
  CPC .......... *H04N 1/4433* (2013.01); *H04W 4/08* (2013.01); *H04W 12/06* (2013.01); *H04W 4/80* (2018.02)

(58) Field of Classification Search
  CPC . H04N 1/4426; H04N 1/4433; H04N 1/00514
  See application file for complete search history.

(56) References Cited

U.S. PATENT DOCUMENTS

| | | | |
|---|---|---|---|
| 2013/0057900 A1 | 3/2013 | Ohta | |
| 2014/0040259 A1* | 2/2014 | Takematsu | G06F 16/284 707/736 |
| 2014/0063542 A1 | 3/2014 | Aoki | |
| 2014/0237519 A1* | 8/2014 | Masuda | H04N 21/433 725/80 |
| 2016/0373522 A1 | 12/2016 | Carlos et al. | |
| 2017/0070933 A1* | 3/2017 | Hagiwara | H04W 4/80 |
| 2017/0208217 A1 | 7/2017 | Soriano et al. | |
| 2017/0322759 A1 | 11/2017 | Tokuchi | |
| 2018/0295550 A1 | 10/2018 | Hagiwara et al. | |
| 2019/0075500 A1 | 3/2019 | Hagiwara et al. | |
| 2020/0022051 A1 | 1/2020 | Hagiwara et al. | |
| 2020/0305047 A1 | 9/2020 | Hagiwara et al. | |
| 2021/0058842 A1 | 2/2021 | Hagiwara et al. | |

FOREIGN PATENT DOCUMENTS

| | | |
|---|---|---|
| JP | 2014048672 | 3/2014 |
| JP | 2014166225 | 9/2014 |
| JP | 5737906 | 6/2015 |
| JP | 2015177504 | 10/2015 |
| JP | 2015223006 | 12/2015 |
| JP | 6052459 | 12/2016 |
| JP | 6090511 | 3/2017 |

OTHER PUBLICATIONS

"Office Action of China Counterpart Application", dated Apr. 14, 2021, with English translation thereof, pp. 1-20.
"Office Action of Japan Counterpart Application", dated Mar. 30, 2021, with English translation thereof, pp. 1-3.

* cited by examiner

<DEVICE FUNCTION MANAGEMENT TABLE>

| DEVICE ID | DEVICE NAME (TYPE) | FUNCTION | IMAGE ID |
|---|---|---|---|
| A | PC | DISPLAY FUNCTION, SAVING FUNCTION, ⋯ | ⋯ |
| B | MULTIFUNC-TION DEVICE | PRINT FUNCTION, SCAN FUNCTION, COPY FUNCTION, FACSIMILE FUNCTION, POST-PROCESSING FUNCTION, ⋯ | ⋯ |
| C | PROJECTOR | PROJECTION FUNCTION ⋯ | ⋯ |
| ⋯ | ⋯ | ⋯ | ⋯ |

FIG.7

<LINKAGE FUNCTION MANAGEMENT TABLE>

| COMBINA-TION OF DEVICE IDS | DEVICE NAME (TYPE) | LINKAGE FUNCTION |
|---|---|---|
| A, B | PC(A), MULTIFUNCTION DEVICE(B) | SCAN TRANSFER FUNCTION |
| | | PRINT FUNCTION |
| A, C | PC(A), PROJECTOR(C) | PROJECTION FUNCTION |
| | | PRINT FUNCTION |
| B, C | MULTIFUNCTION DEVICE(B), PROJECTOR(C) | PROJECTION FUNCTION |
| | | PRINT FUNCTION |
| ... | ... | ... |

<LINKAGE FUNCTION MANAGEMENT TABLE>

| COMBINATION OF DEVICE IDS | DEVICE NAME (TYPE) | LINKAGE FUNCTION | CONNECT-ION ORDER | PRIO-RITY |
|---|---|---|---|---|
| A, B | PC(A)、 MULTIFUNCTION DEVICE(B) | SCAN TRANSFER FUNCTION | B→A | 1 |
| | | | A→B | 2 |
| | | PRINT FUNCTION | A→B | 1 |
| | | | B→A | 2 |
| A, C | PC(A)、 PROJECTOR(C) | PROJECTION FUNCTION | A→C | 1 |
| | | | C→A | 2 |
| | | ... | C→A | 1 |
| | | | A→C | 2 |
| ... | ... | ... | ... | ... |

<DEVICE FUNCTION MANAGEMENT TABLE>

| DEVICE ID | DEVICE NAME (TYPE) | POSITION IN IMAGE | FUNCTION | IMAGE ID |
|---|---|---|---|---|
| A | PC | ... | SCREEN DISPLAY FUNCTION | ... |
| | | ... | DATA SAVING FUNCTION | |
| | | ... | ... | |
| B | MULTI-FUNCTION DEVICE | ... | PRINT FUNCTION | ... |
| | | ... | SCAN FUNCTION | |
| | | ... | STAPLING FUNCTION | |
| | | ... | ... | |
| ... | ... | ... | ... | ... |

FIG.23

<DEVICE FUNCTION MANAGEMENT TABLE>

| DEVICE ID | DEVICE NAME (TYPE) | PORTION | PORTION ID | FUNCTION | PORTION IMAGE ID |
|---|---|---|---|---|---|
| A | PC | DISPLAY UNIT | Aa | SCREEN DISPLAY FUNCTION | ... |
| | | MAIN BODY | Ab | DATA SAVING FUNCTION | ... |
| | | ... | ... | ... | ... |
| B | MULTI-FUNCTION DEVICE | MAIN BODY | Ba | PRINT FUNCTION | ... |
| | | READING UNIT | Bb | SCAN FUNCTION | ... |
| | | POST-PROCESSING DEVICE | Bc | STAPLING FUNCTION | ... |
| | | ... | ... | ... | ... |
| C | PROJECTOR | MAIN BODY | Ca | PROJECTION FUNCTION | ... |
| | | ... | ... | ... | ... |
| ... | ... | ... | ... | ... | ... |

FIG.24

<LINKAGE FUNCTION MANAGEMENT TABLE>

| COMBINATION OF PORTIONS OF DEVICES | COMBINATION OF PORTION IDS | LINKAGE FUNCTION |
|---|---|---|
| DISPLAY UNIT OF PC (A), MAIN BODY OF MULTI-FUNCTION DEVICE (B) | Aa、Ba | PRINT FUNCTION |
| | ... | ... |
| MAIN BODY OF MULTI-FUNCTION DEVICE (B), MAIN BODY OF PROJECTOR (C) | Ba、Ca | PRINT FUNCTION |
| | ... | ... |
| READING UNIT OF MULTIFUNCTION DEVICE (B), MAIN BODY OF PROJECTOR (C) | Bb、Ca | SCAN PROJECTION FUNCTION |
| | ... | ... |

FIG.25

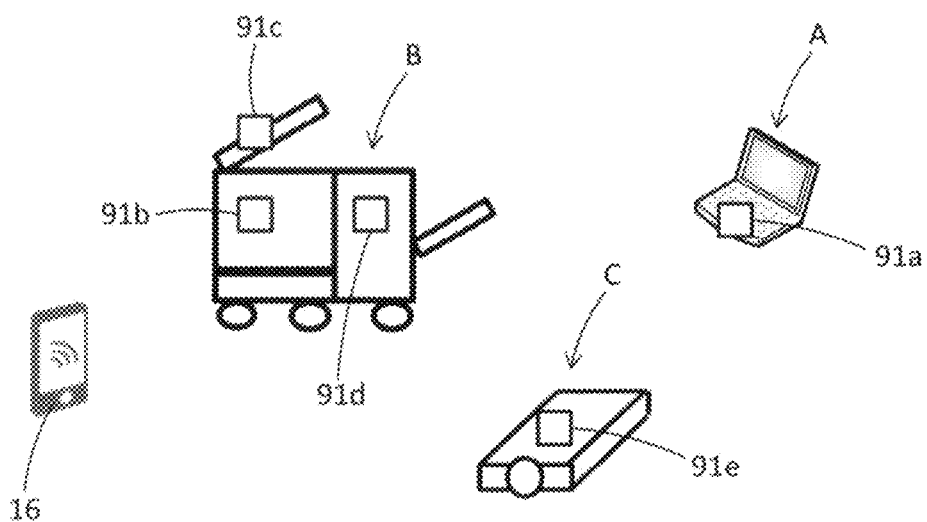

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-146924 filed Jul. 28, 2017.

BACKGROUND

Technical Field

The present invention relates to an information processing device and a non-transitory computer readable medium.

SUMMARY

According to an aspect of the invention, an information processing device includes a controller that, when a first device is identified by an identification operation by a first user and a second device is identified by an identification operation by a second user, controls display of a linkage function executable using the first device and the second device.

BRIEF DESCRIPTION OF THE DRAWINGS

Exemplary embodiments of the present invention will be described in detail based on the following figures, wherein:

FIG. 7 is a diagram illustrating an example of a linkage function management table;

FIG. 23 is a diagram illustrating an example of a device function management table;

FIG. 24 is a diagram illustrating an example of a linkage function management table;

FIG. 25 is a diagram illustrating devices;

DETAILED DESCRIPTION

First Exemplary Embodiment

Figure 1:
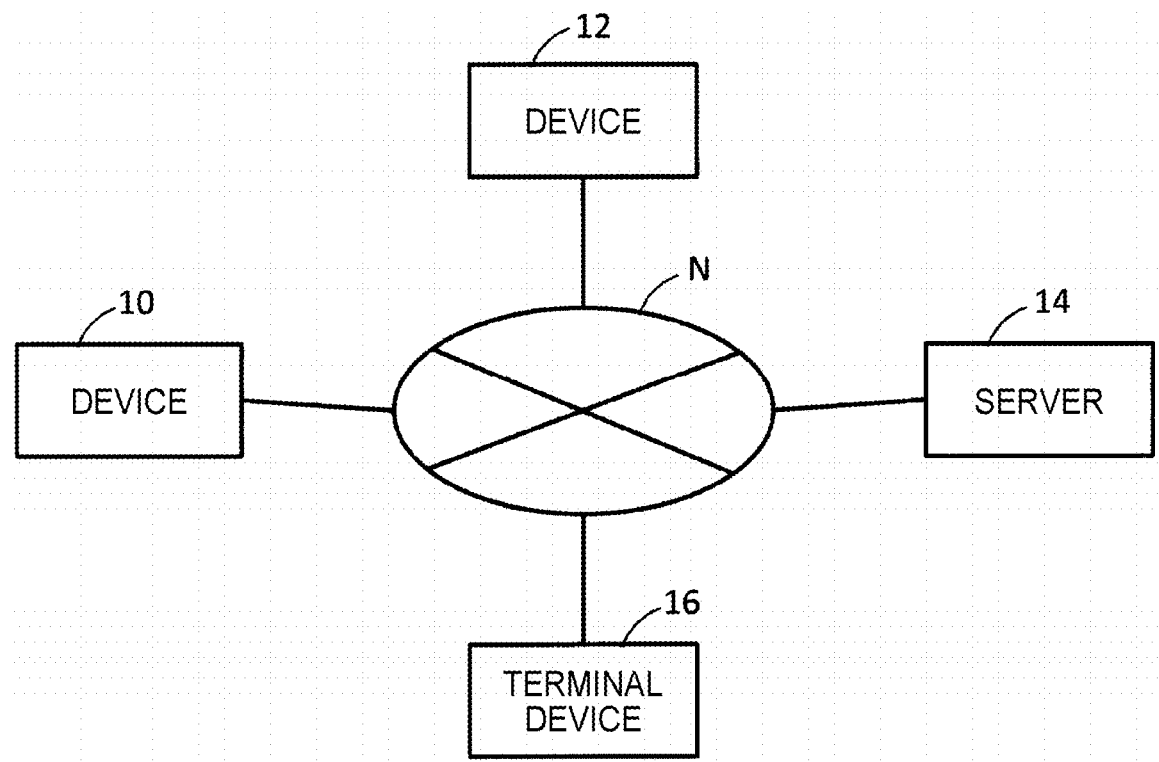
FIG. 1 is a block diagram illustrating a device system according to a first exemplary embodiment of the present invention.

A device system as an information processing system according to an exemplary embodiment of the present invention will be described with reference to FIG. 1. FIG. 1 illustrates an example of the device system according to the present exemplary embodiment.

The device system according to the present exemplary embodiment includes plural devices (for example, devices 10 and 12), a server 14 as an example of an external device, and a terminal device 16 as an example of an information processing device. In the example illustrated in FIG. 1, the devices 10, 12, the server 14, and the terminal device 16 have a function of communicating with each other via a communication path N such as a network. Of course, the devices 10, 12, the server 14, and the terminal device 16 may communicate with other devices via different communication paths without using the communication path N. In the example illustrated in FIG. 1, two devices (devices 10 and 12) are included in the device system, but three or more devices may be included in the device system. Further, plural servers 14 and plural terminal devices 16 may be included in the device system.

The devices 10 and 12 are devices having a specific function, and examples thereof include an image forming device having an image forming function, a personal computer (PC), a projector, a display device such as a liquid crystal display and a projector, a telephone, a clock, a surveillance camera, and the like. In addition, the devices 10 and 12 have a function of transmitting and receiving data to and from other devices. In the present exemplary embodiment, it is assumed that the device 10 is an image forming device as an example. The image forming device (device 10) is, for example, a device having at least one function among a scan function, a print function, a copy function, and a facsimile function.

The server 14 is a device that manages the functions that each device has. For example, the server 14 manages functions that each device has, linkage functions for using plural functions, and the like. In addition, the server 14 has a function of transmitting and receiving data to and from other devices.

For each user, the server 14 may manage functions usable by the user. Functions usable by a user include, for example, a function provided to the user for free, a function provided to the user for a charge and purchased by the user, and the like. For each user, the server 14 may manage usable function information (for example, function purchase history information) indicating functions usable by the user. Of course, there are also functions that are usable for free, additional update functions, and functions that are specifically managed by an administrator. Therefore, the server 14 does not have to equally manage the functions depending on whether the functions are purchased. The purchase process of the functions is performed, for example, by the server 14. Of course, the purchase process may be performed by another device.

The terminal device 16 is a device such as a personal computer (PC), a tablet PC, a smartphone, a mobile phone, or the like, and has a function of transmitting and receiving data to and from other devices. For example, the terminal device 16 functions as a user interface unit (UI unit) when using the device.

Hereinafter, each device included in the device system according to the present exemplary embodiment will be described in detail.

Figure 2:
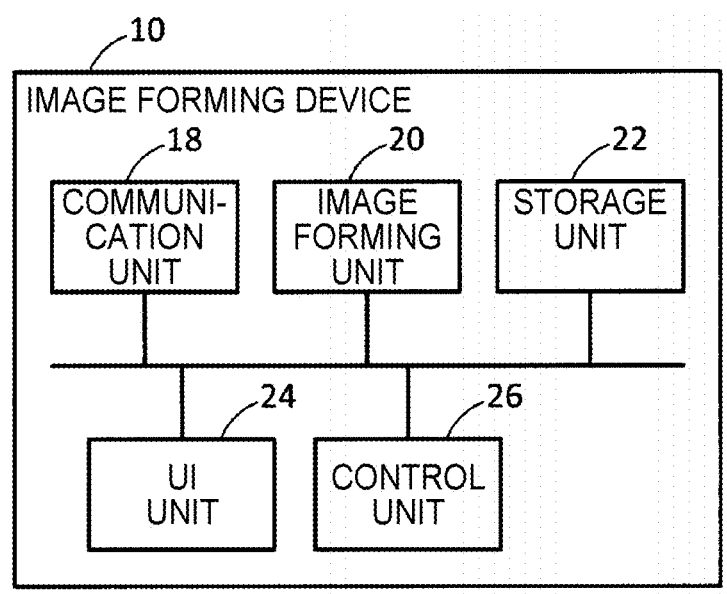
FIG. 2 is a block diagram illustrating an image forming device according to the first exemplary embodiment.

The configuration of the device 10 serving as an image forming device will be described in detail with reference to FIG. 2. Hereinafter, the device 10 may be referred to as the image forming device 10. FIG. 2 illustrates the configuration of the image forming device 10.

A communication unit 18 is a communication interface and has a function of transmitting data to another device and a function of receiving data from another device. The communication unit 18 may be a communication interface having a wireless communication function or a communication interface having a wired communication function. For example, the communication unit 18 is compatible with one or plural types of communication methods and may communicate with a communication partner according to a communication method suitable for the communication partner (that is, a communication method that the communication partner is compatible with). The communication method is, for example, infrared communication, visible light communication, Wi-Fi (registered trademark) communication, near-field wireless communication (for example, near field communication (NFC), etc.), and the like. Examples of the near-field wireless communication include Felica (registered trademark), Bluetooth (registered trademark), RFID (Radio Frequency Identifier), and the like. Of course, other types of wireless communication may be used for the near-field wireless communication. For example, the communication unit 18 may switch the communication method or the frequency band depending on the communication partner, or switch the communication method or the frequency band depending on the surrounding environment.

An image forming unit 20 has an image forming function. Specifically, the image forming unit 20 has at least one function among a scan function, a print function, a copy function, or a facsimile function. As the scan function is executed, a document is read so that scan data (image data) is generated. As the print function is executed, the image is printed on a recording medium such as paper. As the copying function is executed, the document is read and printed on the recording medium. As the facsimile function is executed, the image data is transmitted or received by facsimile. In addition, a linkage function using plural functions may be executed. For example, a scan transfer function that is a combination of a scan function and a transmission function (transfer function) may be executed. When the scan transfer function is executed, a document is read to generate scan data (image data), and the scan data is transmitted to a transmission destination (for example, an external device such as the terminal device 16). Of course, this linkage function is merely an example, and another linkage function may be executed.

A storage unit 22 is a storage device such as a hard disk or memory (for example, SSD etc.). The storage unit 22 stores, for example, information indicating an instruction of image formation (for example, job information), image data to be printed, scan data generated by executing the scan function, and device address information indicating addresses of other devices, server address information indicating an address of the server 14, various control data, various programs, and the like. Of course, these may be stored in separate storage devices or may be stored in one storage device.

A UI unit 24 is a user interface unit and includes a display unit and an operation unit. The display unit is, for example, a display device such as a liquid crystal display. The operation unit is an input device such as a touch panel or a keyboard. Of course, it may be a user interface that serves as a display unit and an operation unit (for example, a touch-type display, a device for electronically displaying a keyboard or the like on a display, etc.). The image forming device 10 may not be provided with the UI unit 24, or may have a hardware user interface unit (hardware UI unit) as hardware instead of having the display unit. The hardware UI unit is, for example, a hardware key (for example, a numeric keypad) specialized for numeric input, a hardware key (for example, direction instruction key) specialized for direction instruction, and the like.

A control unit 26 controls the operation of each unit of the image forming device 10.

Figure 3:
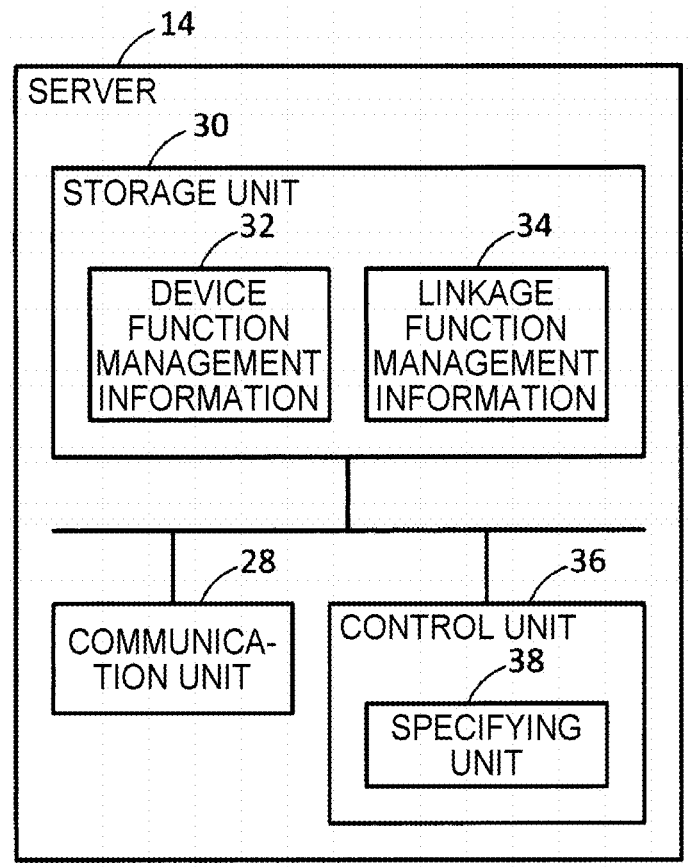
FIG. 3 is a block diagram illustrating a server according to the first exemplary embodiment.

Hereinafter, the configuration of the server 14 will be described in detail with reference to FIG. 3. FIG. 3 illustrates the configuration of the server 14.

A communication unit 28 is a communication interface and has a function of transmitting data to another device and a function of receiving data from another device. The communication unit 28 may be a communication interface having a wireless communication function or a communication interface having a wired communication function.

A storage unit 30 is a storage device such as a hard disk or memory (for example, SSD etc.). The storage unit 30 stores, for example, a device function management information 32, a linkage function management information 34, various data, various programs, device address information indicating the address of each device, server address information indicating the address of the server 14, and the like. Of course, these may be stored in separate storage devices or may be stored in one storage device. The device function management information 32 and the linkage function management information 34 stored in the storage unit 30 may be provided to the terminal device 16 regularly or at a designated timing, and therefore, the information stored in the terminal device 16 may be updated. Hereinafter, the device function management information 32 and the linkage function management information 34 will be described.

The device function management information 32 is information for managing the functions that respective devices have, and includes, for example, information indicating association between device identification information for identifying a device (device identification information) and function information indicating the function that the device has. The device identification information includes, for example, a device ID, a device name, information indicating the type of the device, the model number of the device, information for managing the device (for example, asset management number, etc.), information indicating the location where the device is installed (position information of the device), an external appearance image showing the external appearance of the device, address information of the device, and the like. The external appearance image may be an image representing the casing of the device, an image representing a state where the casing is opened such that the inside thereof is seen from the outside, or an image representing a state where the device is covered with a packaging sheet or the like. The external appearance image may be an image obtained by capturing the external appearance of the device, or an image imitating the external appearance of the device (for example, an icon). The function information includes, for example, a function ID, a function name, or the like. For example, when the image forming device 10 has a scan function, a print function, a copy function, and a scan transfer function, the device identification information of the image forming device 10 is associated with function information indicating the scan function, function information indicating the print function, function information indicating the copy function, and function information indicating the scan transfer function. The functions that each device has are specified (identified) by referring to the device function management information 32.

The device managed by the device function management information 32 is, for example, a device (for example, the device 10 or 12) included in the device system. Of course, devices not included in the device system may be managed by the device function management information 32. For example, the server 14 may acquire information on a new device not included in the device system (information including device identification information and function information) and newly register the information in the device function management information 32. The information on the device may be acquired, for example, using the Internet or the like, or may be input by an administrator or the like. Further, the server 14 may update the device function management information 32 at any timing, regularly, or at a timing designated by an administrator or the like. Thus, function information indicating a function that the device does not have before updating but the device has after updating may be registered in the device function management information 32. Similarly, function information indicating a function that the device has before updating but the device does not have after updating may be deleted from or registered as unusable information in the device function management information 32. The information for updating may be acquired, for example, using the Internet or the like, or may be input by an administrator or the like.

The linkage function management information 34 is information for managing a linkage function executed by linking plural functions to each other. One or plural linkage functions are executed by linking plural functions to each other. For example, the linkage function may be executed by linking plural functions that a single device (for example, the device 10 or 12) has to each other, or by linking plural functions that plural devices (for example, the device 10 or 12) have to each other. Further, the terminal device (the terminal device 16 in the present exemplary embodiment) issuing the operation instruction may also be included in the device to be identified, and the function that the terminal device has may be used as a part of the linkage function.

The linkage function may be a function executed without using a device as hardware. For example, the linkage function may be a function executed by linking plural pieces of software to each other. Of course, the linkage function may be a function executed by linking a function that the device has as hardware and a function implemented by software to each other.

The linkage function management information 34 is information indicating, for example, association between a combination of function information indicating respective functions used in the linkage function and linkage function information indicating the linkage functions. The linkage function information includes, for example, a linkage function ID, a linkage function name, or the like. When a single function is updated, the linkage function management information 34 is also updated along with the update. As a result, the linkage function by plural functions that have been unable to be linked to each other before updating may be made usable after updating, and on the contrary to this, the linkage function that has been usable before updating may be made unusable after updating. The linkage function information indicating the linkage function that is made usable after updating is registered in the linkage function management information 34, and the linkage function information indicating the linkage function that is made unusable after updating is deleted from or registered as unusable information in the linkage function management information 34.

In the case of linking plural devices to each other, the linkage function management information 34 is information for managing a linkage function that uses plural functions that plural devices have, and is information indicating association between the combination of the device identification information for identifying each device used for the linkage function and the linkage function information. As described above, when the device function management information 32 is updated, the linkage function management information 34 is also updated along with the update. As a result, the linkage function by plural devices that are unable to be linked to each other before updating may be made usable after updating. On the contrary, the linkage function that has been usable before updating may be made unusable after updating.

The linkage function may a function that is executed by linking plural functions, which are different from each other, to each other, or a function that is executed by linking the same functions to each other. The linkage function may be a function that has been unusable before the linkage. The function that has been unusable before the linkage may be a function that is usable using the same function among the functions that a device to be linked has or a function that is usable by combining different functions. For example, when a device having a print function (printer) and a device having a scan function (scanner) are linked to each other, a copy function is implemented as a linkage function. That is, the copy function is implemented by linking the print function and the scan function to each other. In this case, the copy function as a linkage function and a combination of the print function and the scan function are associated with each other. In the linkage function management information 34, for example, linkage function information indicating the copy function as a linkage function is associated with a combination of device identification information for identifying a device having a print function and device identification information for identifying a device having a scan function.

The concept of the linkage function may include a coalescing function that enables a new function to be executed by linking plural functions or plural devices to each other. For example, an extended display function as a coalescing function may be implemented by combining plural displays. As another example, a recording function as a coalescing function may be implemented by combining a television and a recorder. The recording function may be a function of recording an image displayed on the television. In addition, an image capturing area extension function as a coalescing function may be implemented by combining plural cameras. The extension function is, for example, a function of capturing in a manner of connecting the capturing areas of the respective cameras. In addition, a translated call function (a function of translating a conversation via a telephone) as a coalescing function may be implemented by combining a telephone with a translator or translation software. As described above, the concept of the linkage function includes a function that may be implemented by linking the same types of devices or functions to each other and a function that may be implemented by linking different types of devices or functions to each other.

The storage unit 30 may store usable function management information. The usable function management information is information for managing the functions usable by respective users, and is, for example, information indicating association between user identification information for identifying a user and function information indicating the function usable by the user (which may include linkage function information). As described above, the function usable by the user is, for example, a function provided to the user free of charge, a function purchased by the user, and the like, which may be a single function or a linkage function. The user identification information is, for example, user account information such as user ID and name. The functions usable by each user are specified (identified) by referring to the usable function management information. The usable function management information is updated, for example, each time when a function is provided to the user (for example, each time when a function is provided to the user for free or for a charge).

A control unit 36 controls the operation of each unit of the server 14. Further, the control unit 36 includes a specifying unit 38.

The specifying unit 38 receives device identification information for identifying a device and specifies function information indicating a function associated with the device identification information in the device function management information 32 stored in the storage unit 30. Therefore, the function that the device has is specified (identified). For example, the device identification information is transmitted from the terminal device 16 to the server 14, and the specifying unit 38 specifies function information indicating a function associated with the device identification information. Information on the function (for example, function information, explanation information on the function, etc.) is transmitted, for example, from the server 14 to the terminal device 16 and displayed on the terminal device 16. As a result, the information on the function that the device specified by the device identification information has is displayed on the terminal device 16.

Further, the specifying unit 38 receives the device identification information for identifying each device to be linked and specifies the linkage function information indicating the linkage function associated with a combination of respective device identification information in the linkage function management information 34 stored in the storage unit 30. Therefore, the linkage function executed by linking the functions that the respective devices to be linked have is specified (identified). For example, plural pieces of device identification information are transmitted from the terminal device 16 to the server 14, and the specifying unit 38 specifies linkage function information indicating a linkage function associated with the plural pieces of device identification information. Information on the linkage function (for example, linkage function information, explanation information on the linkage function, etc.) is transmitted, for example, from the server 14 to the terminal device 16 and displayed on the terminal device 16. As a result, the information on the linkage function executed by the plural devices specified by the plural pieces of device identification information is displayed on the terminal device 16.

For example, when one device is identified (for example, when one device is captured), the specifying unit 38 may receive device identification information for identifying the device and specify function information indicating a function associated with the device identification information in the device function management information 32. Therefore, when one device is identified (for example, when one device is captured), the function that the device has is specified (identified). When plural devices are identified (for example, when plural devices are captured), the specifying unit 38 may receive device identification information for identifying each device included in the plural devices and specify linkage function information indicating a linkage function associated with a combination of respective device identification information in the linkage function management information 34. Therefore, when plural devices are identified (for example, when plural devices are captured), the linkage function using the functions that the plural devices have is specified (identified).

Further, the specifying unit 38 may receive function information indicating each function used for the linkage function and specify the linkage function information indicating the linkage function associated with a combination of respective function information in the linkage function management information 34 stored in the storage unit 30. Therefore, the linkage function executed by linking the respective functions to be linked is specified (identified). For example, plural pieces of function information are transmitted from the terminal device 16 to the server 14, and the specifying unit 38 specifies linkage function information indicating a linkage function associated with the plural pieces of function information. Similarly to the above, the information on the linkage function executed by the plural devices specified by the plural pieces of function information is displayed on the terminal device 16.

When the functions usable by a user are managed, the specifying unit 38 may receive user identification information for identifying the user and specify function information indicating each function associated with the user identification information in the usable function management information stored in the storage unit 30. As a result, a group of functions usable by the user is specified (identified). For example, the user identification information is transmitted from the terminal device 16 to the server 14, and the specifying unit 38 specifies function information indicating each function associated with the user identification information. Information on each function usable by the user (for example, information indicating the name of each function)

is transmitted, for example, from the server 14 to the terminal device 16 and displayed on the terminal device 16. As a result, the information on each function usable by the user specified by the user identification information is displayed on the terminal device 16. For example, the specifying unit 38 receives the device identification information and the user identification information, specifies function information indicating a function associated with the device identification information in the device function management information 32, and also specifies function information indicating a function associated with the user identification information in the usable function management information. As a result, the function that the device specified by the device identification information has and is usable by the user identified by the user identification information.

The control unit 36 may execute a function purchase process and manage the history of the purchase. For example, when a paid function is purchased by a user, the control unit 36 may apply a charging process to the user.

Further, the control unit 36 may execute functions related to image processing such as, for example, a character recognition function, a translation function, an image processing function, and an image forming function. Of course, the control unit 36 may execute functions related to any process other than the image processing. As the character recognition function is executed, characters in the image are recognized and character data indicating the characters is generated. As the translation function is executed, the characters in the image are translated into characters represented in a specific language, and character data indicating the translated characters is generated. As the image processing function is executed, the image is processed. The control unit 36 may receive, for example, scan data generated by executing the scan function from the image forming device 10 and execute functions related to the image processing such as the character recognition function, the translation function, the image processing function, and the like, on the scan data. The control unit 36 may receive image data from the terminal device 16 and execute the respective functions on the image data. The character data and image data generated by the control unit 36 are transmitted, for example, from the server 14 to the terminal device 16. The server 14 is used as an external device, and the linkage function may be a function of using functions that plural devices including the server 14 have.

Figure 4:
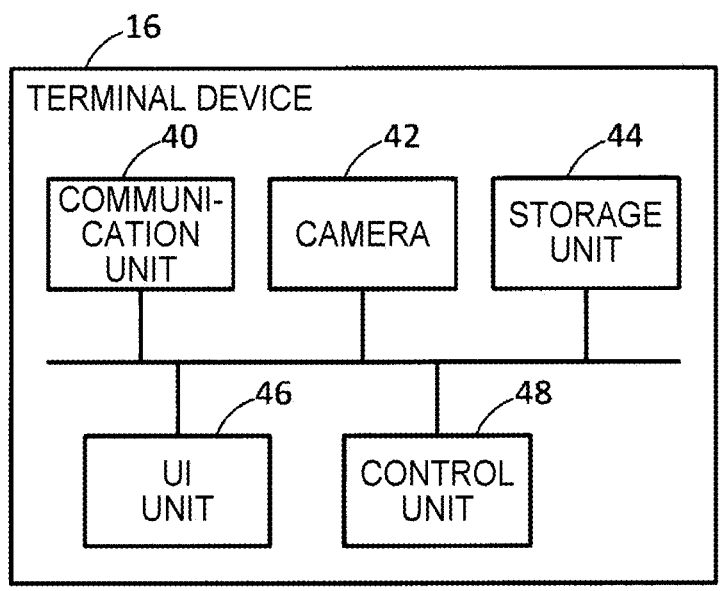
FIG. 4 is a block diagram illustrating a terminal device according to the first exemplary embodiment.

Hereinafter, the configuration of the terminal device 16 will be described in detail with reference to FIG. 4. FIG. 4 illustrates the configuration of the terminal device 16.

A communication unit 40 is a communication interface and has a function of transmitting data to another device and a function of receiving data from another device. The communication unit 40 may be a communication interface having a wireless communication function or a communication interface having a wired communication function. For example, the communication unit 40 corresponds to one or plural types of communication methods and may communicate with a communication partner according to a communication method suitable for the communication partner (that is, a communication method supported by the communication partner). The communication method is, for example, infrared communication, visible light communication, Wi-Fi communication, near-field wireless communication, and the like. For example, the communication unit 40 may switch the communication method or the frequency band depending on the communication partner, or switch the communication method or the frequency band depending on the surrounding environment.

A camera 42 as an image capturing unit generates image data (for example, still image data or moving image data) by capturing an object to be captured. Further, in addition to using the camera of the terminal device 16, image data captured by an external camera connected to a communication path such as a network may be received by the communication unit 40, and the image data may be displayed by a UI unit 46, so that the user may operate the image data.

A storage unit 44 is a storage device such as a hard disk or a memory (for example, SSD), and stores various programs, various data, address information of the server 14, address information of each device (for example, address information of the devices 10 and 12), information on the identified device, information on the identified device to be linked, information on the function that the identified device has, information on the linkage function, and the like.

The UI unit 46 is a user interface unit and includes a display unit and an operation unit. The display unit is, for example, a display device such as a liquid crystal display. The operation unit is an input device such as, for example, a touch panel, a keyboard, a mouse or the like. Of course, it may be a user interface that serves as a display unit and an operation unit (for example, a touch-type display, a device for electronically displaying a keyboard or the like on a display, etc.).

A control unit 48 controls the operation of each unit of the terminal device 16. The control unit 48 functions as, for example, a display controller (controller) and displays various information on the display unit of the UI unit 46.

The display unit of the UI unit 46 displays thereon, for example, an image captured by the camera 42, an image associated with a device identified as a device to be used (for example, a device used alone or a device to be linked), an image associated with a function, and the like. The image associated with the device may be an image (still image or moving image) representing the device captured by the camera 42, or may be an image schematically representing the device (for example, an icon). For example, the schematically indicated image data may be stored in the server 14 and provided from the server 14 to the terminal device 16, may be stored in advance in the terminal device 16, or may be stored in another device and provided from the other device to the terminal device 16. The image associated with the function is, for example, an image such as an icon representing the function.

The above-described device function management information 32 may be stored in the storage unit 44 of the terminal device 16. In this case, the device function management information 32 may not be stored in the storage unit 30 of the server 14. Similarly, the above-described linkage function management information 34 may be stored in the storage unit 44 of the terminal device 16. In this case, the linkage function management information 34 may not be stored in the storage unit 30 of the server 14. The control unit 48 of the terminal device 16 may have the specifying unit 38 described above, and may identify the device based on the device identification information so as to specify the function that the device has or specify a linkage function that uses plural functions. In this case, the server 14 may not have the specifying unit 38.

When usable function management information is created, the usable function management information may be stored in the storage unit 44 of the terminal device 16. In this case, the usable function management information may not be stored in the storage unit 30 of the server 14. The control unit 48 of the terminal device 16 may manage history of the purchase of functions by a user. In this case, the control unit 36 of the server 14 may not have the management function thereof. The control unit 48 of the terminal device 16 may specify functions usable by the user based on the user identification information.

As still another example, the device function management information 32 and the linkage function management information 34 may be stored in the devices such as the devices 10 and 12, or the devices such as the devices 10 and 12 may have the specifying unit 38. That is, a process by the specifying unit 38 of the server 14 (for example, a device identification process, a function identification process, a linkage function identification process, etc.) may be performed in the server 14, may be performed in the terminal device 16, or may be performed in the devices such as the devices 10 and 12.

In the present exemplary embodiment, as an example, by applying an augmented reality (AR) technology, the device identification information is acquired so that the device is identified. For example, by applying the AR technology, the device identification information of the device used alone is acquired, so that the device is identified, and the device identification information of the device to be linked is acquired, so that the device to be linked is identified. As the AR technology, any known AR technology is used. Examples thereof include a marker AR technology using a marker such as a two-dimensional barcode, a markerless AR technology using an image recognition technology, a position information AR technology using position information, and the like. Of course, the device identification information may be acquired without using the AR technology, and then the device may be identified. For example, when the device is connected to the network, the device may be identified based on the IP address, or the device ID may be read to identify the device. In addition, in a case of a device or a terminal device having various wireless communication functions such as infrared communication, visible light communication, Wi-Fi, Bluetooth, etc., the device may be identified by acquiring the device IDs of devices linked using these wireless communication functions, and the linkage function may be executed.

Figures 5, 6:
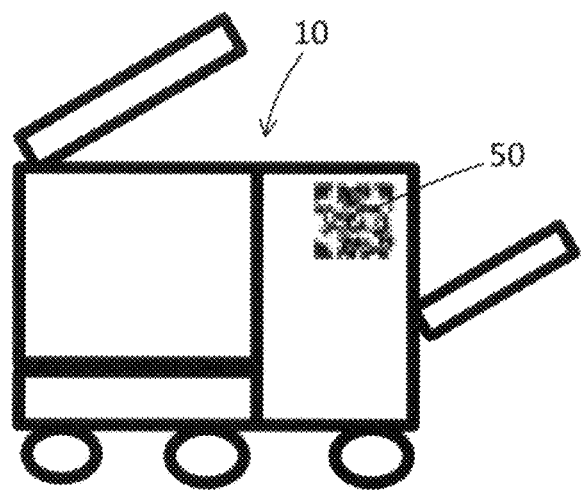
FIG. 5 is a schematic diagram illustrating an external appearance of the image forming device.
FIG. 6 is a diagram illustrating an example of a device function management table.

Hereinafter, the process of acquiring the device identification information will be described in detail with reference to FIG. 5. As an example, a case of acquiring the device identification information of the image forming device 10 will be described. FIG. 5 schematically illustrates the external appearance of the image forming device 10. Here, descriptions will be made on a process for acquiring device identification information by applying the marker AR technology. A marker 50 such as a two-dimensional barcode or the like is provided on the casing of the image forming device 10. The marker 50 is information in which the device identification information of the image forming device 10 is encoded. A user activates the camera 42 of the terminal device 16 and captures the marker 50 provided in the image forming device 10 to be used with the camera 42. As a result, image data representing the marker 50 is generated. The image data is transmitted, for example, from the terminal device 16 to the server 14. In the server 14, the control unit 36 extracts the device identification information by applying a decoding process to the marker image represented in the image data. As a result, the image forming device 10 to be used (the image forming device 10 having the captured marker 50) is identified. The specifying unit 38 of the server 14 specifies the function information indicating the function associated with the extracted device identification information in the device function management information 32. Therefore, the function that the image forming device 10 to be used has is specified (identified).

The control unit 48 of the terminal device 16 may extract the device identification information by applying the decoding process to the image data representing the marker 50. In this case, the extracted device identification information is transmitted from the terminal device 16 to the server 14. The specifying unit 38 of the server 14 specifies the function information indicating the function associated with the device identification information transmitted from the terminal device 16 in the device function management information 32. When the device function management information 32 is stored in the storage unit 44 of the terminal device 16, the control unit 48 of the terminal device 16 may specify the function information indicating the function associated with the extracted device identification information in the device function management information 32.

Function information indicating the functions that the image forming device 10 has may be encoded and included in the marker 50. In this case, when the decoding process is applied to the image data representing the marker 50, the device identification information of the image forming device 10 is extracted, and the function information indicating the function that the image forming device 10 has is extracted as well. As a result, the image forming device 10 is specified (identified), and functions that the image forming device 10 has are specified (identified). The decoding process may be performed by the server 14 or may be performed by the terminal device 16.

In a case of executing a linkage function using functions that plural devices have, device identification information of each device is acquired by capturing a marker of each device to be linked, so that the linkage function is specified (identified).

In a case of acquiring the device identification information by applying the markerless AR technology, for example, the user captures the entirety or a part of the external appearance of the device to be used (for example, the image forming device 10) by the camera 42 of the terminal device 16. Of course, it is useful to acquire information for specifying a device such as a name (for example, product name) of a device to be used, a model number, or an asset management number, by capturing the external appearance. External appearance image data representing the entirety or a part of the external appearance of the device to be used is generated by image capturing. The external appearance image data is transmitted, for example, from the terminal device 16 to the server 14. In the server 14, the control unit 36 identifies the device to be used based on the external appearance image data. For example, the storage unit 30 of the server 14 stores, for each device, external appearance image association information indicating the association between the external appearance image data representing the entirety or a part of the external appearance of the device and the device identification information of the device. For example, the control unit 36 compares the external appearance image data transmitted from the terminal device 16 with each external appearance image data included in the external appearance image association information, and specifies the device identification information of the device to be used based on the comparison result. For example, the control unit 36 extracts features of the external appearance of the device to be used from the appearance image data transmitted from the terminal device 16, specifies the external appearance image data representing features identical or similar to the features of the external appearance in the external appearance image data group included in the external appearance image association information, and specifies the device identification information associated with the external appearance image data. As a result, the device to be used (the device captured by the camera 42) is identified. As another example, when the name (for example, product name) or model number of the device is captured and external appearance image data representing the name or model number is generated, the device to be used may be identified based on the name or model number indicated in the external appearance image data. The specifying unit 38 of the server 14 specifies the function information indicating the functions associated with the specified device identification information in the device function management information 32. Therefore, the functions that the device to be used (for example, the image forming device 10) has are specified.

The control unit 48 of the terminal device 16 may compare the external appearance image data representing the entirety or a part of the external appearance of the device to be used (for example, the image forming device 10) with each external appearance image data included in the external appearance image association information, and specify the device identification information of the device to be used based on the comparison result. The external appearance image association information may be stored in the storage unit 44 of the terminal device 16. In this case, the control unit 48 of the terminal device 16 specifies the device identification information of the device to be used by referring to the external appearance image association information stored in the storage unit 44 of the terminal device 16. As another example, the control unit 48 of the terminal device 16 may acquire external appearance image association information from the server 14 and specify the device identification information of the device to be used by referring to the external appearance image association information.

In a case of executing a linkage function using plural functions that plural devices have, device identification information of each device to be linked is acquired by capturing the entirety or a part of the external appearance of each device to be linked, so that the linkage function is specified (identified).

When acquiring the device identification information by applying the position information AR technology, position information indicating the position where the device (for example, the image forming device 10) is installed is acquired using, for example, the global positioning system (GPS) function. For example, each device has the GPS function and acquires device position information indicating the position of the device itself. The terminal device 16 outputs information indicating a device position information acquisition request to the device to be used, and receives device position information of the device from the device as a response to the acquisition request. The device position information is transmitted, for example, from the terminal device 16 to the server 14. In the server 14, the control unit 36 identifies the device to be used based on the device position information. For example, the storage unit 30 of the server 14 stores, for each device, position association information indicating the association between the device position information indicating the position where the device is installed and the device identification information of the device. The control unit 36 specifies the device identification information associated with the device position information transmitted from the terminal device 16 in the position association information. Therefore, the device to be used is specified (identified). The specifying unit 38 of the server 14 specifies the function information indicating the functions associated with the specified device identification information in the device function management information 32. Therefore, the function that the device to be used (for example, the image forming device 10) has is specified (identified).

The control unit 48 of the terminal device 16 may specify the device identification information associated with the position information of the device to be used in the position association information. The position association information may be stored in the storage unit 44 of the terminal device 16. In this case, the control unit 48 of the terminal device 16 specifies the device identification information of the device to be used by referring to the position association information stored in the storage unit 44 of the terminal device 16. As another example, the control unit 48 of the terminal device 16 may acquire position association information from the server 14 and specify the device identification information of the device to be used by referring to the position association information.

In a case of executing a linkage function using plural devices, device position information of each device to be linked is acquired, and device identification information of each device is specified based on the device position information of each device. Therefore, the linkage function is specified (identified).

Plural identification technologies may be used to identify devices. For example, a device may be identified using plural technologies selected from the marker AR technology, the markerless AR technology, and the position information AR technology. Further, when a device cannot be identified by a certain identification technology, the device may be identified using another identification technology. For example, when a device is not able to be identified by the marker AR technology or the markerless AR technology, the device may be identified using the position information AR technology.

Hereinafter, the image forming system according to the present exemplary embodiment will be described in more detail.

The device function management information 32 will be described in detail with reference to FIG. 6. FIG. 6 illustrates an exemplary device function management table as the device function management information 32. In the device function management table, as an example, the device ID, the information indicating the device name (for example, the type of the device), the information indicating the function that the device has (function information), and the image ID are associated with each other. The device ID and the device name corresponds to an example of the device identification information. The image ID is an example of image identification information for identifying an image representing a device (for example, an image representing the external appearance of the device, an image schematically representing the device (for example, an icon), etc.). The device function management table may not be included in the image ID. For example, a device of which the device ID is "B" is a multifunction device (an image forming device having plural image forming functions), and has functions such as a print function and a scan function. An image ID for identifying an image representing the device is associated with the device. The data of the image representing the device is stored in, for example, the storage unit 30 of the server 14 or another device.

For example, the device ID for identifying the device to be used is acquired by applying the AR technology. The specifying unit 38 of the server 14 specifies the device name, the function, and the image ID associated with the device ID by referring to the device function management table. Therefore, the device to be used is identified. For example, the information indicating the device name and the data of the image representing the device are transmitted from the server 14 to the terminal device 16, and these are displayed on the UI unit 46 of the terminal device 16. The image representing the device is displayed as an image associated with the device. Of course, the image itself captured by the camera 42 may be displayed on the UI unit 46 of the terminal device 16. Further, when the image associated with the device (for example, an image captured by the camera 42 or an image schematically representing the device) is designated by the user in the UI unit 46 of the terminal device 16, information on the function that the device has (for example, function information, explanation information on the function, etc.) may be transmitted from the server 14 to the terminal device 16 and displayed on the UI unit 46 of the terminal device 16.

Hereinafter, the linkage function management information 34 will be described in detail with reference to FIG. 7. FIG. 7 illustrates an exemplary linkage function management table as the linkage function management information 34. In the linkage function management table, as an example, a combination of the device IDs, the information indicating the names of the devices to be linked (for example, the types of the devices), and the information indicating the linkage functions (linkage function information) are associated with each other. For example, the device of which the device ID is "A" is a PC (personal computer), and the device of which the device ID is "B" is a multifunction device. When the PC (A) and the multifunction device (B) are linked to each other, for example, "scan transfer function" and "print function" are implemented as linkage functions. The "scan transfer function" is a function of transferring image data generated by scanning by the multifunction device (B) to the PC (A). The "print function" is a function of transmitting data (for example, image data and document data) saved in the PC (A) to the multifunction device (B) and printing it with the multifunction device (B).

Figure 8:
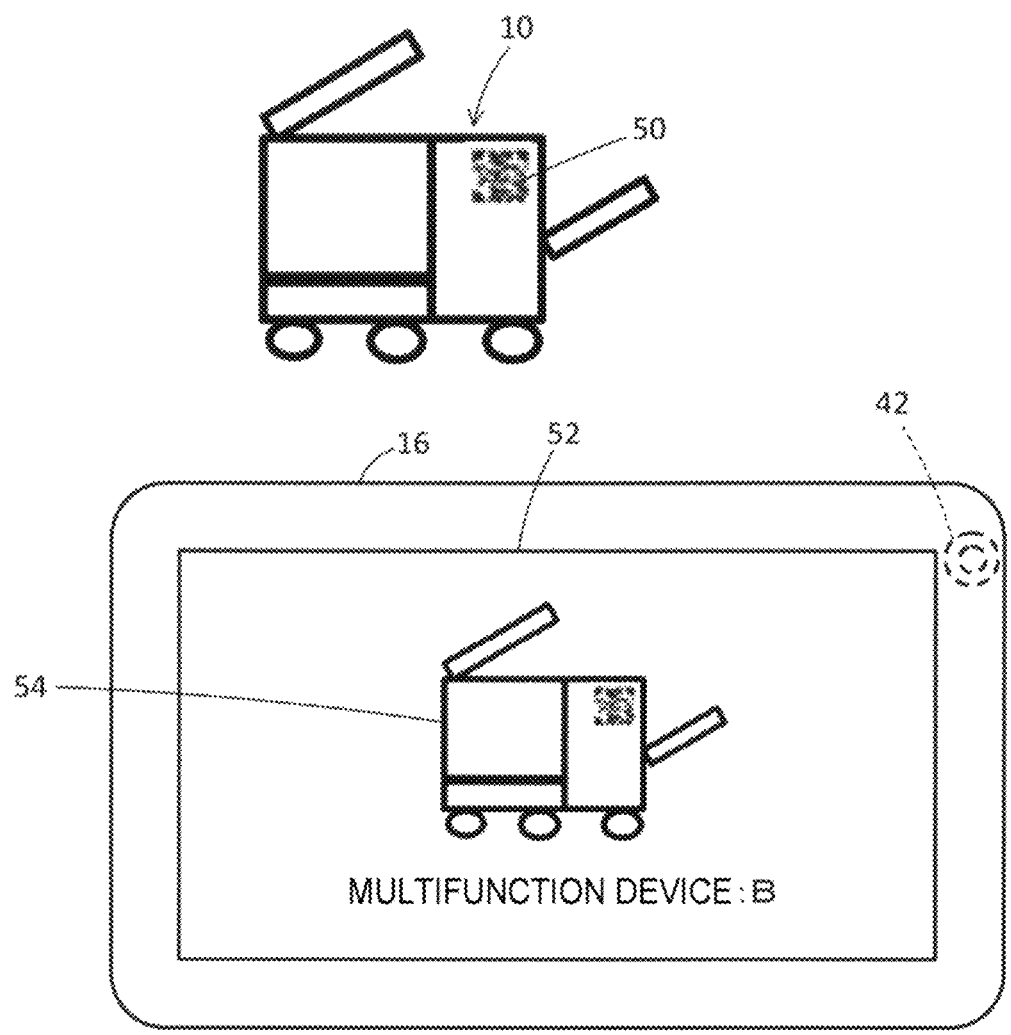
FIG. 8 is a diagram illustrating a device used alone.

Hereinafter, a process in the case of using a device alone will be described with reference to FIG. 8. FIG. 8 illustrates an example of a device used alone. As an example, it is assumed that the image forming device 10 is a device used alone. The image forming device 10 is, for example, a multifunction device. The image forming device 10 is a device existing in a real space. The terminal device 16 illustrated in FIG. 8 is a device existing in the real space, and is, for example, a portable terminal device such as a smartphone or a mobile phone.

For example, a marker 50 such as a two-dimensional barcode or the like is provided on the casing of the image forming device 10. When the marker AR technology or the markerless AR technology is used, the user captures the image forming device 10 to be used by the camera 42 of the terminal device 16 (for example, a smartphone). As a result, image data representing the marker 50 or external appearance image data representing the external appearance of the image forming device 10 is generated. A device display screen 52 is displayed on the display unit of the UI unit 46 of the terminal device 16, and a device image 54 associated with the image forming device 10 is displayed on the device display screen 52. The device image 54 is, for example, an image generated by capturing by the camera 42 (it may be an image having a size at the time of capturing or may be an enlarged or reduced image).

The image data generated by capturing by the camera 42 is transmitted from the terminal device 16 to the server 14. In the server 14, the control unit 36 applies the decoding process to the image data to extract the device identification information of the image forming device 10, thereby identifying the image forming device 10. As another example, external appearance image data representing the external appearance of the image forming device 10 may be generated, and the external appearance image data may be transmitted from the terminal device 16 to the server 14. In this case, the control unit 36 of the server 14 specifies the device identification information of the image forming device 10 by referring to the external appearance image association information. Therefore, the image forming device 10 is identified.

Further, the specifying unit 38 of the server 14 specifies (identifies) the function that the image forming device 10 has by referring to the device function management information 32 (for example, the device function management table illustrated in FIG. 6). In this regard, detailed descriptions will be made with reference to FIG. 6. As an example, it is assumed that the image forming device 10 is a "multifunction device (B)." The specifying unit 38 specifies the functions associated with the multifunction device (B) in the device function management table illustrated in FIG. 6. Therefore, the functions that the multifunction device (B) has are specified. Information on the specified functions is transmitted from the server 14 to the terminal device 16. Of course, the process for identifying devices and functions may be performed by the terminal device 16.

Instead of the image generated by capturing by the camera 42, an image prepared in advance and associated with the identified image forming device 10 (not an image itself obtained by image-capturing but a schematic image (for example, an icon)) or an image generated by capturing by an external camera may be displayed as the device image 54 on the device display screen 52.

For example, in the case of using image data obtained by capturing a device, the external appearance of the current device itself (for example, an external appearance to which scratches, a memo, a seal affixed to the device, etc. are reflected) is reflected in the image, so that the user may see the difference visually from other similar devices.

When a schematic image is used, data of the schematic image is transmitted, for example, from the server 14 to the terminal device 16. For example, when the image forming device 10 is identified, the specifying unit 38 of the server 14 specifies the schematic image associated with the image forming device 10 by referring to the device function management table (the device function management information 32) illustrated in FIG. 6. The data of the schematic image is transmitted from the server 14 to the terminal device 16, and the schematic image thereof is displayed on the device display screen 52 as the device image 54. The data of the schematic image may be stored in advance in the terminal device 16. In this case, when the image forming device 10 is identified, the device image 54 stored in the terminal device 16 is displayed on the device display screen 52. The data of the schematic image may be stored in a device other than the server 14 and the terminal device 16.

Further, when the device is identified, information indicating the name of the device may be transmitted from the server 14 to the terminal device 16, and the name of the device may be displayed on the device display screen 52 in the terminal device 16. In the example illustrated in FIG. 8, the image forming device 10 is a multifunction device, and its name "multifunction device (B)" is displayed.

Figure 9:
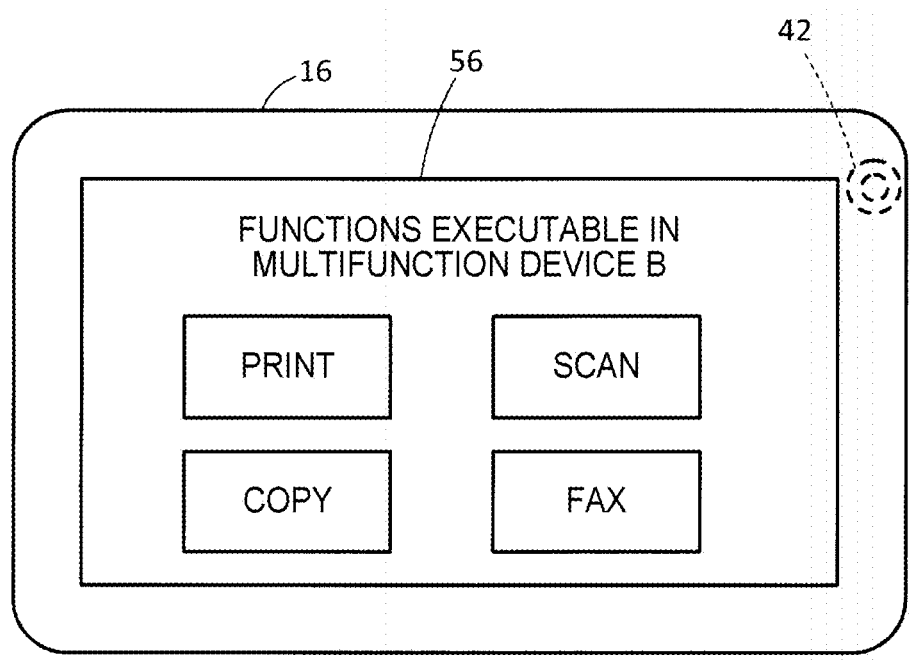
FIG. 9 is a diagram illustrating an example of a function display screen.

When the function that the image forming device 10 has is specified, for example, as illustrated in FIG. 9, the control unit 48 of the terminal device 16 displays a function display screen 56 on the UI unit 46 of the terminal device 16 and causes the function display screen 56 to display information on the functions. For example, a button image for instructing execution of a function is displayed as information on the functions. Since the multifunction device (B) as the image forming device 10 has, for example, a print function, a scan function, a copy function, and a facsimile function, a button image for instructing the execution of these functions is displayed on the function display screen 56. For example, when the user designates a button image representing the print function using the terminal device 16 and instructs execution of the print function, execution instruction information indicating the execution instruction of the print function is transmitted from the terminal device 16 to the image forming device 10. The execution instruction information includes data such as control data for executing the print function, image data to which the print function is applied, and the like. When receiving the execution instruction information, the image forming device 10 executes printing in accordance with the execution instruction information.

Figure 10:
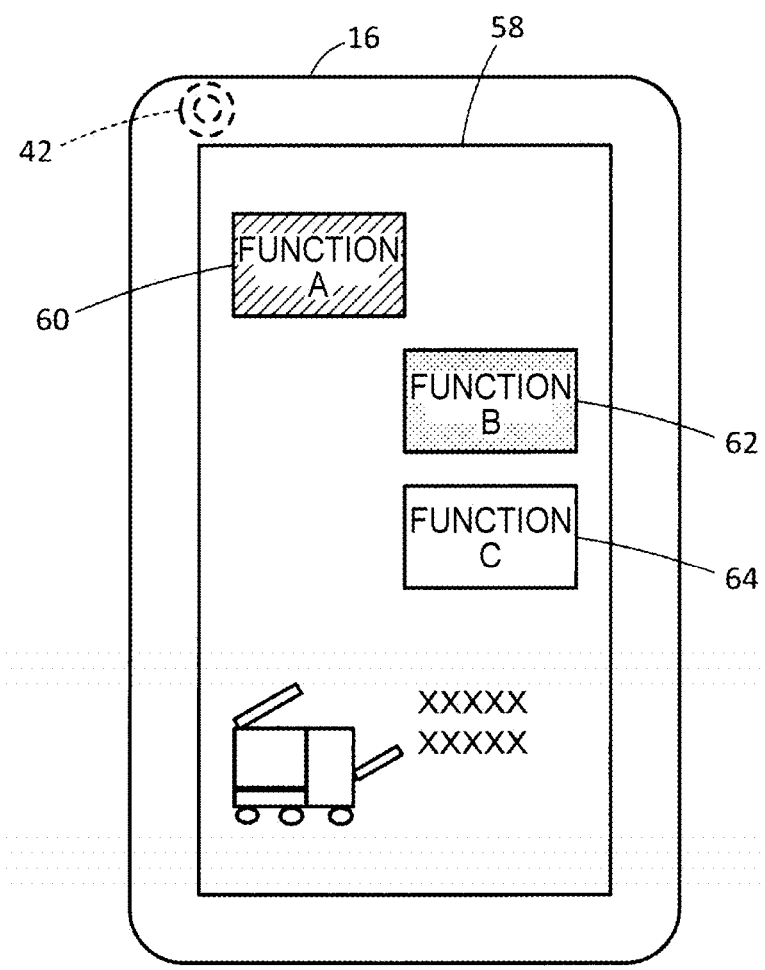
FIG. 10 is a diagram illustrating an example of a function display screen.

FIG. 10 illustrates another example of the function display screen. As illustrated in FIG. 8, the function display screen 58 is a screen displayed on the UI unit 46 of the terminal device 16 when using a single device. As described above, the device to be used (for example, the image forming device 10) is specified, and the functions that the device to be used has are specified. In addition, the function information indicating the functions associated with the user identification information by the user using the device to be used, that is, the functions usable by the user may be specified. Further, since the functions of the device to be used are specified, a function that the device to be used does not have among the group of functions to be provided may be specified. These pieces of information may be displayed on the function display screen 58.

As an example of the function information, a button image 60 representing a function A, a button image 62 representing a function B, and a button image 64 representing a function C are displayed on the function display screen 58 illustrated in FIG. 10. The function A is a function that the device to be used (for example, the identified image forming device 10) has and is a function that is usable by the user. The function B is a function that the device to be used has and is a function that is unusable by the user. When the user is provided with the function B, the use of the function B by the user is enabled. When the function B is a paid function, the use of the function B is enabled when the user purchases the function B by the user, and when the function B is a free function, the use of the function B is enabled by receiving the function B free of charge. The function C is a function that the device to be used does not have, that is, a function that the device to be used is not compatible with. The control unit 48 of the terminal device 16 may change a manner in which the button image is displayed, depending on whether or not the function represented by the button image is a function that the device to be used has. Further, the control unit 48 may change the manner in which the button image is displayed, depending on whether or not the function represented by the button image is a function usable by the user. For example, the control unit 48 may change the color or shape of the button image. In the example illustrated in FIG. 10, the button images 60, 62, and 64 are displayed in different colors. As an example, a button image which is a function that the device to be used has and represents a function usable by the user (for example, the button image 60 representing the function A) is displayed in blue. A button image which is a function that the device to be used has and represents a function unusable by the user (for example, the button image 62 representing the function B) is displayed in yellow. A button image which is a function that the device to be used (for example, the button image 64 representing the function C) does not have is displayed in gray. As another example, the control unit 48 may change the shape of the button images 60, 62, and 64, or may change the font of the function display name. Of course, the display manner may be changed by another method. Therefore, the availability of each function is communicated to the user with good visibility.

For example, when a user designates the button image 60 representing the function A using the terminal device 16 and gives an instruction to execute the function A, the execution instruction information indicating the execution instruction of the function A is transmitted from the terminal device 16 to the device to be used. The execution instruction information includes data such as control data for executing the function A, image data to which the process by the function A is applied, and the like. When receiving the execution instruction information, the device to be used executes the function A in accordance with the execution instruction information. For example, when the device to be used is the image forming device 10 and the function A is the scan transfer function, the scan function is executed by the image forming unit 20 of the image forming device 10, and accordingly scan data (image data) is generated. The scan data is transmitted to a transmission destination (for example, the terminal device 16) set from the image forming device 10.

Further, when the user designates the button image 62 representing the function B using the terminal device 16 and instructs the provision of the function B, the providing process is executed. When the providing process is performed by the server 14, the terminal device 16 accesses the server 14. Accordingly, a screen for receiving the provision of the function B (for example, a website) is displayed on the UI unit 46 of the terminal device 16 as information for enabling the use of the function B by the user. When the provision procedure is performed on this screen, the use of the function B by the user is enabled. For example, a program of a web browser is stored in the terminal device 16, and access from the terminal device 16 to the server 14 is implemented using the web browser. When the user accesses the server 14 using the web browser, a function providing screen (for example, a website) is displayed on the UI unit 46 of the terminal device 16, and the function is provided through the website. Of course, the providing process may be performed by a server or the like other than the server 14. As another example, in the UI unit 46 of the terminal device 16, a use permission request screen (for example, a web site) for requesting use permission of the function B to the administrator or the like may be displayed as information for enabling use of the function B by the user. The use permission request of the function B is issued to the administrator or the like via the use permission request screen, and when the permission is obtained, the use of the function B by the user is enabled.

Figure 11:
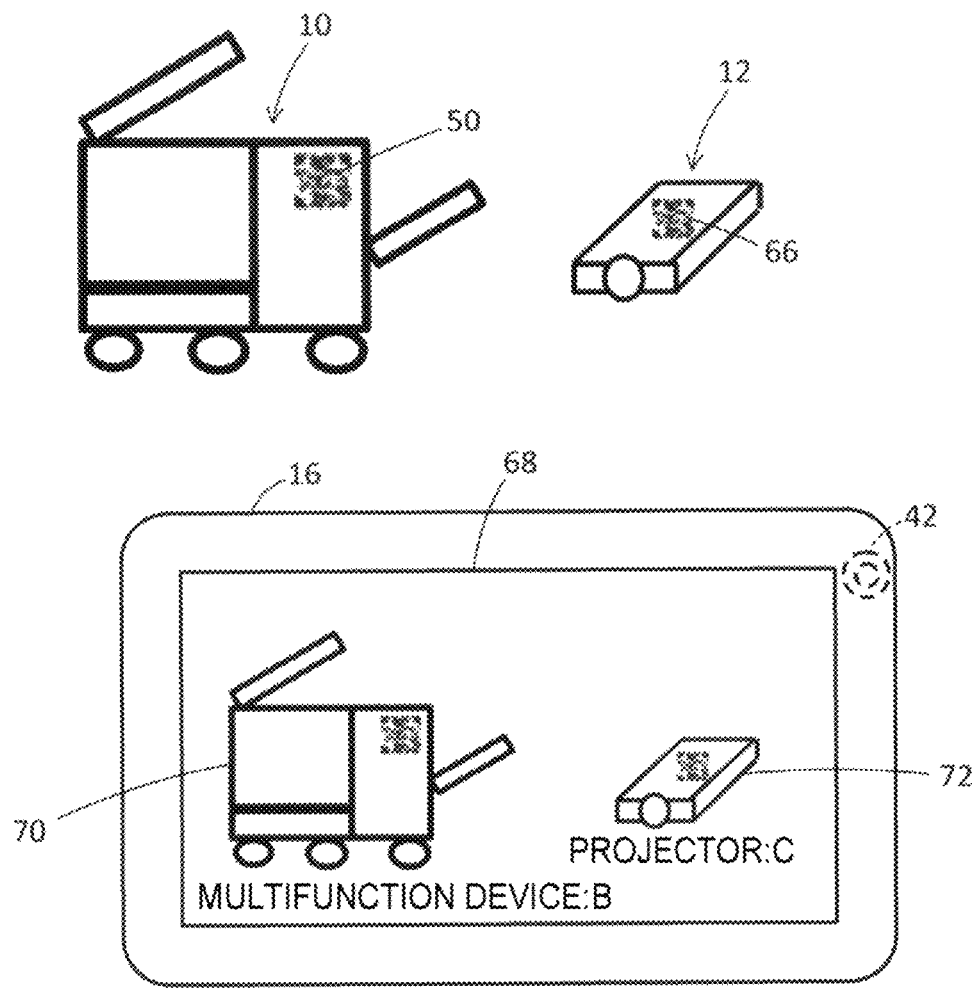
FIG. 11 is a diagram illustrating devices to be linked.

Hereinafter, a process in the case of using a linkage function will be described with reference to FIG. 11. FIG. 11 illustrates an example of devices to be linked. As an example, it is assumed that the image forming device 10 and a projector as the device 12 (hereinafter, referred to as a projector 12 in some cases) are used as devices to be linked. The image forming device 10, the projector 12, and the terminal device 16 are devices existing in a real space.

For example, a marker 50 such as a two-dimensional barcode is provided on the casing of the image forming device 10, and a marker 66 such as a two-dimensional barcode is provided on the casing of the projector 12. The marker 66 is information in which the device identification information of the projector 12 is encoded. When the marker AR technology or the markerless AR technology is used, the user captures the image forming device 10 and the projector 12 to be linked by the camera 42 of the terminal device 16 (for example, a smartphone). In the example illustrated in FIG. 11, the image forming device 10 and the projector 12 are captured together in a state where both the image forming device 10 and the projector 12 are included in the capturing area of the camera 42. As a result, image data representing each of the markers 50 and 66 is generated. A device display screen 68 is displayed on the display unit of the UI unit 46 of the terminal device 16, and a device image 70 associated with the image forming device 10 and a device image 72 associated with the projector 12 are displayed on the device display screen 68. The device images 70 and 72 are, for example, images generated by capturing by the camera 42 (they may be images having a size at the time of capturing or may be enlarged or reduced images).

The image data generated by capturing by the camera 42 is transmitted from the terminal device 16 to the server 14. In the server 14, the control unit 36 applies the decoding process to the image data to extract the device identification information of the image forming device 10 and the device identification information of the projector 12, thereby identifying the image forming device 10 and the projector 12. As another example, external appearance image data representing the external appearance of each of the image forming device 10 and the projector 12 may be generated and transmitted from the terminal device 16 to the server 14. In this case, the control unit 36 of the server 14 specifies the device identification information of the image forming device 10 and the device identification information of the projector 12 by referring to the external appearance image association information. Therefore, the image forming device 10 and the projector 12 are identified.

Further, the specifying unit 38 of the server 14 specifies (identifies) the linkage function using the function that the image forming device 10 has and the function that the projector 12 has by referring to the linkage function management information 34 (for example, the linkage function management table illustrated in FIG. 7). In this regard, detailed descriptions will be made with reference to FIG. 7. As an example, it is assumed that the image forming device 10 is a "multifunction device (B)," and the projector 12 is a "projector (C)." The specifying unit 38 specifies the linkage functions associated with the combination of the multifunction device (B) and the projector (C) in the linkage function management table illustrated in FIG. 7. Therefore, the linkage function executed by linking the multifunction device (B) and the projector (C) is specified. Information on the specified linkage functions is transmitted from the server 14 to the terminal device 16. Of course, the process for identifying devices and linkage functions may be performed by the terminal device 16.

Instead of the image generated by capturing by the camera 42, an image prepared in advance and associated with the identified image forming device 10 (for example, a schematic image (for example, an icon)) or an image generated by capturing by an external camera may be displayed as the device image 70 on the device display screen 68. Similarly, an image prepared in advance and associated with the identified projector 12 or an image generated by capturing by an external camera may be displayed as the device image 72. As described above, for example, the schematic image data may be transmitted from the server 14 to the terminal device 16, may be stored in advance in the terminal device 16, or may be stored in any device other than the devices.

Further, when the device is identified, information indicating the name of the device may be transmitted from the server 14 to the terminal device 16, and the name of the device may be displayed on the device display screen 68 in the terminal device 16. In the example illustrated in FIG. 11, the name "multifunction device (B)" of the image forming device 10 and the name "projector (C)" of the projector 12 are displayed.

Even when plural devices are captured, the specifying unit 38 of the server 14 may specify the functions that each device has by referring to the device function management information 32. In the example illustrated in FIG. 11, the specifying unit 38 may specify each of the functions that the image forming device 10 has and the functions that the projector 12 has. Information on the specified functions may be transmitted from the server 14 to the terminal device 16.

Figure 12:
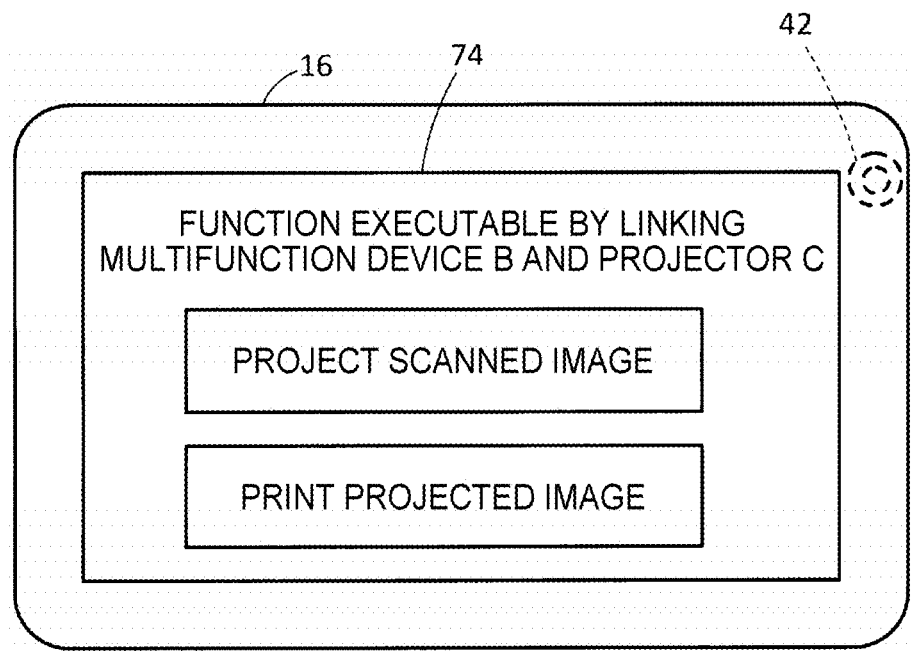
FIG. 12 is a diagram illustrating an example of a function display screen.

When the linkage functions are specified, for example, as illustrated in FIG. 12, the control unit 48 of the terminal device 16 displays a function display screen 74 on the UI unit 46 of the terminal device 16 and causes the function display screen 74 to display information on the linkage functions. For example, a button image for instructing execution of the linkage functions is displayed as information on the linkage functions. When the multifunction device (B) and the projector (C) are linked to each other, for example, a linkage function of projecting, by the projector (C), an image generated by scanning by the multifunction device (B), or a linkage function of printing, by the multifunction device (B), the image projected by the projector (C) may be executed. A button image for instructing execution of these linkage functions is displayed on the function display screen 74. For example, when the user designates a button image using the terminal device 16 and instructs execution of the linkage function, execution instruction information indicating the execution instruction of the linkage function is transmitted from the terminal device 16 to the image forming device 10 and the projector 12. When receiving the execution instruction information, the image forming device 10 and the projector 12 execute the linkage functions designated by the user.

A device to be linked may be designated by the operation of the user. For example, the image forming device 10 and the projector 12 are captured by the camera 42, so that a device image 70 associated with the image forming device 10 and a device image 72 associated with the projector 12 are displayed in the UI unit 46 of the terminal device 16 as illustrated in FIG. 11. The image associated with the device may be an image obtained by capturing by the camera 42 or an image prepared in advance and associated with the identified device (for example, a schematic image (for example, an icon)). When the user designates the device images 70 and 72 on the device display screen 68, the image forming device 10 and the projector 12 are designated as the devices to be linked. For example, when the user designates the device image 70, the marker AR technology or the markerless AR technology is applied to the device image 70, and thus, the image forming device 10 is specified (identified). Similarly, when the user designates the device image 72, the marker AR technology or the markerless AR technology is applied to the device image 72, and thus, the projector 12 is specified (identified). As a result, the linkage functions executed by the image forming device 10 and the projector 12 are specified, and information on the linkage functions is displayed on the UI unit 46 of the terminal device 16.

As another example, the user may touch the device image 70 on the device display screen 68 and operates with a finger or the like (for example, traces with a finger or the like) to the device image 72 to designate the device images 70 and 72, so that the image forming device 10 and the projector 12 are designated as the devices to be linked. The order of touching the device images 70 and 72 and the direction of tracing may be opposite to those in the above example. Of course, any screen contact unit other than a finger such as a pen for tracing the device display screen 68 may be used. The user may connect the device image 70 and the device image 72 to designate the device images 70 and 72, so that the image forming device 10 and the projector 12 are designated as the devices to be linked. When the user superimposes the device image 70 and the device image 72, the device images 70 and 72 may be designated, and as result, the image forming device 10 and the projector 12 may be designated as the devices to be linked. The devices to be linked may be designated by a drawing operation such as circling, or the devices to be linked may be designated by designating device images associated with the devices to be linked within a preset time. In a case of releasing the linkage, the user may designate the device to be released on the device display screen 68, or may press a linkage release button. In the case where a device that is not to be linked is included in the image, the user may exclude the device from a group of devices to be linked by designating the device on the device display screen 68. A device to be released may be designated by a preset operation such as adding a cross mark or the like.

Each device to be linked may be captured separately. For example, each device to be linked is identified by dividing the capturing by the camera 42 plural times. When the capturing by the camera 42 is divided plural times, the device identification information of the device identified at each capturing time is stored in the storage unit of the server 14 or the terminal device 16. For example, the image forming device 10 is captured while the image forming device 10 is included in the capturing area of the camera 42, and then the projector 12 is captured while the projector 12 is included in the capturing area of the camera 42. As a result, the image data of the image forming device 10 and the image data of the projector 12 are generated, and the marker AR technology or the markerless AR technology is applied to each image data, so that the image forming device 10 and the projector 12 are specified (identified), and the linkage functions using the functions of the image forming device 10 and the projector 12 are specified (identified). For example, the respective devices to be linked are arranged close to each other, and both the image forming device 10 and the projector 12 are not necessarily included together in the capturing area of the camera 42. In some cases, it is possible to cope with the situation by changing the angle of the capturing area of the camera 42 or by enlarging or reducing the capturing area. However, when it is not possible to cope with the situation by such an operation, dividing the capturing plural times may also be a solution to identify the devices to be linked.

As another example, a device to be linked may be preset as a basic linkage device. For example, it is assumed that the image forming device 10 is preset as a basic linkage device. The device identification information of the basic linkage device may be stored in the storage unit of the server 14 or the terminal device 16 in advance. The user may use the terminal device 16 to designate the basic linkage device. When the basic linkage device is set, the user captures the device to be linked other than the basic linkage device by the camera 42 of the terminal device 16. As a result, the device to be linked is specified (identified), and the linkage function using the functions that the basic linkage device and the captured device have is specified (identified).

In the example illustrated in FIGS. 11 and 12, a linkage function is a function that uses a device as hardware, but the linkage function may be a function that uses a function implemented by software (application). For example, instead of a device image, a functional image (for example, an image such as an icon) associated with a function implemented by software may be displayed on the UI unit 46 of the terminal device 16, and plural functional images may be designated by the user, so that a linkage function that uses plural functions associated with the plural function images may be specified (identified). For example, the linkage function may be specified by designating a device image associated with the function displayed on the home screen of the smartphone or the desktop screen of the personal computer. Of course, when the device image associated with the device as hardware and the functional image associated with the function implemented by software are displayed on the UI unit 46 of the terminal device 16, and the device image and the functional image are designated by the user, a linkage function that uses the device associated with the device image and the function associated with the functional image may be identified.

In the above example, a marker AR technology or a markerless AR technology is used, but a position information AR technology may be used. For example, the terminal device 16 has a GPS function, acquires terminal position information indicating the position of the terminal device 16 itself, and transmits the terminal position information to the server 14. The control unit 36 of the server 14 refers to the position association information indicating the association between the device position information indicating the installation position of the device and the device identification information, and specifies, as a linkage candidate device, each device arranged within a range which is preset based on the position of the terminal device 16. For example, it is assumed that a multifunction device, a PC, a printer, and a scanner are arranged within a range which is preset based on the position of the terminal device 16. In this case, the multifunction device, the PC, the printer, and the scanner are specified as the linkage candidate device. The device identification information of each linkage candidate device is transmitted from the server 14 to the terminal device 16 and displayed on the UI unit 46 of the terminal device 16. As the device identification information, an image of the linkage candidate device may be displayed, or a character string such as a device ID may be displayed. The user designates the device to be linked from the linkage candidate device group displayed on the UI unit 46. The device identification information of the device to be linked designated by the user is transmitted from the terminal device 16 to the server 14, and the linkage function is specified on the server 14 based on the device identification information of the device to be linked. In the UI unit 46 of the terminal device 16, information on the linkage function is displayed. The linkage candidate device specification process and the linkage function specification process may be performed by the terminal device 16.

In a case where a device to be captured cannot be identified even by applying the AR technology or the like, the device image representing the device to be captured may not be displayed on the device display screen. Therefore, the visibility of the identified device is improved. For example, in a case where an identified device and an unidentified device are mixed and each device is captured by the camera 42, the device image representing the unidentified device is not displayed. As a result, since the device image representing the identified device is displayed without being buried in the device image representing the unidentified device, the visibility of the identified device is improved. Further, the device image representing the identified device may be emphasized and displayed. For example, the device image representing the identified device may be displayed in a specific color, the edge of the device image may be emphasized and displayed, the device image may be enlarged and displayed, the device image may be displayed in three dimensions, or the device image may be vibrated and displayed. Therefore, the visibility of the identified device is improved.

Figure 13:
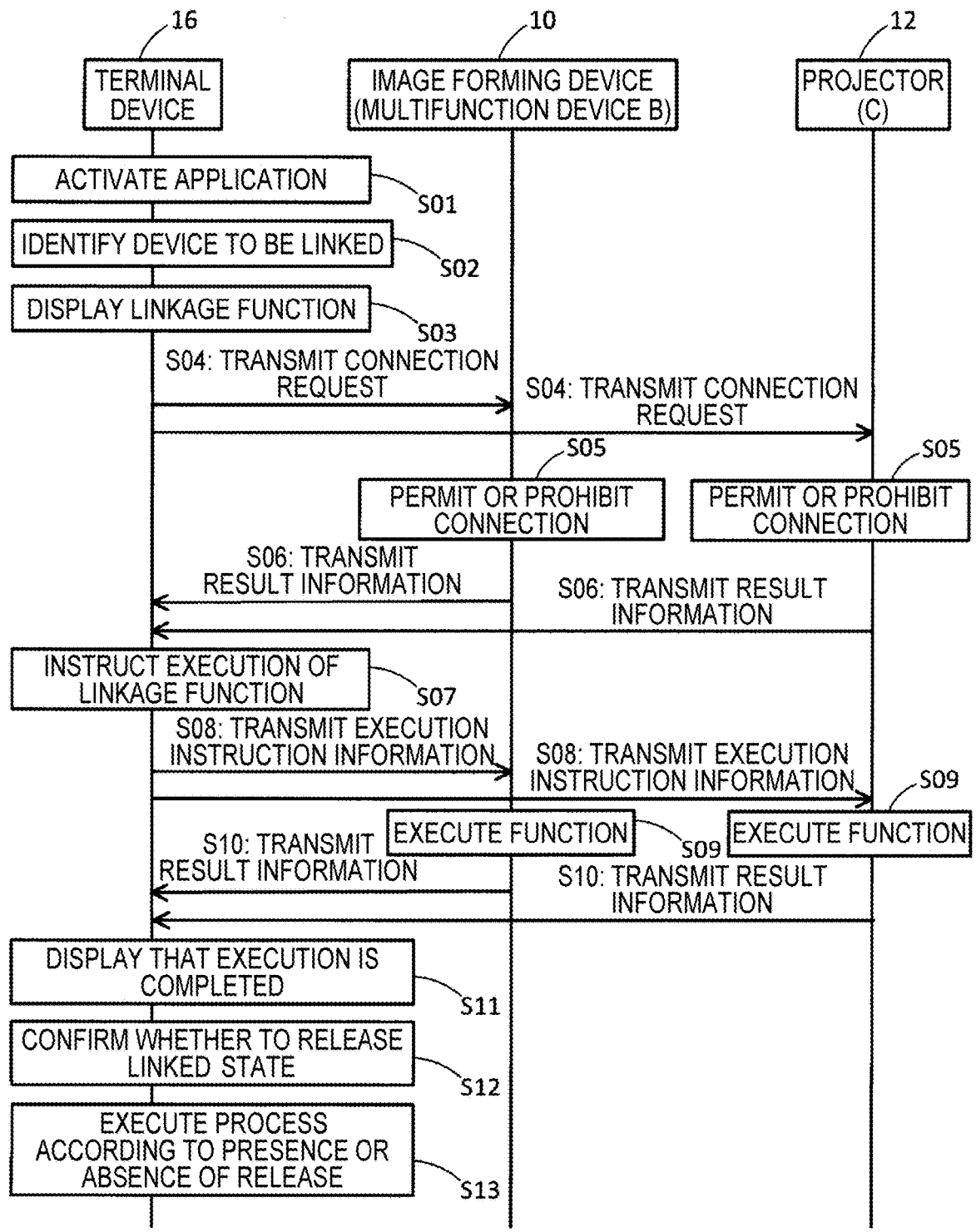
FIG. 13 is a sequence diagram illustrating a connection process.

Hereinafter, the process when executing the function that the device has will be described. As an example, the process when executing the linkage function will be described. In this case, a connection request is transmitted from the terminal device 16 to the device to be linked, and the terminal device 16 and the device to be linked are connected. Hereinafter, the connection process will be described with reference to FIG. 13. FIG. 13 is a sequence diagram illustrating the process.

First, the user uses the terminal device 16 to instruct activation of an application (program) for executing a device function. The control unit 48 of the terminal device 16 activates the application in response to the instruction (S01). The application may be stored in the storage unit 44 of the terminal device 16 in advance, or may be downloaded from the server 14 or the like.

Next, the device to be linked is identified by applying the marker AR technology, the markerless AR technology, or the position information AR technology (S02). Of course, the device to be linked may be identified by a technology other than the AR technology. When the marker AR technology or the markerless AR technology is used, for example, the user captures the device to be linked by the camera 42 of the terminal device 16. As an example, when the image forming device 10 (multifunction device (B)) and the projector 12 (projector (C)) are used as linkage devices, the user captures the image forming device 10 and the projector 12 with the camera 42. The device identification information of each of the image forming device 10 and the projector 12 is acquired and the image forming device 10 and the projector 12 are identified as devices to be linked. When the position information AR technology is applied, the position information of each of the image forming device 10 and the projector 12 is acquired, and the device identification information of each of the image forming device 10 and the projector 12 is specified based on the position information, so that the image forming device 10 and the projector 12 are identified.

For example, when the user gives an instruction to display the linkage function, the linkage function that uses the functions that the plural identified devices have is identified. In the UI unit 46 of the terminal device 16, information on the identified linkage function is displayed (S03). The identification process of the linkage function may be performed by the server 14 or may be performed by the terminal device 16.

Next, when the linkage function to be executed is designated by the user in the terminal device 16, the terminal device 16 transmits information indicating a connection request to the device to be linked (for example, the image forming device 10 and the projector 12) that executes the linkage function (S04). For example, when address information indicating the address of the device to be linked is stored in the server 14, the terminal device 16 acquires the address information of the device to be linked from the server 14. In a case where the device identification information includes address information, the terminal device 16 may acquire each address information from the identification information of the device to be linked. As another example, the terminal device 16 may store the address information of the device to be linked. Of course, the terminal device 16 may acquire the address information of the device to be linked by another method. The terminal device 16 transmits the information indicating the connection request to the device to be linked (for example, the image forming device 10 and the projector 12) using the address information of the device to be linked (for example, the image forming device 10 and the projector 12).

When receiving the information indicating the connection request, the image forming device 10 and the projector 12 permit or do not permit connection with the terminal device 16 (S05). For example, when the image forming device 10 and the projector 12 correspond to devices which are not permitted to connect or devices in which the number of devices requesting connection therewith exceeds an upper limit, connection is not permitted. When the connection from the terminal device 16 is permitted, the changing operation may be prohibited such that setting information unique to the image forming device 10 and the projector 12 is not changed from the terminal device 16. For example, it may be prohibited to change the color parameters of the image forming device 10, the setting time when shifting to power saving, and the like. As a result, the security for the device to be linked is improved. As another example, when linking devices, change of setting information may be restricted compared to a case where the devices are used alone without being linked. For example, it may be permitted to change a smaller number of setting items compared to the case where the device is used alone. In addition, browsing of other users' personal information such as the operation history may be prohibited. As a result, the security for the user's personal information is improved.

Result information indicating permission or non-permission of the connection is transmitted from the image forming device 10 and the projector 12 to the terminal device 16 (S06). When the connection to the image forming device 10 and the projector 12 is permitted, communication is established between the terminal device 16, and the image forming device 10 and the projector 12.

Next, the user uses the terminal device 16 to instruct execution of the linkage function (S07). In response to this instruction, execution instruction information indicating execution instruction of the linkage function is transmitted from the terminal device 16 to the image forming device 10 and the projector 12 (S08). The execution instruction information transmitted to the image forming device 10 includes information indicating a process to be executed by the image forming device 10 (for example, job information), and the execution instruction information transmitted to the projector 12 includes information indicating a process to be executed by the projector 12 (for example, job information).

When receiving the execution instruction information, the image forming device 10 and the projector 12 execute the function according to the execution instruction information (S09). For example, similarly to the function of transferring the scan data from the image forming device 10 (multifunction device (B)) to the projector 12 (PC (A)) and projecting the data by the projector 12, when the linkage function includes a process of transmitting and receiving data between the image forming device 10 and the projector 12, communication is established between the image forming device 10 and the projector 12. In this case, for example, the execution instruction information transmitted to the image forming device 10 includes address information of the projector 12, and the execution instruction information transmitted to the projector 12 includes address information of the image forming device 10. Then, communication is established between the image forming device 10 and the projector 12 using these pieces of address information.

When the execution of the linkage function is completed, information indicating completion of execution of the linkage function is transmitted from the image forming device 10 and the projector 12 to the terminal device 16 (S10). Information indicating that execution of the linkage function has been completed is displayed on the UI unit 46 of the terminal device 16 (S11). When information indicating completion of execution is not displayed even though a preset time has elapsed since the execution instruction is given, the control unit 48 of the terminal device 16 may cause the UI unit 46 to display information indicating an error, and again transmit execution instruction information or information indicating a connection request to the image forming device 10 and the projector 12.

Next, the user confirms whether or not to release the linked state between the image forming device 10 and the projector 12 (S12), and a process is executed according to the presence or absence of the release (S13). When releasing the linked state, the user gives an instruction of release using the terminal device 16. As a result, the communication of the terminal device 16 with the image forming device 10 and the projector 12 is released. Similarly, the communication between the image forming device 10 and the projector 12 is also released. When the linked state is not to be released, the execution instruction may be given continuously.

Further, the number of devices to be linked may be increased. For example, the device identification information of a third device may be acquired, and the linkage function executed by linking the three devices including the image forming device 10 and the projector 12 may be specified. Information indicating that the image forming device 10 and the projector 12 are already identified as a linkage function is stored in the server 14 or the terminal device 16.

The device identification information indicating the device to be linked and the linkage function information indicating the executed linkage function may be stored in the terminal device 16 or the server 14. For example, user account information (user identification information) of the user who uses the terminal device 16 may be acquired, and history information indicating the association between the user account information, the device identification information indicating the device to be linked, and the linkage function information indicating the executed linkage function may be created and stored in the terminal device 16 or the server 14. The history information may be created by the terminal device 16 or may be created by the server 14. By referring to the history information, it is specified what type of device group is used for a certain linkage function to be executed.

The devices to be linked (for example, the image forming device 10 and the projector 12) may store the user account information of the user who has requested the connection and the terminal identification information indicating the terminal device 16 of the connection request source as the history information. The user using the device is specified by referring to this history information. For example, a user may be specified by utilizing the history information in the case of specifying the user who is using the device when the device is broken or in the case of performing the charging process on consumables. The history information may be stored in the server 14 or the terminal device 16 or may be stored in another device.

The user account information is stored, for example, in the storage unit 44 of the terminal device 16 in advance, and the control unit 48 of the terminal device 16 functions as an example of the user identification unit, reads the user account information of the user from the storage unit 44, and identifies the user who uses the terminal device 16. When user account information of plural users is stored in the storage unit 44, the user designates his/her own user account information using the terminal device 16. As a result, the user account information of the user is read and the user is identified. As another example, the control unit 48 of the terminal device 16 may identify the user by reading the user account information of the user logged in to the terminal device 16. As still another example, when only one user account information is stored in the same terminal device 16, the control unit 48 of the terminal device 16 may identify the user by reading the user account information. When the user account is not set and the user account information is not created, the initial setting is performed, so that the user account information is created.

The use history of the linkage function may be managed for each user, and information indicating the linkage function used in the past by the user indicated by the read user account information may be displayed on the UI unit 46 of the terminal device 16. The information indicating the use history may be stored in the terminal device 16 or may be stored in the server 14. In addition, information indicating a linkage function used at a frequency equal to or higher than a preset use frequency may be displayed. The user's effort on the operation related to the linkage function is reduced by providing such a shortcut function.

When a solo function is executed, information indicating an execution instruction of the solo function is transmitted from the terminal device 16 to the device that executes the solo function. The device executes the solo function according to the execution instruction.

Second Exemplary Embodiment

Hereinafter, a device system according to a second exemplary embodiment will be described. The device system according to the second exemplary embodiment has the same configuration as that of the device system according to the first exemplary embodiment. In the second exemplary embodiment, when the use of the device is permitted, that is, when the user or the terminal device 16 is successfully authenticated with respect to the device, the use of linkage function or solo function that is executable using the device is enabled. The determination on the permission of use (that is, the authentication process for the user and terminal device 16) may be performed by the device, by the server 14, or by another device such as an authentication server. Hereinafter, the second exemplary embodiment will be described in detail.

Figure 14:
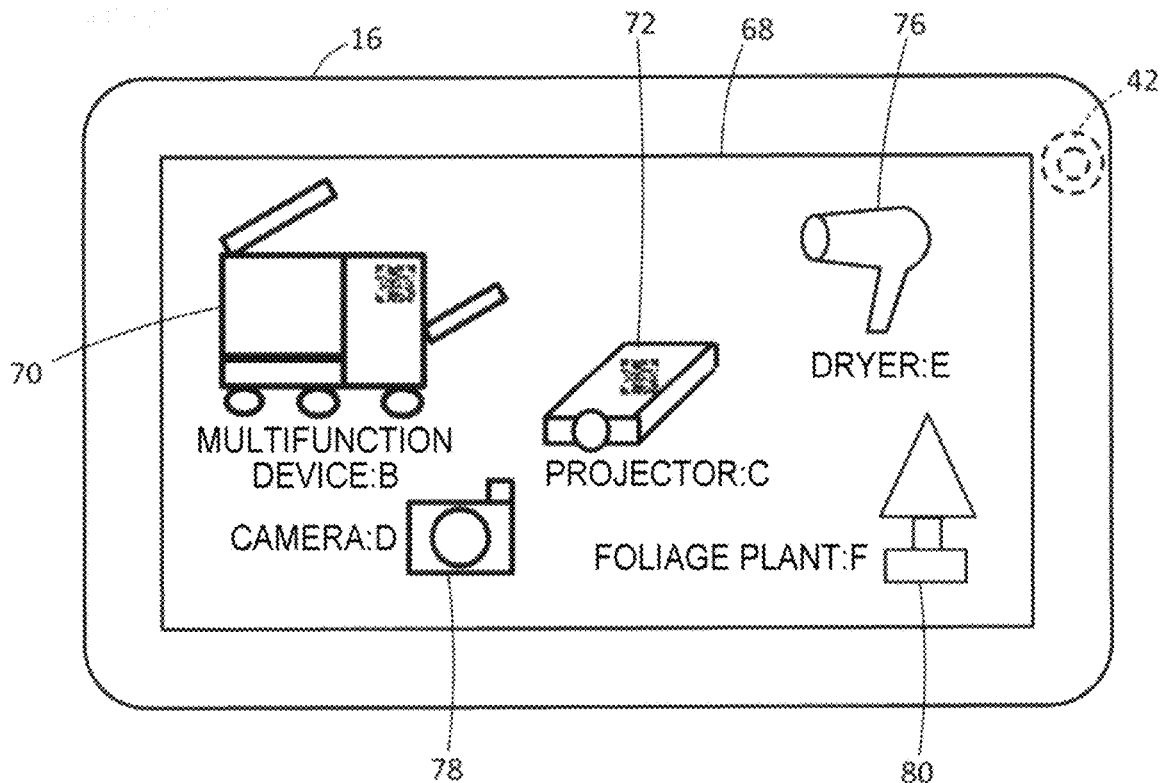
FIG. 14 is a diagram illustrating an example of a device display screen.

FIG. 14 illustrates a device display screen 68. For example, a multifunction device (B), a projector (C), a camera (D), and a dryer (E) are identified as devices, and device images 70, 72, 76, and 78 associated with the identified devices (the multifunction device (B), the projector (C), the camera (D), and the dryer (E)) and images 80 are displayed on the device display screen 68. A foliage plant (F) represented by the image 80 is not identified as a device. The device identification process is the same as the identification process according to the first exemplary embodiment (for example, the identification process using the AR technology). Further, the device image may be an image representing a device obtained by image-capturing, or an image schematically representing the device (for example, an icon).

Figure 15:
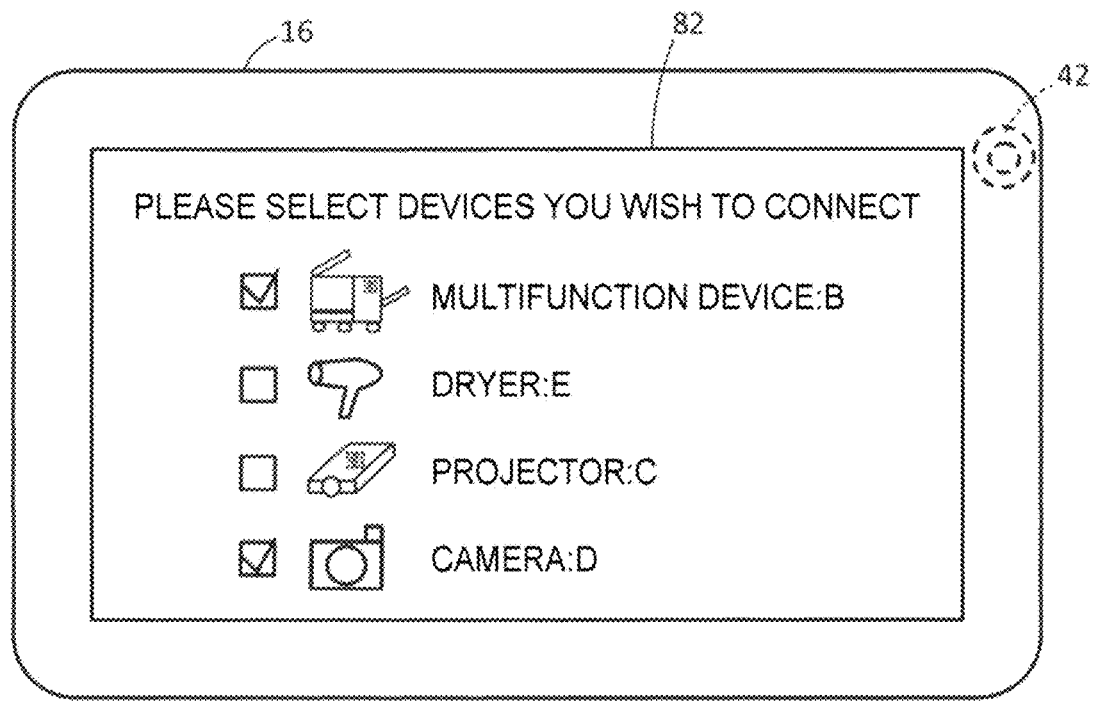
FIG. 15 is a diagram illustrating an example of a device selection screen.

When the device is identified as described above, the control unit 48 of the terminal device 16 causes the UI unit 46 to display the device selection screen. FIG. 15 illustrates a device selection screen 82. The device selection screen 82 is a screen for allowing the user to select a device that the user wishes to be connected (that is, a device that the user wishes to use) from the identified one or plural devices. In the example illustrated in FIG. 14, since the multifunction device (B), the projector (C), the camera (D), and the dryer (E) are identified as the devices, information indicating the devices (for example, device images or device names) is displayed on the device selection screen 82. The user selects the device to be connected on the device selection screen 82. The device selection screen 82 corresponds to an example of a screen on which candidates for the use request target device are displayed, and the device displayed on the device selection screen 82 corresponds to the candidate for the use request target device. In the example illustrated in FIG. 15, a check box is displayed for each device, and the user selects a device to be connected by designating the check box. In the example illustrated in FIG. 15, the multifunction device (B) and the camera (D) are selected by the user, and the multifunction device (B) and the camera (D) correspond to the use request target device (device to be connected).

When the user selects a device to be connected, the terminal device 16 transmits the information indicating the use permission request to the selected device using the address information of the selected device. The use permission request may also be referred to as an authentication request or a connection request. The device that has received the use permission request permits use by the user who made the connection request (that is, permits connection with the terminal device 16) or does not permit use by the user who made the connection request (that is, does not permit connection with the terminal device 16). For example, the information indicating the use permission request includes user identification information (including, for example, user account information, user ID, etc.) for identifying the user who made the connection request, and the device which received the connection request performs the authentication process using the user identification information, thereby determining the presence or absence of use permission. For example, when the user identification information of the user who made the connection request is registered in the device which received the connection request, the authentication succeeds and the use of the device by the user is permitted. When the use of the device is permitted, communication is established between the device and the terminal device 16, and the device and the terminal device 16 are connected. When the user identification information of the user who made the connection request is not registered in the device which received the connection request, the authentication fails and the use of the device by the user is not permitted (is prohibited). In this case, communication is not established between the device and the terminal device 16, and the device and the terminal device 16 are not connected.

As another example, the information indicating the use permission request may include terminal identification information for identifying the terminal device 16 that transmitted the connection request, and the device that received the connection request may perform the authentication process using the terminal identification information, thereby determining the presence or absence of use permission. For example, when the terminal identification information of the terminal device 16 that transmitted the connection request is registered in the device which received the connection request, the authentication succeeds and the use of the device by the terminal device 16 is permitted. For example, when the terminal identification information of the terminal device 16 that transmitted the connection request is not registered in the device which received the connection request, the authentication fails and the use of the device by the terminal device 16 is not permitted (is prohibited).

Result information indicating permission or non-permission of the use is transmitted from the device to be connected to the terminal device 16.

In the example illustrated in FIG. 15, the information indicating the use permission request is transmitted to the multifunction device (B) and the camera (D), the presence or absence of the use permission is determined in each of the multifunction device (B) and the camera (D), and the result information is transmitted from each of the multifunction device (B) and the camera (D) to the terminal device 16.

In addition, when the device to be connected is designated by the user, as in the first exemplary embodiment, the specifying unit 38 of the server 14 specifies (identifies) functions executable using the device to be connected. For example, when plural devices are selected by the user as devices to be connected, the specifying unit 38 of the server 14 refers to the linkage function management information 34 (for example, the linkage function management table illustrated in FIG. 7) and specifies (identifies) a linkage function executable using the plural devices. In the example illustrated in FIG. 15, since the multifunction device (B) and the camera (D) are selected by the user, the linkage function executable using the multifunction device (B) and the camera (D) is specified. Further, when one device is designated by the user as a device to be connected, the specifying unit 38 of the server 14 refers to the device function management information 32 (for example, the device function management table illustrated in FIG. 6) and specifies (identifies) the function (solo function) that the device has. The information indicating the linkage function or the information indicating the solo function is transmitted from the server 14 to the terminal device 16.

Figures 16, 17:
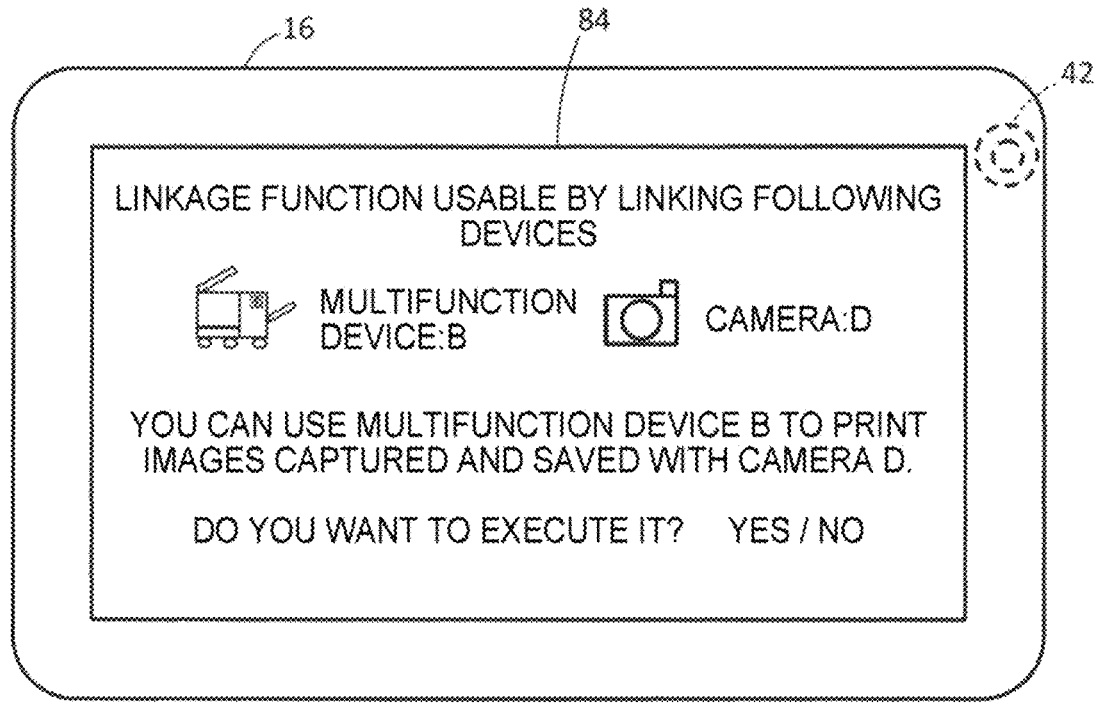
FIG. 16 is a diagram illustrating an example of a function display screen.
FIG. 17 is a diagram illustrating an example of a linkage function management table.

When the use of the device is permitted by the above authentication process, the control unit 48 of the terminal device 16 causes the UI unit 46 to display information indicating the function executable using the device. For example, when the use of the multifunction device (B) and the camera (D) is permitted, the control unit 48 of the terminal device 16 causes the UI unit 46 to display information indicating the linkage function executable using the multifunction device (B) and the camera (D). For example, as illustrated in FIG. 16, the control unit 48 of the terminal device 16 causes the UI unit 46 to display a function display screen 84. Information indicating the linkage function executable using the multifunction device (B) and the camera (D) is displayed on the function display screen 84. When the user gives an instruction to execute the linkage function, the linkage function is executed by the multifunction device (B) and the camera (D). Further, when the communication between the device for executing the linkage function and the terminal device 16 is disconnected so that the connection between the device and the terminal device 16 is released, the control unit 48 of the terminal device 16 erases the function display screen 84 from the UI unit 46. In this case, it is not possible to give an instruction to execute the linkage function.

When the use of the device is not permitted by the above authentication process, the control unit 48 of the terminal device 16 causes the UI unit 46 to display information indicating the fact. At this time, the control unit 48 distinguishes between the information indicating the device permitted to use and the information indicating the device not permitted to use, and causes the UI unit 46 to display the information. For example, when the use of the multifunction device (B) is permitted and the use of the camera (D) is not permitted, information indicating that use of the multifunction device (B) is permitted and information indicating that the use of the camera (D) is not permitted are displayed on the UI unit 46. At this time, information indicating a solo function executable using the multifunction device (B) may be displayed on the UI unit 46.

In addition, when one device is selected by the user on the device selection screen 82 and use of the device is permitted, the solo function that the device has is displayed on the UI unit 46.

The authentication process described above may be performed by the server 14. In this case, the device identification information indicating the device to be connected selected by the user and the information indicating the use permission request are transmitted from the terminal device 16 to the server 14, and the control unit 36 of the server 14 uses the user identification information and the terminal identification information to determine whether or not the use of the device indicated by the device identification information is permitted. For example, for each device, users and terminal devices 16 that can use the device are registered in advance, and the control unit 36 of the server 14 determines whether or not the use is permitted by referring to the registration information. When the user who made the connection request or the terminal device 16 is registered as a user or a terminal device that can use the device to be connected, use of the device is permitted. When the user who made the connection request or the terminal device 16 is not registered as a user or a terminal device that can use the device to be connected, use of the device is not permitted (is prohibited).

The process for specifying the linkage function or the solo function may be performed by the terminal device 16.

In the example illustrated in FIG. 15, two devices are selected, but the same process is performed even when three or more devices are selected. In a case where three or more devices are selected, when two or more devices are permitted to be used, information indicating a linkage function executable using the two or more devices permitted to be used is displayed on the UI unit 46 of the terminal device 16. Therefore, the linkage function varies according to the number and types of devices permitted to be used. When one device is permitted to be used, information indicating the solo function that the one device permitted to be used has is displayed on the UI unit 46 of the terminal device 16.

The above-described process according to the second exemplary embodiment may be applied to a function implemented by software. That is, when the authentication process is performed on the software selected by the user as the software to be used, and the authentication succeeds so that the use of the software is permitted, the linkage function executable using the software or the solo function may be displayed. A screen similar to the screen illustrated in FIG. 15 is displayed as a screen for selecting the software, and candidates for use request target software are displayed on the screen. For example, plural candidates are selected from plural pieces of software installed in the terminal device based on the use history, the user's preference, and the like, and displayed on the screen. Of course, all the installed software may be displayed. Plural pieces of software are selected by the user on the screen. For example, when plural pieces of software are selected by the user and use of the plural pieces of software are permitted, information indicating a linkage function executable using the plural pieces of software are displayed on the UI unit 46 of the terminal device 16. Further, when a single piece of software is selected by the user and use of the single piece of software is permitted, information indicating a function implemented by the single piece of software is displayed on the UI unit 46 of the terminal device 16. Further, the above-described process according to the second exemplary embodiment may be applied to a linkage function that may be executed by combining a device as hardware and a function implemented by software. That is, when the use of both the device to be used and the software to be used is permitted, information indicating the linkage function executable using the device and the software is displayed on the UI unit 46 of the terminal device 16.

As described above, according to the second exemplary embodiment, images associated with candidates for devices to be connected are displayed, and when plural devices are selected by the user from the candidates and the use of the plural devices is permitted, information indicating a linkage function executable using the plural devices is displayed. In this manner, information on usable linkage functions is provided to the user.

In addition, the time limit may be set for the authentication process. For example, when the use of plural devices is permitted within a predetermined time, the control unit 48 of the terminal device 16 causes the UI unit 46 to display information indicating the linkage function executable using the plural devices. Further, when the use of one device is permitted within a predetermined time, the control unit 48 of the terminal device 16 causes the UI unit 46 to display information indicating the solo function that the one device has.

In the case where the multifunction device (B) and the camera (D) are selected as the devices to be connected as illustrated in FIG. 15, when a linkage function executable using the multifunction device (B) and the camera (D) is not registered in the linkage function management table, the specifying unit 38 of the server 14 determines that there is no linkage function executable using the multifunction device (B) and the camera (D). In this case, the control unit 36 of the server 14 outputs a message indicating that the linkage function is unable to be executed by the multifunction device (B) and the camera (D). This message is displayed on the UI unit 46 of the terminal device 16. Even in such a case, the linkage function may be made usable depending on the operation status of the device, the environment in which the device is installed (peripheral environment), the change (update) in the function of the device, and the like. For example, even in a case where the multifunction device (B) and the dryer (E) are selected as the devices to be connected, but initially, there is no linkage function executable by the multifunction device (B) and the dryer (E), the dryer (E) may remove or prevent any dew condensation which may occur in the environment where the multifunction device (B) is installed. In this case, since it is possible to use the linkage function executable using the multifunction device (B) and the dryer (E), information indicating the linkage function may be displayed on the UI unit 46 of the terminal device 16. For example, the control unit 36 of the server 14 may monitor the operation status of each device, the environment (peripheral environment) where each device is set, the update status of the functions of each device, and the like, and determine whether the linkage function is usable or unusable based on the monitoring result. Descriptions will be made on a combination of the multifunction device (B) and the dryer (E) as an example. When the peripheral environment of the multifunction device (B) satisfies a specific condition (for example, when dew condensation occurs in the peripheral environment of the multifunction device (B)), the control unit 36 determines that the linkage function is usable and specify (identify) the linkage function using the dryer (E). The same applies to the operation status of the device, and the control unit 36 determines that, when an identified or designated device group corresponds to a specific operation status, it is possible to use the linkage function using the device group. Further, the same also is true when a function of a device is updated and a linkage function is made usable by the updated function.

Hereinafter, the related process will be described.
(Related Process 1: Display Switching Process of Information on Linkage Function)

Hereinafter, a related process 1 will be described. In the second exemplary embodiment, display of information on linkage functions may be switched according to a selection order of plural devices. Hereinafter, the process will be described in detail with reference to FIGS. 17 to 19.

FIG. 17 illustrates another exemplary linkage function management table as the linkage function management information 34. In the linkage function management table, as an example, the information indicating a combination of the device IDs, the information indicating the names of the devices to be linked (for example, the types of the devices), the information indicating the linkage functions (linkage function information), the information indicating a connection order, and the information indicating a priority order are associated with each other. The device ID and the device name corresponds to an example of the device identification information. The connection order corresponds to the selection order of devices. For example, when the user sequentially selects plural devices on the device selection screen 82 illustrated in FIG. 15, the selection order corresponds to the connection order. The priority order is an order of priority for displaying information on the linkage function. For example, the device of which the device ID is "A" is a PC (personal computer), and the device of which the device ID is "B" is a multifunction device. When the PC (A) and the multifunction device (B) are linked to each other, for example, a "scan transfer function" and a "print function" are implemented as linkage functions. The "scan transfer function" is a function of transferring image data generated by scanning by the multifunction device (B) to the PC (A). The "print function" is a function of transmitting data (for example, image data and document data) saved in the PC (A) to the multifunction device (B) and printing it with the multifunction device (B). For example, when a device is connected from the multifunction device (B) to the PC (A), that is, when the respective devices are selected by the user in the order of the multifunction device (B) and the PC (A), the priority order of the "scan transfer function" is "1st place," and the priority order of the "print function" is "2nd place." In this case, the information on the "scan transfer function" is displayed preferentially over the information on the "print function." Conversely, when a device is connected from the PC (A) to the multifunction device (B), that is, when the respective devices are selected by the user in the order of the PC (A) and the multifunction device (B), the priority order of the "print function" is "1st place," and the priority order of the "scan transfer function" is "2nd place." In this case, the information on the "print function" is displayed preferentially over the information on the "scan transfer function."

Figure 18:
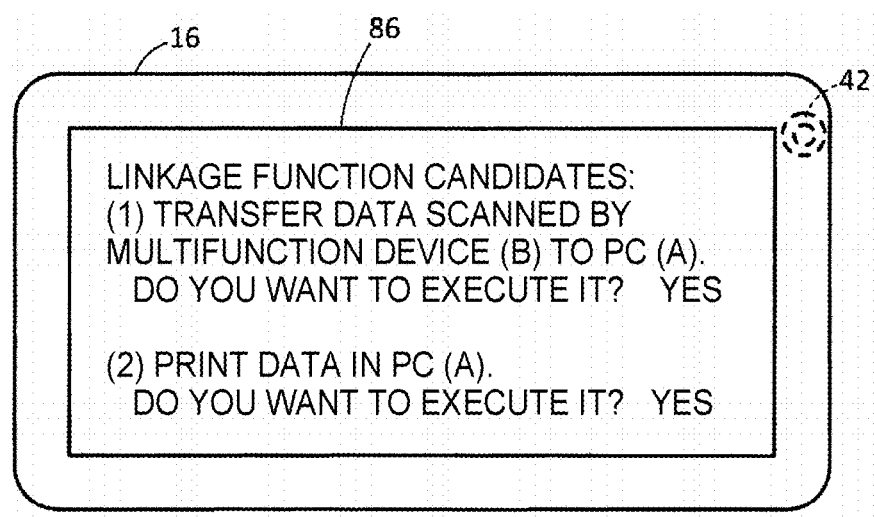
FIG. 18 is a diagram illustrating an example of a function display screen.

FIG. 18 illustrates an example of the screen displayed on the UI unit 46 of the terminal device 16. For example, it is assumed that the multifunction device (B) and the PC (A) are identified and selected by the user as devices to be connected, and the use of the multifunction device (B) and the PC (A) is permitted. For example, when the respective devices are selected by the user in the order of the multifunction device (B) and the PC (A) on the device selection screen 82 illustrated in FIG. 15, the selection order is designated as the connection order. Information indicating the connection order of the devices is transmitted from the terminal device 16 to the server 14.

When the devices to be linked (for example, the multifunction device (B) and the PC (A)) are designated and permitted to be used as described above, the specifying unit 38 of the server 14 specifies the linkage function associated with the combination of the PC (A) and the multifunction device (B) in the linkage function management table illustrated in FIG. 17. Therefore, the linkage function executed by linking the PC (A) and the multifunction device (B) is specified. Further, when the connection order of the devices is designated by the user, the specifying unit 38 specifies the priority order associated with the connection order in the linkage function management table. Descriptions will be made on a specific example with reference to FIG. 17. Since the PC (A) and the multifunction device (B) are designated as devices to be linked, the linkage functions executed by the devices are the "scan transfer function" and the "print function." Further, since the device is connected from the multifunction device (B) to the PC (A) (B→A), the priority order of the "scan transfer function" is "1st place" and the priority order of the "print function" is "2nd place."

Information on the linkage functions specified as described above and information indicating the priority order are transmitted from the server 14 to the terminal device 16. The control unit 48 of the terminal device 16 causes the UI unit 46 to display information on the linkage functions as information on the linkage function candidate according to the priority order.

For example, as illustrated in FIG. 18, the control unit 48 of the terminal device 16 causes the UI unit 46 to display the function display screen 86 and causes the function display screen 86 to display information on the linkage function candidates. Since the priority order of the "scan transfer function" is "1st place" and the priority order of the "print function" is "2nd place," the information on the "scan transfer function" is displayed preferentially over (for example, in a higher place than) the information on the "print function." For example, a description of the "scan transfer function" indicating that "transfer data scanned by multifunction device (B) to PC (A)" is displayed as information on the "scan transfer function." In addition, a description of the "print function" indicating that "print data in PC (A)" is displayed as information on the "print function."

When a linkage function is designated by the user and an execution instruction is given thereto, the designated linkage function is executed. For example, when the "YES" button is pressed by the user, the linkage function associated with the "YES" button is executed. Further, a "RETURN" button is displayed on the function display screen 86, and when the user presses the "RETURN" button, the connection process of the device is canceled.

The linkage function specification process and the priority order specification process may be performed by the terminal device 16.

Figure 19:
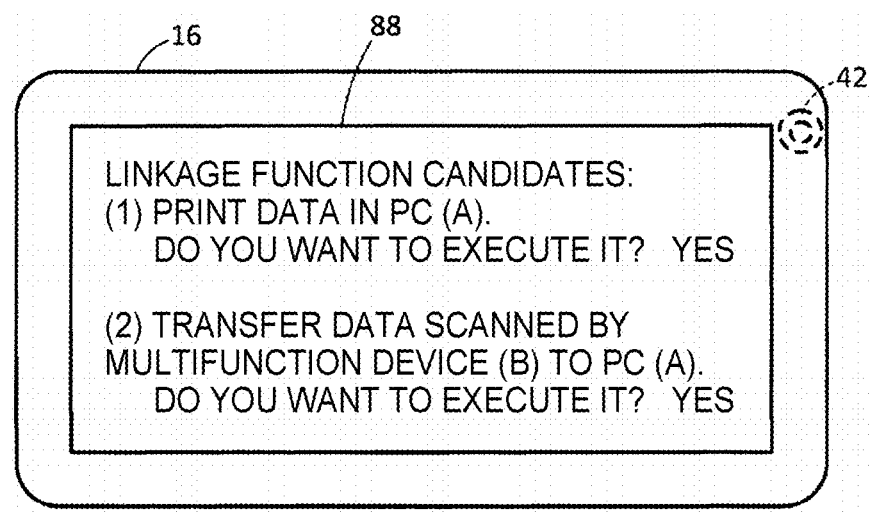
FIG. 19 is a diagram illustrating an example of a function display screen.

FIG. 19 illustrates an example of another operation. For example, when the respective devices are selected by the user in the order of the PC (A) and the multifunction device (B) on the device selection screen 82 illustrated in FIG. 15, the selection order is designated as the connection order. Information indicating the connection order of the devices is transmitted from the terminal device 16 to the server 14. Referring to the linkage function management table illustrated in FIG. 17, the priority order of the "print function" is "1st place," and the priority order of the "scanning transfer function" is "2nd place." In this case, as illustrated in FIG. 19, the information on the "print function" is displayed preferentially over (for example, in a higher place than) the information on the "scan transfer function," on the function display screen 88.

As described above, the display order of the information on the linkage functions is changed according to the selection order of the devices. The connection order of the devices also serves as the order of the functions used by each device and the order of movement of the data moving among the devices to be linked, and the operation of selecting the device also serves as an operation for designating the order of functions and the order of movement of data. Therefore, as the display order of the information on the linkage functions is changed according to the connection order, the information on the linkage functions predicted to be used by the user is preferentially displayed. That is, information on the linkage functions with a high possibility of being used by the user is preferentially displayed. For example, when respective devices are selected in the order of the multifunction device (B) and the PC (A), it is predicted that the user will use the linkage function of "using the function of the multifunction device (B) prior to the PC (A) and transferring the data from the multifunction device (B) to the PC (A)." In addition, when respective devices are selected in the order of the PC (A) and the multifunction device (B), it is predicted that the user will use the linkage function of "using the function of the PC (A) prior to the multifunction device (B) and transferring the data from the PC (A) to the multifunction device (B)." Therefore, as the display order of the information on the linkage functions is changed according to the order of selecting the devices, the information on the linkage functions with a high possibility to be used by the user is preferentially displayed.

The display switching process described above may be applied to a function implemented by software. For example, according to the selection order of the first function implemented by the first software and the second function implemented by the second software on the function selection screen (that is, according to the selection order of the first software and the second software), the display of the information on the linkage functions is switched. Further, the display switching process described above may be applied to a linkage function that may be executed by combining a device as hardware and a function implemented by software.

In the example illustrated in FIGS. 17 to 19, two devices are selected, but even when three or more devices are selected, the display of the linkage functions is switched according to the selection order.

(Related Process 2: Linkage Process Using Portion of Device)

Hereinafter, related process 2 will be described. Different functions may be assigned to respective positions in the device image associated with the device. When the position in the device image is designated by the user, information on the linkage function that uses the function associated with the position designated by the user is displayed. Hereinafter, the process will be described in detail.

Figures 20, 21:
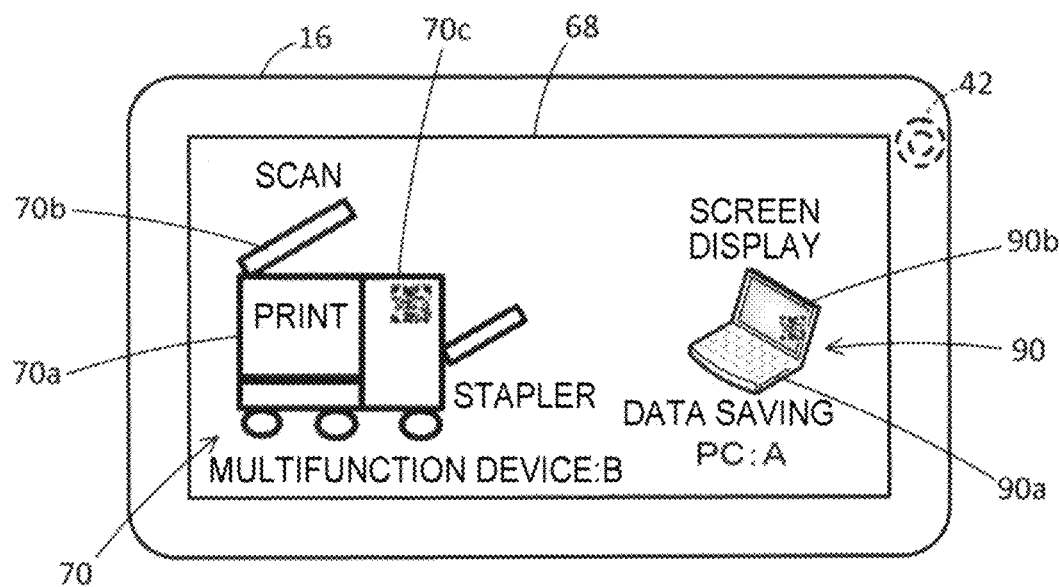
FIG. 20 is a diagram illustrating an example of a device function management table.
FIG. 21 is a diagram illustrating an example of a device display screen.

FIG. 20 illustrates an exemplary device function management table. The data of the device function management table is stored in the server 14 as the device function management information 32. In the device function management table, as an example, the device ID, the information indicating the device name (for example, the type of the device), the information indicating the position in the device image, the information indicating the function associated with the position in the device image (function information), and the image ID are associated with each other. The position in the device image is a specific position (specific portion) in the device image associated with the device. For example, the position in the device image is a specific position in the device image schematically representing the device or a specific position in a device image captured by the camera. Different functions are associated with respective specific positions in the device image.

FIG. 21 illustrates an example of the device display screen 68 displayed on the UI unit 46 of the terminal device 16. For example, the multifunction device (B) and the PC (A) are identified, and device images 70 and 90 are displayed on the device display screen 68. In addition, the portions included in the multifunction device (B) and PC (A) are also identified. The identification of the portions is also implemented using the identification technology (for example, AR technology) according to the first exemplary embodiment. For example, each portion of the device is captured, and each portion is identified by applying the markerless AR technology.

The device image 90 is an image associated with the PC (A). For example, a "print function" is assigned to a specific position (portion image 70a) associated with the main body portion of the multifunction device (B) in the device image 70. A "scan function" is assigned to a specific position (portion image 70b) associated with the document cover, the document glass or the automatic document feeder of the multifunction device (B) in the device image 70. A "stapling function" is assigned to a specific position (portion image 70c) associated with a post-processing device in the device image 70. The "stapling function" is a function of stapling the output paper. Further, a "data saving function" is assigned to a specific position (portion image 90a) associated with the main body portion of the PC (A) in the device image 90. A "screen display function" is assigned to a specific position (portion image 90b) associated with the display portion of the PC (A) in the device image 90. The "data saving function" is a function of saving data transmitted from another device in the PC (A). The "screen display function" is a function of displaying data transmitted from another device on the PC (A).

The control unit 48 of the terminal device 16 may cause the device display screen 68 to display the name of the function (for example, printing, scanning, etc.) assigned to a specific position in the device image. As a result, the user is provided with information that makes it easy to understand what functions are associated with specific positions. Of course, the name of the function need not be displayed.

Figure 22:
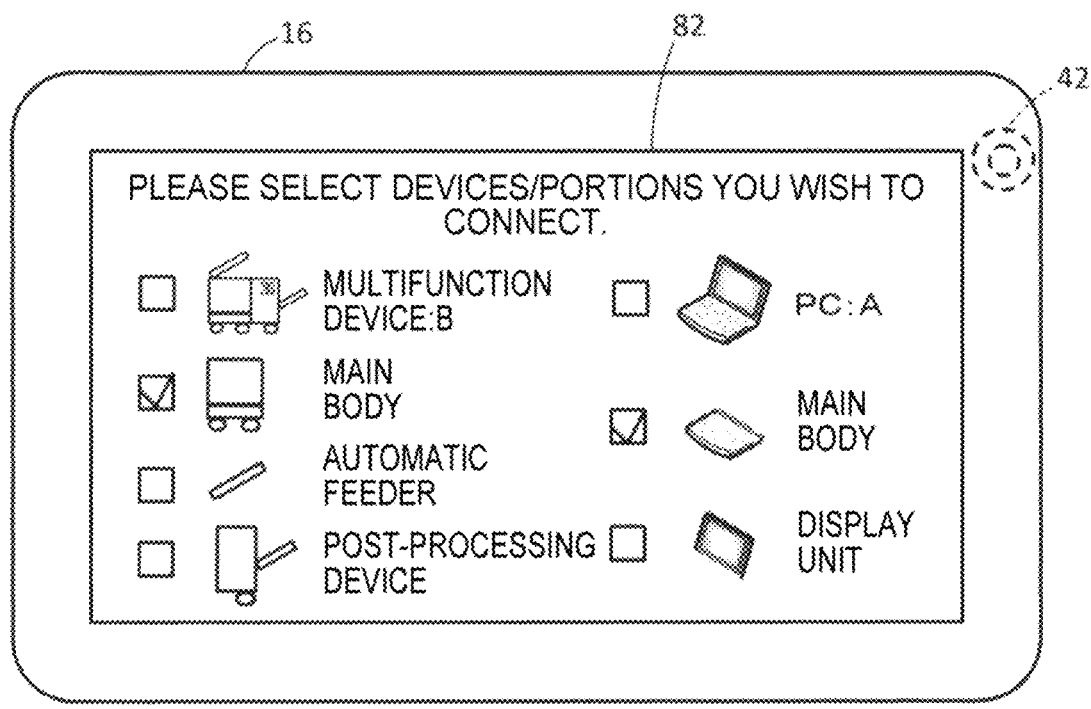
FIG. 22 is a diagram illustrating an example of a device selection screen.

When the device and the respective portions are identified as described above, the control unit 48 of the terminal device 16 causes the UI unit 46 to display the device selection screen. FIG. 22 illustrates a device selection screen 82. In the above-described example illustrated in FIG. 15, the information indicating the device (information indicating the entire device) is displayed on the device selection screen 82, but in the example illustrated in FIG. 22, information indicating the entire device and information on each portion of the device are displayed on the device selection screen 82. In the example illustrated in FIG. 21, since the multifunction device (B) and the PC (A) are identified and further their respective portions are identified, information indicating the entire multifunction device (B), the entire PC (A), each portion of the multifunction device (B), and each portion of the PC (A) (for example, a device image, a portion image of the device, a name, etc.) is displayed on the device selection screen 82.

The user selects the connected device or portion on the device selection screen 82. The device or portion selected here corresponds to the device or portion to be connected. In the example illustrated in FIG. 22, the main body of the multifunction device (B) and the main body of the PC (A) are selected by the user, the multifunction device (B) and the PC (A) correspond to the use request target devices, and the main body of the multifunction device (B) and the main body of the PC (A) correspond to the use request target portions. In this case, when the authentication with respect to the multifunction device (B) and the PC (A) succeeds, use of the multifunction device (B) and the PC (A) is permitted.

Meanwhile, the specifying unit 38 of the server 14 specifies a linkage function executable using the PC (A) and the multifunction device (B), for example, in the linkage function management table illustrated in FIG. 7. Further, the specifying unit 38 specifies the function assigned to the portion (position) designated by the user by referring to the device function management table illustrated in FIG. 20. Then, among the group of linkage functions executable using the PC (A) and the multifunction device (B), the specifying unit 38 raise the priority order of the linkage functions executable using the main body of the PC (A) and the main body of the multifunction device (B) selected by the user, and lowers the priority order of the linkage functions not using them.

Information on the linkage functions specified as described above and information indicating the priority order are transmitted from the server 14 to the terminal device 16. Then, when the use of the multifunction device (B) and the PC (A) is permitted, the control unit 48 of the terminal device 16 causes the UI unit 46 to display information on the linkage functions according to the priority order. In the above example, information indicating the linkage functions executable using the main body of the PC (A) and the main body of the multifunction device (B) is displayed preferentially (for example, in a higher place).

As another example, authentication with respect to the portion selected by the user may be performed. In the above example, when the authentication with respect to the main body of the multifunction device (B) and the main body of the PC (A) succeeds, use of the main body of the multifunction device (B) and the main body of the PC (A) may be permitted. In this case, the control unit 48 of the terminal device 16 causes the UI unit 46 to display information indicating the linkage functions executable using the main body of the multifunction device (B) and the main body of the PC (A). The authentication process described above may be performed by each device or by the server 14.

The linkage function may be a function of using the same device or a combination of portions of different devices, may be a function of using a combination of the entire device and a portion of the device, or may be a function utilizing a combination of the entire devices.

Further, by combining the related processes 1 and 2, display of information on the linkage functions may be switched according to a selection order of the devices or the portions.

Further, when only one device or one portion is selected by the user or permitted to be used, information indicating a solo function executable by the one device or one portion is displayed on the UI unit 46 of the terminal device 16.

According to the linkage process using a portion of the device as described above, it is possible to individually designate the device when the device has plural functions.

(Related Process 3: Another Example of Linkage Process Using Portion of Device)

Hereinafter, another example of the linkage process using portion images will be described as related process 3 with reference to FIGS. 23 and 24.

FIG. 23 illustrates an exemplary device function management table. The data of the device function management table is stored in the server 14 as the device function management information 32. In the device function management table, as an example, a device ID, information indicating the device name (for example, the type of the device), information indicating a name of a portion of the device (for example, the type of the portion), a portion ID as portion identification information for identifying the portion, information indicating a function assigned to the portion (a function that the portion has), and a portion image ID for identifying the portion image associated with the portion are associated with each other. The portion image is an image representing the external appearance of the portion of the device obtained by capturing by the camera. Of course, a portion image that schematically representing a portion of the device may be associated with the portion. For example, different functions are assigned to respective portions of the device.

To describe with a specific example, a screen display function is assigned to the display unit of the PC (A), and information indicating the screen display function are associated with the portion image ID of the portion image associated with the display unit. The screen display function is a function of displaying the information on the PC (A). A data saving function is assigned to the main body portion of the PC (A), and information indicating the data saving function is associated with the portion image ID of the portion image associated with the main body portion. The data saving function is a function of saving data in the PC (A).

Further, a print function is assigned to the main body portion of the multifunction device (B), and information indicating the print function is associated with the portion image ID of the portion image associated with the main body portion. A scan function is assigned to the reading unit of the multifunction device (B) (for example, a portion associated with the document cover, the document glass, or the automatic document feeder of the multifunction device (B)), and information indicating the scan function is associated with the portion image ID of the portion image associated with the reading unit. A stapling function is assigned to the post-processing device of the multifunction device (B), and information indicating the stapling function is associated with the portion image ID of the portion image associated with the post-processing device. The stapling function is a function of binding the output paper with a staple.

The function assigned to a portion of the device is specified (identified), for example, using the markerless AR technology. For example, when a portion of the device is captured by a camera (for example, the camera 42 of the terminal device 16), external appearance image data representing the portion is transmitted from the terminal device 16 to the server 14. The specifying unit 38 of the server 14 specifies (identifies) the function associated with the external appearance image data in the device function management table. As a result, the function assigned to the captured portion is specified (identified). For example, when the main body portion of the multifunction device (B) is captured by the camera 42, external appearance image data representing the main body of the multifunction device (B) is transmitted from the terminal device 16 to the server 14. The specifying unit 38 of the server 14 specifies (identifies) the print function associated with the external appearance image data in the device function management table. As a result, it is specified that the function assigned to the main body portion of the multifunction device (B) is the print function.

Of course, the function assigned to a portion of the device may be specified (identified) using the marker AR technology. For example, a marker such as a two-dimensional barcode in which portion identification information (for example, a portion ID) for identifying a portion is encoded is provided in each portion of the device. When the marker provided in the portion is captured by the camera and the marker AR technology is applied, portion identification information (for example, a portion ID) of the portion is acquired. Application of the marker AR technology may be performed by the terminal device 16 or may be performed by the server 14. When the portion identification information is thus acquired, the specifying unit 38 of the server 14 specifies (identifies) the function associated with the portion identification information (for example, the portion ID) in the device function management table.

FIG. 24 illustrates an exemplary linkage function management table. The data of the linkage function management table is stored in the server 14 as the linkage function management information 34. The linkage function management table is information indicating a linkage function that uses functions that plural portions have. In the linkage function management table, as an example, information indicating a combination of portions of the device, information indicating a combination of portion IDs, and information indicating a linkage function using functions that plural portions included in the combination have are associated with each other. Of course, in the linkage function management table, information indicating a combination of a portion of a device and an entire device, and information indicating a linkage function using a function that the portion of the device has and a function that the entire device has may be associated with each other.

To describe with a specific example, a print function as a linkage function is assigned to a combination of the display unit of the PC (A) and the main body portion of the multifunction device (B), and information indicating the print function as a linkage function is associated with information indicating a combination of the portion ID of the display unit of the PC (A) and the portion ID of the main body portion of the multifunction device (B). The print function as a linkage function is, for example, a function of transmitting data saved in the PC (A) to the multifunction device (B) and printing the data by the multifunction device (B).

Further, a print function as a linkage function is assigned to a combination of the main body portion of the multifunction device (B) and the main body portion of the projector (C), and information indicating the print function as a linkage function is associated with information indicating a combination of the portion ID of the main body portion of the multifunction device (B) and the portion ID of the main body portion of the projector (C). The print function as a linkage function is, for example, a function of transmitting data projected by the projector (C) to the multifunction device (B) and printing the data by the multifunction device (B).

Further, a scan projection function as a linkage function is assigned to a combination of the reading unit of the multifunction device (B) and the main body portion of the projector (C), and information indicating the scan projection function as a linkage function is associated with information indicating a combination of the portion ID of the reading unit of the multifunction device (B) and the portion ID of the main body portion of the projector (C). The scan projection function as a linkage function is, for example, a function of transmitting data generated by scanning by the multifunction device (B) to the projector (C) and projecting the data by the projector (C).

The linkage function may be a function that uses functions that plural portions included in the same device have or a function that uses functions that portions of plural different devices have. Further, the linkage function may be a function that uses functions that three or more portions have.

For example, when plural portions of the device (for example, plural portions of plural different devices or plural portions of the same device) are specified (identified) using the marker AR technology or the markerless AR technology, the specifying unit 38 of the server 14 specifies (identifies) the linkage function associated with a combination of the identified plural portions in the linkage function management table. Therefore, the linkage function using the functions that the identified (for example, captured) plural portions have is specified (identified). For example, when the main body portion of the multifunction device (B) and the main body portion of the projector (C) are captured by the camera 42 of the terminal device 16 to identify the main body portion of the multifunction device (B) and the main body portion of the projector (C), the specifying unit 38 of the server 14 specifies the print function and the like as a linkage function associated with the combination of the main body portion of the multifunction device (B) and the main body portion of the projector (C) in the linkage function management table.

Even in the process using FIGS. 23 and 24, when a device or portion is identified, the device selection screen 82 is displayed on the UI unit 46 of the terminal device 16 as illustrated in FIG. 22. When a device or a portion is selected by the user on the device selection screen 82 and the use of the selected device or portion is permitted, information indicating a linkage function executable using the selected device or portion is displayed on the UI unit 46 of the terminal device 16.

Third Exemplary Embodiment

Hereinafter, a device system according to a third exemplary embodiment will be described. The device system according to the third exemplary embodiment has the same configuration as that of the device system according to the first exemplary embodiment. In the third exemplary embodiment, similarly to the second exemplary embodiment, when the use of the device is permitted, that is, when the user or the terminal device 16 is successfully authenticated with respect to the device, the use of linkage function or solo function that is executable using the device is enabled. The determination on the permission of use (that is, the authentication process for the user and terminal device 16) may be performed by the device, by the server 14, or by another device such as an authentication server. In the third exemplary embodiment, communication is performed between the terminal device 16 and each device, for example, using near-field wireless communication to implement device identification and authentication of the user or the terminal device 16. Hereinafter, the third exemplary embodiment will be described in detail.

FIG. 25 illustrates devices. As an example, a PC (A), a multifunction device (B), a projector (C), and a terminal device 16 are illustrated. The terminal device 16 is, for example, a portable terminal device such as a smartphone or a mobile phone. A near-field wireless module 91*a* is provided in the PC (A), a near-field wireless modules 91*b*, 91*c*, and 91*d* are provided in the multifunction device (B), and a near-field wireless module 91*e* is provided in the projector (C). Each near-field wireless module is a communication interface having a function of performing near-field wireless communication. Further, a communication unit 40 of the terminal device 16 has a function of performing near-field wireless communication.

Hereinafter, the procedure when using the devices will be described. First, the user activates an application installed in the terminal device 16 (an application for using a linkage function or a solo function), and brings the terminal device 16 closer to the near-field wireless module installed in a device to be connected up to a distance in which the near-field wireless communication is established between the near-field wireless module installed in the device to be connected and the terminal device 16. At this time, the user may physically bring the terminal device 16 into contact with a place where the near-field wireless module is installed in the device, or bring the terminal device 16 closer to the place until the distance in which the near-field wireless communication is established without physically bringing the terminal device 16 in contact with the place. Hereinafter, the operation of bringing the terminal device 16 closer to the near-field wireless module up to the distance in which the near-field wireless communication is established between the near-field wireless module and the terminal device 16 will be referred to as a "touch operation" for the convenience of description.

When a touch operation is performed on the device, sound or light may be generated from the device or the terminal device 16, or the device or the terminal device 16 may vibrate. Thus, the user is notified that the touch operation has been properly performed.

When the near-field wireless communication is established between the near-field wireless module installed in the device to be connected and the terminal device 16, information indicating a use permission request (for example, information including user identification information or terminal identification information) is transmitted from the terminal device 16 to the device to be connected by the near-field wireless communication, and an authentication process is performed on the device to be connected, as in the second exemplary embodiment. Hereinafter, the authentication process by the touch operation will be referred to as a "touch authentication" for the convenience of description.

When the authentication succeeds and the use of the device to be connected is permitted, result information including the information indicating permission of use and device identification information for identifying the device to be connected (including the address information of the device) is transmitted from the device to be connected to the terminal device 16 by the near-field wireless communication. As a result, the device identification information of the device to be connected is stored in the terminal device 16 as device identification information of a usable device. Further, the terminal device 16 transmits the device identification information of the device to be connected to the server 14. Therefore, in the server 14, the device to be connected is identified, and the function that the device has is specified.

When the authentication fails and the use of the device to be connected is not permitted, information indicating non-permission is transmitted from the device to be connected to the terminal device 16. The UI unit 46 of the terminal device 16 displays information indicating authentication failure, unavailability, or the like.

Similarly to the second exemplary embodiment, the authentication process described above may be performed by the server 14. In this case, the terminal device 16 acquires the device identification information from the device to be connected by near-field wireless communication, and transmits the device identification information and the information indicating the use permission request to the server 14. When the server 14 performs the authentication process and the authentication succeeds, it is possible to use the function using the device to be connected.

When plural devices are identified by repeating the above operations, the specifying unit 38 of the server 14 refers to the linkage function management information 34 (for example, the linkage function management table illustrated in FIG. 7) to specify a linkage function executable using the plural devices. The information indicating the linkage function is transmitted from the server 14 to the terminal device 16 and displayed on the UI unit 46 of the terminal device 16.

In addition, when the touch operation is performed once again on a device that has been identified once so that near-field wireless communication is established again between the device that has been identified once and the terminal device 16, the device may be excluded from the device to be connected (for example, the device used for the linkage function or the device for executing the solo function). When near-field wireless communication is established again between the device that has been identified once and the terminal device 16, the terminal device 16 acquires the device identification information from the device and transmits the device identification information to the server 14. Upon receiving the device identification information, the server 14 excludes the device indicated by the device identification information from the devices to be used. When plural devices in addition to the excluded device are identified, the specifying unit 38 of the server 14 specifies a linkage function executable using the plural devices, and when one device in addition to the excluded device is identified, the specifying unit 38 of the server specifies a solo function executable by the one device. The information indicating the function thus specified (the linkage function or solo function) is transmitted from the server 14 to the terminal device 16 and displayed on the UI unit 46 of the terminal device 16.

Figure 26:
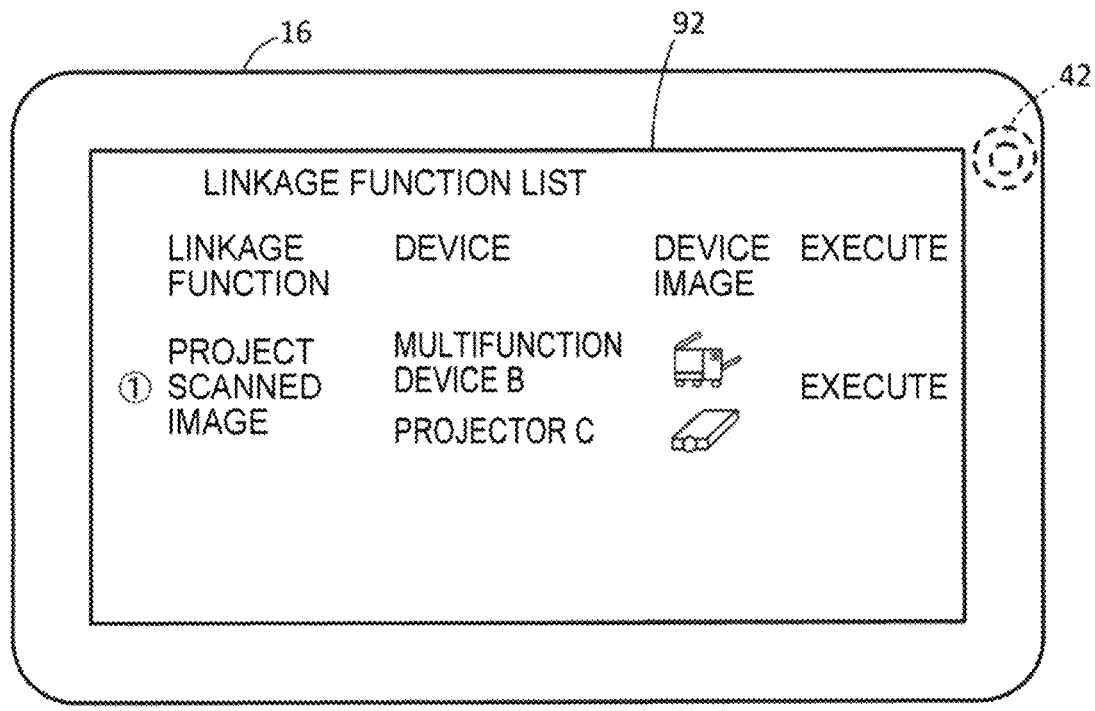
FIG. 26 is a diagram illustrating an example of a function display screen.
Figure 27:
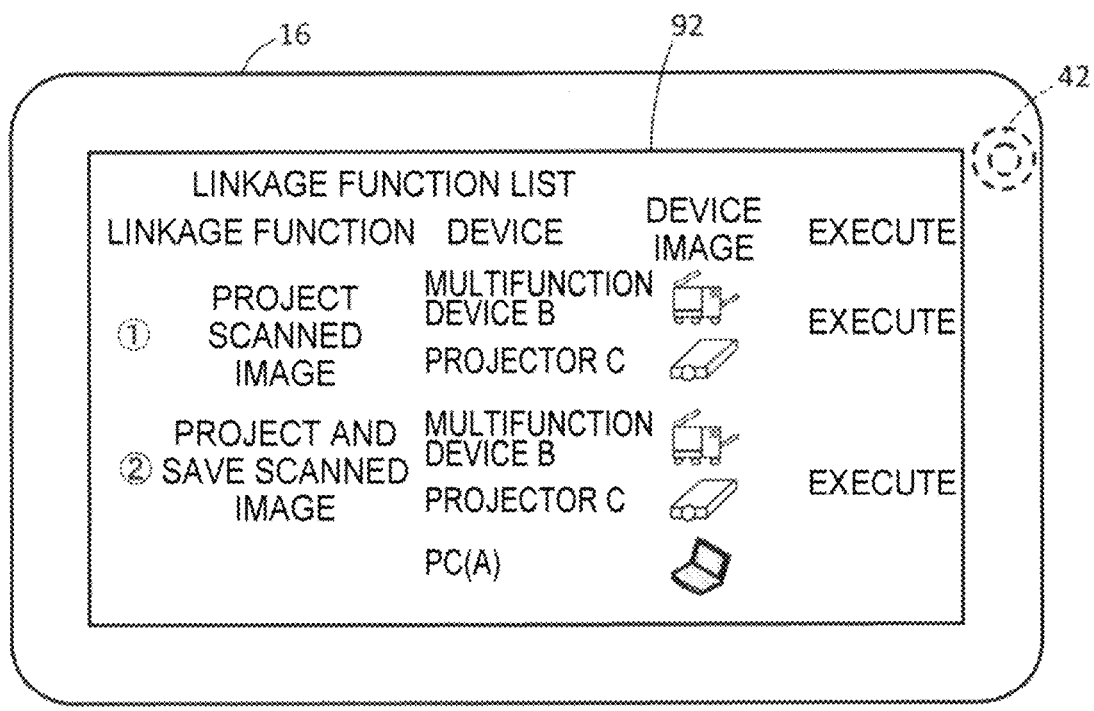
FIG. 27 is a diagram illustrating an example of a function display screen.

Hereinafter, a specific example will be described with reference to FIGS. 26 and 27. FIGS. 26 and 27 are diagrams each illustrating an example of a function display screen.

For example, it is assumed that the user performs a touch operation on the multifunction device (B) and the projector (C), the authentication to the multifunction device (B) and the projector (C) succeeds, and the use of these devices is permitted. In this case, as illustrated in FIG. 26, a function display screen 92 is displayed on the UI unit 46 of the terminal device 16, and information indicating a linkage function executable using the multifunction device (B) and the projector (C) is displayed on the function display screen 92. When the user gives an instruction to execute the linkage function on the function display screen 92, the linkage function is executed. Plural near-field wireless modules are provided in the multifunction device (B), and near-field wireless communication is established between one near-field wireless module among them and the terminal device 16, thereby transmitting and receiving information using the near-field wireless communication between the multifunction device (B) and the terminal device 16.

When the near-field wireless communication is established again between the multifunction device (B) that has been identified once and the terminal device 16, the multifunction device (B) is excluded from the device to be connected. In this case, when only the projector (C) is identified, information indicating the function (solo function) that the projector (C) has is displayed on the UI unit 46 of the terminal device 16. The same is true also in the case where the near-field wireless communication is established again between the projector (C) and the terminal device 16.

As described above, according to the third exemplary embodiment, the device is identified by a simple operation such as a touch operation, the user and the terminal device 16 are authenticated, and information indicating the linkage function is displayed.

In addition, when applying the above-described related process 1, the display of information on the linkage function may be switched according to the order of the touch operation to each device, that is, according to the order of identification of each device (that is, according to the order of devices for which the use permission request for is made). For example, in the case where a touch operation is performed in the order of the multifunction device (B) and the projector (C) to identify each device and in the case where a touch operation is performed in the order of the projector (C) and the multifunction device (B) to identify each device, information indicating different linkage functions may be displayed.

Further, when applying the related process 2 or the related process 3, a portion of a device may be identified, and information indicating a linkage function executable using the portion may be displayed. For example, a near-field wireless module is provided in each portion of the device, and the near-field wireless module transmits portion identification information (for example, a portion ID) for identifying a portion in which the near-field wireless module is installed to a partner of the near-field wireless communication (for example, the terminal device 16). Therefore, portion identification information for identifying each portion is acquired, and each portion is identified.

In the example illustrated in FIG. 25, a near-field wireless module is provided in each portion of the multifunction device (B). Specifically, the near-field wireless module 91b is provided in the main body portion of the multifunction device (B), the near-field wireless module 91c is provided in the scan portion of the multifunction device (B), and the near-field wireless module 91d is provided in the post-processing device of the multifunction device (B). For example, when the user performs a touch operation on the place where the near-field wireless module 91b is installed so that near-field wireless communication is established between the terminal device 16 and the near-field wireless module 91b, information indicating the use permission request is transmitted from the terminal device 16 to the near-field wireless module 91b by the near-field wireless communication, and an authentication process is performed in the multifunction device (B). The authentication process is a process for determining whether or not to permit use of the main body portion provided with the near-field wireless module 91b. When the authentication succeeds, that is, when the use of the main body portion is permitted, the information indicating permission of use, the device identification information of the multifunction device (B), and the portion identification information of the main body portion are transmitted from the multifunction device (B) to the terminal device 16 by near-field wireless communication. The device identification information and the portion identification information are transmitted to the server 14, and the multifunction device (B) and the main body portion are identified in the server 14, so that the function that the main body portion has is specified.

When plural portions are identified by repeating the above operations, the specifying unit 38 of the server 14 refers to the linkage function management information 34 (for example, the linkage function management table illustrated in FIG. 23) to specify a linkage function executable using the plural portions. The information indicating the linkage function is transmitted from the server 14 to the terminal device 16 and displayed on the UI unit 46 of the terminal device 16. The plural portions may be selected from the same device or may be selected from plural different devices. Of course, a portion of the device and the whole of the device may be selected and information indicating a linkage function executable by a combination of the portion and the whole may be displayed.

In addition, when the touch operation is performed once again on a portion that has been identified once so that near-field wireless communication is established again between the portion that has been identified once and the terminal device 16, the portion may be excluded from the portion to be connected (for example, the portion used for the linkage function or the portion for executing the solo function). When near-field wireless communication is established again between the near-field wireless module provided in the portion that has been identified once and the terminal device 16, the terminal device 16 acquires the device identification information and the portion identification information from the near-field wireless module and transmits the device identification information and the portion identification information to the server 14. Upon receiving the device identification information and the portion identification information, the server 14 excludes the portion indicated by the portion identification information in the device indicated by the device identification information from the portions to be used. When plural devices or portions in addition to the excluded portion are identified, the specifying unit 38 of the server 14 specifies a linkage function executable using the plural devices or portions, and when one device or portion in addition to the excluded device is identified, the specifying unit 38 of the server 14 specifies a solo function executable by the one device or portion. The information indicating the function thus specified (the linkage function or solo function) is transmitted from the server 14 to the terminal device 16 and displayed on the UI unit 46 of the terminal device 16.

A combination of the related process 1 and the related process 2 described above or a combination of the related process 1 and the related process 3 may be applied. In this case, the display of information on the linkage function may be switched according to the order of the touch operation to the portions of the device, that is, according to the order of identification of the portions of the device (that is, according to the order of the portions of the devices for which the use permission request is made).

When the use of the device is not permitted, a device permitted to be used may be announced. When use of a device is not permitted, device identification information of the device and information indicating the non-permission are transmitted from the device to the terminal device 16, and the device identification information and the information indicating the non-permission are transmitted from the terminal device 16 to the server 14. For example, the server 14 transmits the device identification information indicating the device which is, for example, the same type as the device that is not permitted to be used and is usable by the user of the terminal device 16 or the terminal device 16 to the terminal device 16. The UI unit 46 of the terminal device 16 displays device identification information indicating usable devices. Information indicating locations where usable devices are installed may be displayed.

Similarly, when use of a portion of a device is not permitted, a portion of the device permitted to be used may be announced. When use of a portion of a device is not permitted, device identification information of the device, portion identification information of the portion, and information indicating the non-permission are transmitted from the device to the terminal device 16, and also transmitted to the server 14. For example, the server 14 transmits the device identification information indicating the device, for example, which has the same kind of portion that is not permitted to be used, is the same type as the device that is not permitted to be used, and is usable by the user of the terminal device 16 or the terminal device 16 to the terminal device 16. The UI unit 46 of the terminal device 16 displays device identification information indicating usable devices. Information indicating locations where usable devices are installed may be displayed.

Further, the UI unit 46 of the terminal device 16 may display information indicating a function (a linkage function or a solo function) executable using a device on which a touch operation has been performed within a predetermined time limit. The start time point of the time limit may be, for example, a time point at which the touch authentication succeeds for the first time, or may be a time point designated by the user. The end time point of the time limit may be, for example, a time point at which a predetermined time elapses from the time point at which the touch authentication succeeds for the first time, or may be a time point designated by the user. The length of the time limit may be changed by the user. The specifying unit 38 of the server 14 specifies a function executable using the device of which the touch authentication has succeeded within the time limit. When touch authentication with respect to plural devices succeeds within the time limit, the specifying unit 38 specifies a linkage function executable using the plural devices, and the information indicating the linkage function is displayed on the UI unit 46 of the terminal device 16. When touch authentication with respect to one device succeeds within the time limit, the specifying unit 38 specifies a function (a solo function) that the one device has, and the information indicating the solo function is displayed on the UI unit 46 of the terminal device 16.

For example, when touch authentication with respect to the multifunction device (B) and the projector (C) succeeds within the time limit, as illustrated in FIG. 26, the information indicating the linkage function executable using the multifunction device (B) and the projector (C) is displayed on the UI unit 46 of the terminal device 16. When the touch authentication with respect to the multifunction device (B), the projector (C), and the PC (A) newly succeeds after the time limit has elapsed, the linkage function executable using the multifunction device (B), the projector (C), and the PC (A) is specified in the server 14. In this case, as illustrated in FIG. 27, information indicating the linkage function is displayed on the function display screen 92. In the example illustrated in FIG. 27, the linkage function specified earlier (the linkage function executable using the multifunction device (B) and the projector (C)) is displayed as the first linkage function, and the linkage function specified later (the linkage function executable using the multifunction device (B), the projector (C), and the PC (A)) is displayed as the second linkage function. Of course, the display order is not limited to this order, and the linkage function specified earlier may be displayed in a place lower than the linkage function specified later.

The time limit may be applied to the touch authentication for a portion of the device. In this case, similarly to the above case, when touch authentication with respect to plural portions succeeds within the time limit, information indicating a linkage function executable using the plural portions is displayed on the UI unit 46 of the terminal device 16.

Fourth Exemplary Embodiment

Hereinafter, a device system according to a fourth exemplary embodiment will be described. The device system according to the fourth exemplary embodiment has the same configuration as that of the device system according to the first exemplary embodiment. In the fourth exemplary embodiment, information indicating devices necessary for executing a linkage function is displayed on the UI unit 46 of the terminal device 16, and when communication with the device is performed using near-field wireless communication, execution of the linkage function executable using the devices is controlled.

Figure 28:
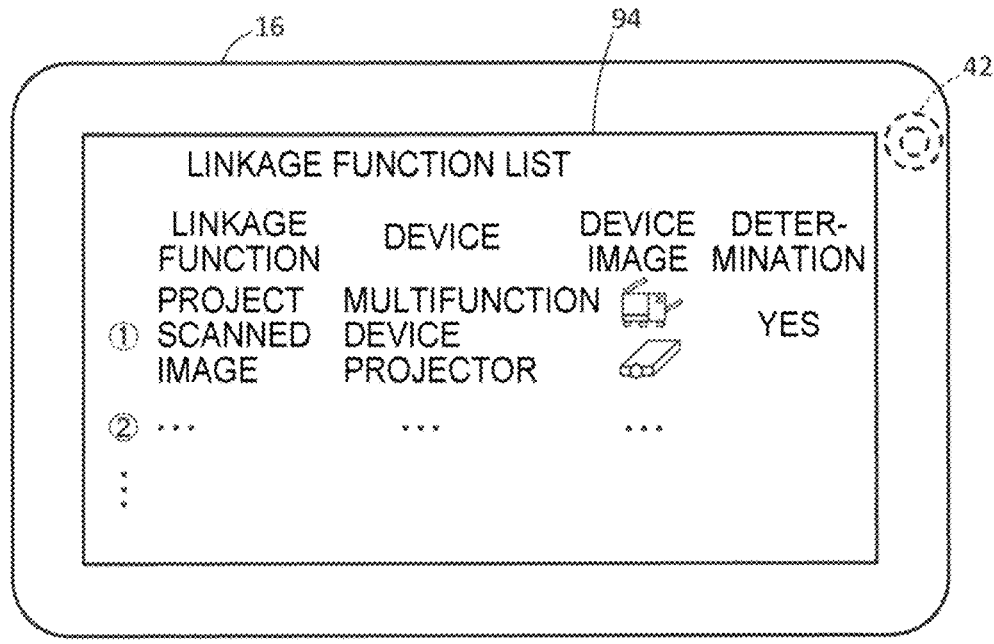
FIG. 28 is a diagram illustrating an example of a function display screen.

Hereinafter, the procedure when using the devices in the fourth exemplary embodiment will be described. First, the user activates an application installed in the terminal device 16 (an application for using a linkage function or a solo function). As a result, the UI unit 46 of the terminal device 16 displays a list of linkage functions. For example, as illustrated in FIG. 28, the control unit 48 of the terminal device 16 causes the UI unit 46 to display a function display screen 94 and causes the function display screen 94 to display the list of linkage functions. The user selects a linkage function to be executed from the list. Of course, the user may directly input information indicating the linkage function to be executed to the terminal device 16. The function display screen 94 displays, for each linkage function, information indicating devices necessary for executing the linkage function. For example, a "multifunction device" and a "projector" are necessary in order to execute a function of "projecting a scanned image" as a linkage function. Information indicating the list of linkage functions and device identification information of each device necessary for executing each linkage function are transmitted, for example, from the server 14 to the terminal device 16 and displayed on the UI unit 46. Of course, the information may be stored in advance in the terminal device 16.

A device necessary for executing the linkage function may be defined by the type of the device (for example, the type of the device such as a "multifunction device" or a "projector"), may be defined by a model number of the device, or may be defined by information for uniquely identifying the device (for example, a name unique to each device, a unique ID, etc.). When a device necessary for executing the linkage function is defined by the type of device, information indicating the type of the device (for example, a "multifunction device") is displayed on the function display screen 94 as the necessary device. When a device necessary for executing the linkage function is defined by a specific device, a unique name for identifying the specific device (for example, "multifunction device (B)" or the like) or a unique ID is displayed on the function display screen 94.

When the user selects a linkage function to be executed (for example, when the user selects a decision button "YES" associated with the linkage function to be executed) on the function display screen 94, the linkage function to be executed is determined, and a device necessary for executing the linkage function is determined. Thereafter, the user performs a touch operation as in the third exemplary embodiment. When the touch operation is performed, the device identification information (including the address information of the device) is transmitted from the device on which the touch operation is performed to the terminal device 16, and the device on which the touch operation has been performed is identified based on the device identification information. The identification process may be performed by the server 14 or may be performed by the terminal device 16 as in the above-described exemplary embodiment. Further, authentication of the user or the terminal device 16 to the device may be performed by touch authentication as in the third exemplary embodiment, or such authentication may not be performed.

In the case where the device necessary for executing the linkage function is defined by the type of the device, when the type of the device indicated by the device identification information transmitted from the device on which the touch operation has been performed to the terminal device 16 matches the type of the device necessary for executing the linkage function, it is determined that the device on which the touch operation is performed is a device necessary for executing the linkage function. When they do not match, it is determined that the device on which the touch operation has been performed is not a device necessary for executing the linkage function. The determination process may be performed by the control unit 48 of the terminal device 16 or may be performed by the control unit 36 of the server 14.

In the case where the device necessary for executing the linkage function is defined by a specific device, when the name, the unique ID, or the like of the device indicated by the device identification information transmitted from the device on which the touch operation has been performed to the terminal device 16 matches the name, the unique ID, or the like of the device necessary for executing the linkage function, it is determined that the device on which the touch operation is performed is a device necessary for executing the linkage function. When they do not match, it is determined that the device on which the touch operation has been performed is not a device necessary for executing the linkage function.

Even when the model number or the like of the device is used, a similar process is performed to determine whether the device on which the touch operation has been performed corresponds to the device necessary for executing the linkage function.

In the case where the touch operation is performed on all the devices necessary for executing the linkage function selected by the user to identify all the devices, that is, when it is determined that the touch operation has been performed on all the devices necessary for executing the linkage function by the above-described determination process, the terminal device 16 transmits the information indicating the connection request to each device necessary for executing the linkage function, and further transmits the information indicating the execution instruction of the linkage function to each device. Accordingly, each device executes the linkage function. In the example illustrated in FIG. 28, since the devices necessary for executing the linkage function are the "multifunction device" and the "projector," a touch operation is performed on the "multifunction device" and the "projector," so that their identification is completed, and at this stage, information indicating an execution instruction of the linkage function is transmitted to the "multifunction device" and the "projector", and the linkage function is executed by the "multifunction device" and the "projector."

As described above, according to the fourth exemplary embodiment, information indicating devices necessary for executing the linkage function is displayed, so that the linkage function may be executed by a simple operation such as a touch operation.

Figure 29:
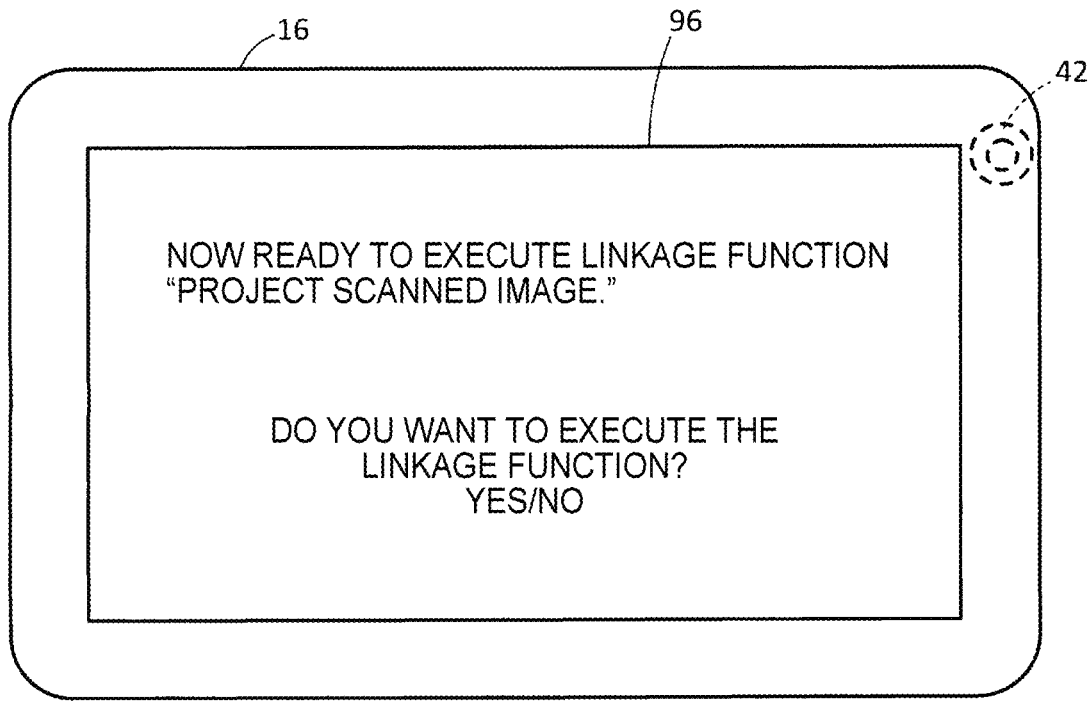
FIG. 29 is a diagram illustrating an example of a confirmation screen.

Further, when a touch operation is performed on all the devices necessary for executing the linkage function to identify all the devices, the control unit 48 of the terminal device 16 may cause the UI unit 46 to display a confirmation screen 96 as illustrated in FIG. 29. When the user gives an execution instruction of the linkage function (for example, when the user selects "YES") on the confirmation screen 96, the terminal device 16 transmits the information indicating the connection request to each device, and further transmits the information indicating the execution instruction of the linkage function to each device. Therefore, it is possible to prevent the linkage function from being automatically executed at a place not intended by the user. When the user gives a release instruction of the linkage function (for example, when the user selects "NO") on the confirmation screen 96, designation of the linkage function is released.

In addition, the time limit may be set for the touch operation. For example, when the touch operation is performed on all the devices necessary for executing the linkage function within a predetermined time limit from the time when the user selects the linkage function, the linkage function may be executed or the above-described confirmation screen may be displayed.

Further, before the touch operation is performed on all the devices necessary for executing the linkage function and all the devices are identified, the terminal device 16 may give an execution instruction of the linkage function to the device which has been identified, and cause the device to execute a preceding process. For example, when the linkage function selected by the user is a function executable using the first device and the second device in that order and when the touch operation is performed on the first device to identify the first device, the terminal device 16 causes the first device to first execute the first function that the first device has (that is, the function to be executed by the first device) among the linkage functions. Thereafter, when the touch operation is performed on the second device to identify the second device, the terminal device 16 uses the execution result of the first device and causes the second device to execute the second function that the second device has (that is, the function to be executed by the second device) among the linkage functions. In the example illustrated in FIG. 28, the "multifunction device" corresponds to the first device and the "projector" corresponds to the second device. In this case, when the touch operation is performed on the "multifunction device" to identify the "multifunction device," the terminal device 16 transmits information indicating an execution instruction of a scan process to the "multifunction device." Upon receiving the execution instruction, the "multifunction device" executes the scan process to generate image data. Next, when the touch operation is performed on the "projector" to identify the "projector," the terminal device 16 transmits information indicating an execution instruction of an image projection process to the "projector." Upon receiving the execution instruction, the "projector" receives image data from the "multifunction device" and projects an image based on the image data. The information indicating the execution instruction transmitted to the "multifunction device" includes address information of the "projector" as a transmission destination of the image data, and the "multifunction device" uses the address information and transmits the image data to the "projector." Of course, the image data may be transmitted from the "multifunction device" to the "projector" via the terminal device 16 and the server 14.

In the case where the user selects a linkage function unsuitable for the preceding process, when a touch operation is performed on all the devices necessary for executing the linkage function to identify all the devices, an execution instruction of the linkage function is given to each device from the terminal device 16. For example, in the case where the linkage function is a function of performing a stapling process on a printed matter after printing by a printer, when there is no stapler as a post-processing device, it is impossible to prepare printed matter on which the stapling process is performed, even though the printer is caused to execute the printing prior to the touch operation on the post-processing device. Thus, such a linkage function is unsuitable for a preceding process. For example, when a linkage function unsuitable for the preceding process is determined in advance and the linkage function is selected by the user, the preceding process is not executed, and when a touch operation is performed on all the devices necessary for executing the linkage function to authenticate all the devices, an execution instruction of the linkage function is given to each device from the terminal device 16.

When the touch operation is performed on a device other than the device necessary for executing the linkage function, information indicating the fact may be displayed on the UI unit 46 of the terminal device 16, or the device may be identified to store information indicating the identification result of the device in the terminal device 16.

After execution of the linkage function is completed, the information indicating the linkage function, the device identification information of each device necessary for executing the linkage function (including the address information of the device), and information indicating the identification result of each device may be stored in the terminal device 16 or the server 14 as history information. The execution instruction of the linkage function may be given using the history information. For example, when a linkage function included in the history is selected and an execution instruction is given, the terminal device 16 transmits information indicating the execution instruction of the linkage function to each device necessary for executing the linkage function. At this time, since each device has already been identified, it is unnecessary to identify the device again.

Further, by applying the related process 2 or the related process 3, a portion of a device may be identified, and information indicating a linkage function executable using the portion may be executed. For example, the function display screen 94 illustrated in FIG. 28 displays portions of the devices necessary for executing the linkage function. Further, similarly to the third exemplary embodiment, a near-field wireless module is provided in each portion of the device, and the near-field wireless module transmits portion identification information (for example, a portion ID) for identifying a portion in which the near-field wireless module is installed to a partner of the near-field wireless communication (for example, the terminal device 16). In this case, when the touch operation is performed on all the portions of the devices necessary for executing the linkage function to identify all the portions, the terminal device 16 transmits information indicating the execution instruction of the linkage function to all the devices. The portions of the devices which have received the execution instruction execute the function assigned to themselves. Further, a confirmation screen 96 may be displayed as illustrated in FIG. 29.

The execution instruction of the linkage function may be given to each device at the stage where the touch operation is performed on all the portions to recognize all the portions, or the function may be executed in a portion which has already been recognized before all the portions are recognized (preceding process). For example, when the preceding process is executed in a case where the linkage function selected by the user is a function executable using the first portion of the device and when the touch operation is performed on the first portion to identify the first portion, the terminal device 16 first causes the first portion to execute the first function that the first portion has (that is, the function to be executed by the first portion) among the linkage functions. Thereafter, when the touch operation is performed on the second portion to identify the second portion, the terminal device 16 uses the execution result of the first portion and causes the second portion to execute the second function that the second portion has (that is, the function to be executed by the second portion) among the linkage functions. The first portion and the second portion may be portions of the same device or portions of different devices.

Further, when the time limit is set and the touch operation is performed on all the portions of the devices necessary for executing the linkage function to identify all the portions, the linkage function may be executed.

The fourth exemplary embodiment may be applied to execution of a solo function. For example, the UI unit 46 of the terminal device 16 displays a list of solo functions and information indicating the devices necessary for executing the solo function for each of the solo functions. In the case where a solo function is selected by the user from the list and the touch operation is performed on the device necessary for executing the solo function to identify the device, the terminal device 16 transmits information indicating an execution instruction of the solo function to the device. Upon receiving the execution instruction, the device executes the solo function selected by the user.

Further, in the second, third, and fourth exemplary embodiments described above, the use of the device, that is, the linkage function executable using the device or use of the solo function that the device has may be prohibited depending on the positional relationship between the user (the terminal device 16) and the device. For example, a usable area for each device is defined, and information indicating the region usable for each device is stored in the server 14. The position information of the terminal device 16 is acquired by the GPS function, and the position information thereof is transmitted from the terminal device 16 to the server 14. The control unit 36 of the server 14 compares the usable area for the device to be connected with the position of the terminal device 16. Then, when the terminal device 16 exists in the area, the control unit 36 permits the use of the device. When the terminal device 16 does not exist in the area, the use of the device is not permitted (is prohibited). For example, an area within a distance which is determined in advance based on the position of the device may be defined as a usable area, or an area having any shape and size including the device or an area not including the device may be defined as a usable area. The same applies to the positional relationship between the user (terminal device 16) and a portion of the device.

The linkage function selected by the user from the linkage functions may be a function executed by a combination of the entire device and a portion of the device. In this case, when a touch operation is performed on the device and the portion to recognize them, the linkage function is executed by the device and the portion.

Fifth Exemplary Embodiment

Hereinafter, a device system according to a fifth exemplary embodiment will be described. The device system according to the fifth exemplary embodiment has the same configuration as that of the device system according to the first exemplary embodiment. In the fifth exemplary embodiment, when plural devices are identified by plural users, display of linkage functions executable using the plural devices is controlled.

Figure 30:
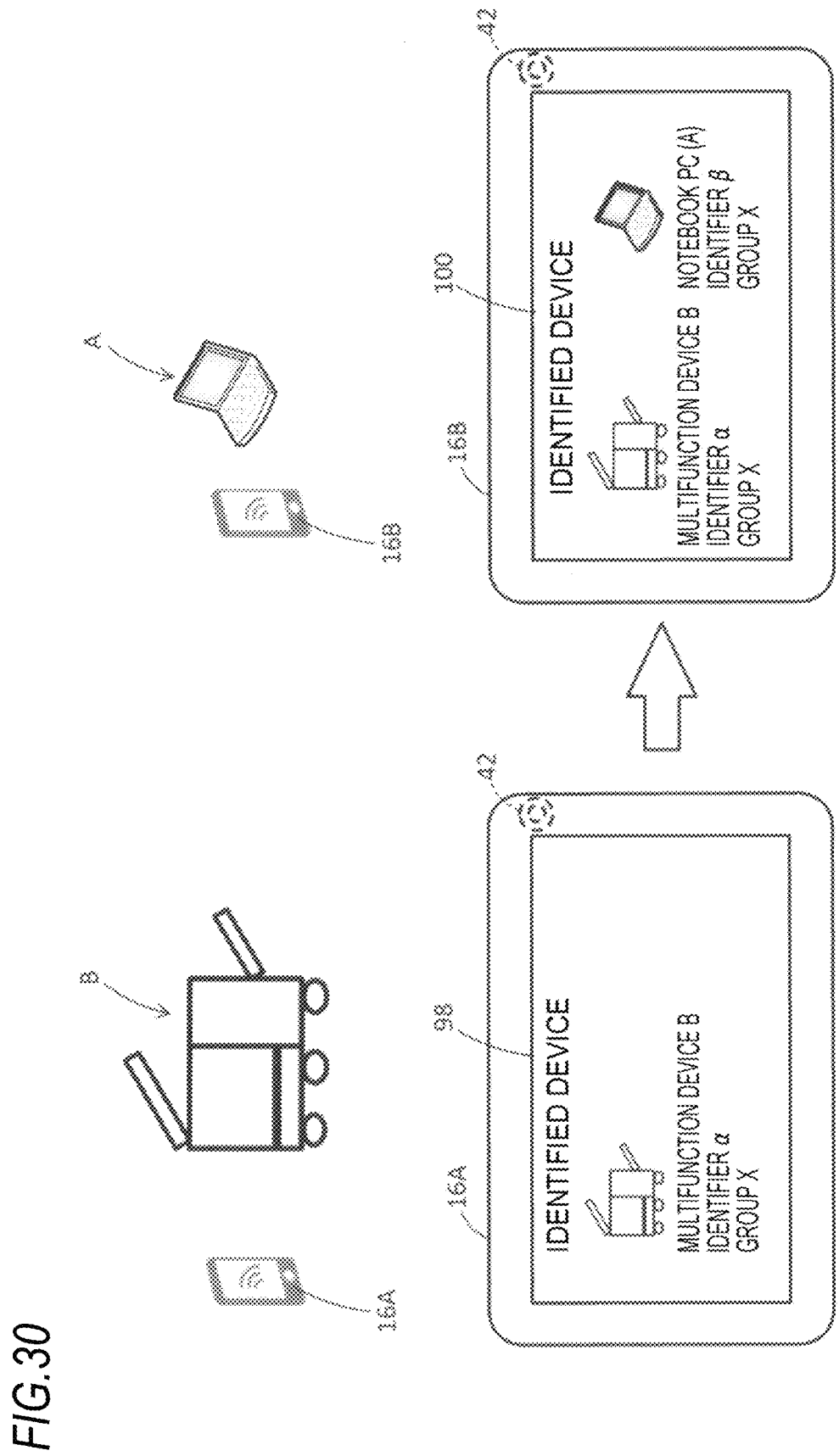
FIG. 30 is a diagram illustrating an example of devices and a device display screen.

Hereinafter, the procedure when using the devices in the fifth exemplary embodiment will be described with reference to FIG. 30. As an example, it is assumed that plural devices are identified by operations by a user α and a user β. A terminal device 16A is a device operated by the user α, and a terminal device 16B is a device operated by the user β. The terminal devices 16A and 16B have the same configuration as that of the terminal device 16.

First, the user α operates the terminal device 16A to identify a device. The device identified here is a multifunction device (B). As an identification process, the identification process in the first to fourth exemplary embodiments described above is used. For example, the device may be identified using the AR technology, or the device may be identified by a touch operation. Of course, the device may be identified by another identification technology. The identification process may be performed by the server 14 or may be performed by the terminal device 16A. Further, authentication of the user α and the terminal device 16A may be performed as in the third exemplary embodiment. When the multifunction device (B) is identified, a device display screen 98 is displayed on the UI unit 46 of the terminal device 16A. A device image associated with the identified multifunction device (B) is displayed on the device display screen 98. The device image may be an image obtained by capturing the multifunction device (B), or an image schematically representing the multifunction device (B) (for example, an icon). Further, the identification information of the user α who performed the identification operation for the multifunction device (B) (for example, the name of the user α and the user ID) or the identification information of a group to which the user α belongs (for example, the name of the group and the group ID) may be displayed on the device display screen 98 in association with the image associated with the multifunction device (B). The group will be described in detail later.

When the multifunction device (B) is identified as a device as described above, the user α transmits the identification result to the user β of the linkage partner. Specifically, the terminal device 16A transmits information indicating the identification result of the multifunction device (B) to the terminal device 16B according to the transmission instruction by the user α. The information indicating the identification result includes the device identification information of the multifunction device (B) (including the address information of the multifunction device (B)). It is assumed that each of the terminal devices 16A and 16B stores the address information of the partner.

Next, the user β operates the terminal device 16B to identify a device. The device identified here is a notebook PC (A). The device may be identified by the AR technology, the device may be identified by the touch operation, or the device may be identified by another identification technology. The identification process may be performed by the server 14 or may be performed by the terminal device 16B. Further, authentication of the user β and the terminal device 16B may be performed. When the notebook PC (A) is identified, a device display screen 100 is displayed on the UI unit 46 of the terminal device 16B. A device image associated with the multifunction device (B) identified by the operation by the user α and a device image associated with the notebook PC (A) identified by the operation by the user β are displayed on the device display screen 100. The device image associated with the notebook PC (A) may be an image obtained by capturing the notebook PC (A), or an image schematically representing the notebook PC (A) (for example, an icon). Further, the identification information of the user β who performed the identification operation for the notebook PC (A) (for example, the name of the user β and the user ID) or the identification information of a group to which the user β belongs may be displayed on the device display screen 100 in association with the image associated with the notebook PC (A).

When the notebook PC (A) is identified, information indicating the identification result may be transmitted from the terminal device 16B to the terminal device 16A. The information indicating the identification result includes the device identification information of the notebook PC (A) (including the address information of the notebook PC (A)). In this case, the device image associated with the notebook PC (A) is displayed together with the device image associated with the multifunction device (B) on the device display screen 98 displayed on the UI unit 46 of the terminal device 16A.

Further, the specifying unit 38 of the server 14 refers to the linkage function management information 34 (for example, the linkage function management table illustrated in FIG. 7) to specify a linkage function executable using the multifunction device (B) and the notebook PC (A) based on the identification result. When the identification process is performed by the terminal devices 16A and 16B, information indicating the identification result is transmitted to the server 14, and the linkage function is specified in the server 14 based on the identification result. The linkage function may be specified by the terminal device 16A or the terminal device 16B.

When the linkage function is specified in the server 14, the information indicating the linkage function is transmitted from the server 14 to the terminal devices 16A and 16B and displayed on the UI unit 46 of the terminal devices 16A and 16B. The information indicating the linkage function may be transmitted to both of the terminal devices 16A and 16B and displayed on both terminal devices, or may be transmitted to one of the terminal devices and displayed on that terminal device. For example, the information indicating the linkage function may be transmitted to and displayed on a terminal device of a predetermined user; may be transmitted to and displayed on a terminal device on which the identification process is finally performed; may be transmitted to and displayed on a terminal device on which the identification process is initially performed; may be transmitted to a terminal device used for identifying a device that outputs the final product by executing the linkage function; or may be transmitted to and displayed on a terminal device of the user authorized to instruct execution of the linkage function.

For example, when the final process of plural processes included in the linkage function is printing, the printer or the multifunction device generates a printed matter as a product. In this case, information indicating the linkage function is displayed on the terminal device of the user who performed the identification operation on the printer or the multifunction device that generates the printed matter as a product.

Further, the linkage function may be changed according to the user who finally performed the identification operation. For example, the user identification information of the user who finally performs the identification operation and the information indicating the linkage function are associated with each other, and the information indicating the association is stored in the server 14. The user identification information of a user who finally performs the identification operation is transmitted from the terminal device 16 of the user to the server 14 and the information indicating the linkage function associated with the user identification information is displayed on the terminal device 16. For example, information indicating different linkage functions may be displayed between the case where the user who finally performed the identification operation is a user who has the administrative authority and the case where the user is a user who does not have the administrative authority. Therefore, different linkage functions are displayed depending on the presence or absence of the administrative authority. Of course, when a linkage function usable for each user is defined irrespective of the presence or absence of the administrative authority, the linkage function may be changed according to the user who finally performed the identification operation.

Figure 31:
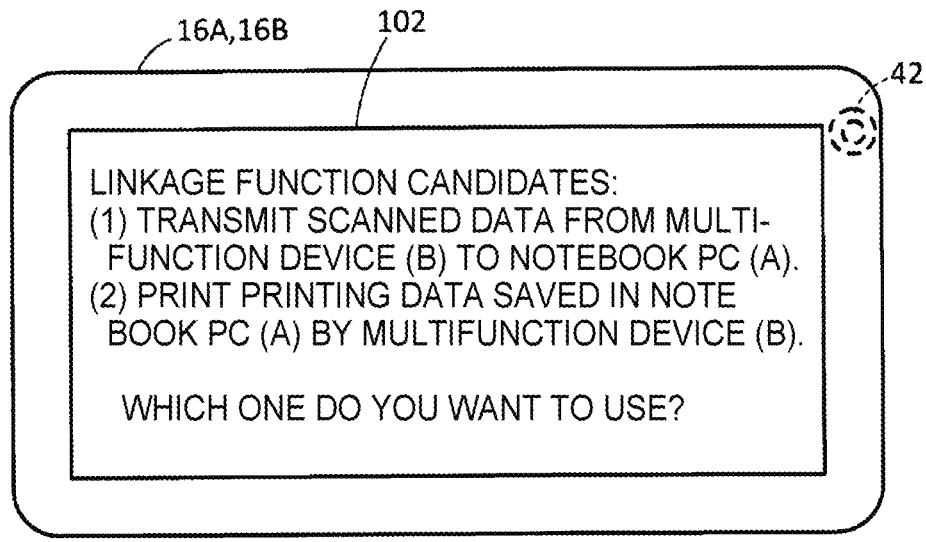
FIG. 31 is a diagram illustrating an example of a function display screen.

FIG. 31 illustrates a function display screen 102. The function display screen 102 is displayed on one or both of the terminal devices 16A and 16B. The function display screen 102 displays information indicating the linkage function specified as described above. The function display screen 102 is displayed on the UI unit 46 of the terminal device 16B which has finally performed the identification process, and then a notification indicating that the linkage function is usable is transmitted from the terminal device 16B to the terminal device 16A. Thereafter, the function display screen 102 may be displayed on the UI unit 46 of the terminal device 16A.

At least one user among plural users who performed the identification operation instructs execution of the linkage function. In the example illustrated in FIG. 30, the user α or the user β instructs the execution. The user α or the user β selects the linkage function to be executed from the list of linkage functions displayed on the function display screen 102 using the terminal device that the user α or the user β possesses, and instructs the execution. As a result, information indicating the execution instruction of the linkage function is transmitted to each device. The information indicating the execution instruction includes address information of each device (for example, address information of notebook PC (A) and multifunction device (B)). The information indicating the execution instruction may be directly sent from the terminal device instructing the execution to each device, may be sent to each device via the server 14, may be transmitted to each device via another terminal device, or may be sent from one device to another device. For example, when the user β instructs the execution using the terminal device 16B, information indicating the execution instruction is transmitted from the terminal device 16B to the notebook PC (A) and also sent to the multifunction device (B) via the terminal device 16A or the notebook PC (A). Of course, the information indicating the execution instruction may be transmitted to the notebook PC (A) and the multifunction device (B) via the server 14.

Figure 32:
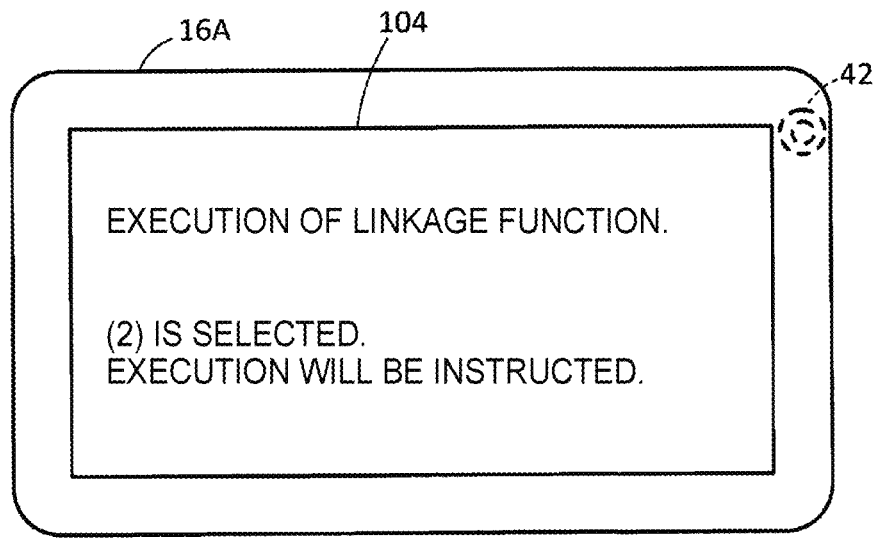
FIG. 32 is a diagram illustrating an example of a confirmation screen.

Information indicating that an execution instruction has been given is transmitted to and displayed on the terminal device 16 of the user who instructed the execution to the terminal device 16 of the user who has not instructed the execution. For example, when the user β instructs the execution using the terminal device 16B, the information indicating that the execution instruction has been given is transmitted from the terminal device 16B to the terminal device 16A and displayed on the UI unit 46 of the terminal device 16A. For example, as illustrated in FIG. 32, a confirmation screen 104 is displayed on the UI unit 46 of the terminal device 16A, and information indicating that an execution instruction has been given is displayed on the confirmation screen 104.

The linkage function may be executed when the user having the authority to instruct the execution of the linkage function instructs the execution. Alternatively, the linkage function may be executed when the instruction is given using the terminal device 16 to which the authority is given.

Plural users may instruct the execution. For example, the linkage function may be executed when all the users who performed the identification operation instruct the execution. In the example illustrated in FIG. 30, the linkage function may be executed when the user α instructs the execution using the terminal device 16A and the user β instructs the execution using the terminal device 16B. For example, in a case where it is confirmed that, when the multifunction device (B) and the notebook PC (A) communicate with each other, execution instructions are given from both the users α and β, the multifunction device (B) and the notebook PC (A) execute the linkage function.

Hereinafter, grouping will be described. The terminal device 16 and the user may be grouped. For example, the terminal devices 16 may be grouped by identification information of the terminal device 16 (for example, a MAC address, performance, compatibility, etc.), or the users may be grouped by user identification information (for example, user account information, department, gender, age, company, etc.). For example, even when plural users use the same terminal device 16, the users may be grouped according to the user account information used when logging in to the terminal device 16. Terminal devices 16 and users may be grouped in advance, or may be grouped while the device is being identified or after the identification of the device is completed. Each user and each terminal device 16 may belong to one group or may belong to plural groups. In the example illustrated in FIG. 30, both the users α and β belong to a group X.

The group may be managed by each terminal device 16 or may be managed by the server 14. For example, when users are grouped, the user identification information includes group identification information for identifying a group to which a user having the user identification information belongs. Further, when terminal devices 16 are grouped, the terminal identification information includes group identification information for identifying a group to which a terminal device 16 having the terminal identification information belongs.

In addition, group identification information indicating a group to which each user belongs and group identification information indicating a group to which each terminal device 16 belongs may be stored in each terminal device 16 or the server 14. For example, group management information, for each user, indicating the association between user identification information and group identification information indicating a group to which a user belongs, and group management information, for each terminal device, indicating association between terminal identification information and group identification information indicating a group to which a terminal device belongs may be stored in each terminal device 16 or server 14. A group to which each user and each terminal device 16 belongs is specified by referring to the group management information.

Hereinafter, a process using a group will be described. For example, in a case where plural users performing identification operations belong to a group capable of being linked to each other, when plural devices are identified by the identification operation by the plural users, the linkage function is specified and information indicating the linkage function is displayed. The linkable group is, for example, the same group. Of course, when each user belongs to a different group and groups are able to be linked to each other, these groups are linkable groups.

The specification process of each user or group to which each user or each terminal device 16 belongs may be performed by the server 14, may be performed by each terminal device 16, or may be performed by each device. When the server 14 performs the specification process, for example, group identification information indicating a group to which the user or the terminal device 16 belongs is transmitted from the terminal device 16 to the server 14 together with information indicating the identification result of the device. Based on the group identification information transmitted from each terminal device 16, the control unit 36 of the server 14 determines whether or not each user or each terminal device 16 performing the identification operation belongs to a group capable of being linked to each other. When each user or each terminal device 16 belongs to a group capable of being linked to each other, the information indicating the linkage function is transmitted from the server 14 to each terminal device 16 and displayed on the UI unit 46 of each terminal device 16. When each user or each terminal device 16 does not belong to a group capable of being linked to each other, the information indicating the fact is transmitted from the server 14 to each terminal device 16 and displayed on the UI unit 46 of each terminal device 16. In this case, the information indicating the linkage function is not displayed on the UI unit 46 of each terminal device 16.

For example, it is assumed that the user α belongs to groups X, Y, Z and the user β belongs to groups M, L, X. Since the users α and β belong to the same group X, when the identification operation is performed by the users α and β to identify plural devices, a linkage function executable using the plural devices is displayed on the UI unit 46 of the terminal devices 16A and 16B.

As described above, according to the fifth exemplary embodiment, when the identification operation is performed by plural users, information indicating the linkage function is displayed. Therefore, for example, the linkage function is executed even when plural devices necessary for executing the linkage function are installed at locations far from each other. For example, even when one of the plural devices is installed at a business office (for example, a business office in Tokyo) and another of the plural devices is installed at another business office (for example, a business office in Yokohama), the linkage function is executed by performing the identification operation at each business office. To describe with a specific example, in a case where multifunction device (B) is installed at the business office in Tokyo and notebook PC (A) is installed at the business office in Yokohama, it is possible to print the data saved in the notebook PC (A) installed at the business office in Yokohama at the multifunction device (B) installed at the business office in Tokyo.

Further, since the identification operation is performed by plural users, it is possible to enhance security concerning the linkage function compared to a case where the identification operation is performed by a single user. For example, security may be enhanced by permitting the execution of the linkage function when the identification operation is performed by plural users, and prohibiting the execution of the linkage function at all or restricting some functions when the identification operation is performed by a single user. The necessity of the identification operation by plural users may be determined depending on the type of the linkage function, the device to be used, the level of the confidentiality of the data to be handled, and the like. For example, in a case where the confidentiality of the linkage function, the device, or data is relatively high, identification operation by plural users is required, and the linkage function is able to be executed when the identification operation is performed. Meanwhile, in a case where the confidentiality of the linkage function, the device, or data is relatively low, the linkage function is able to be executed when the identification operation is performed by one or plural users.

The device that has been identified once may be usable for the linkage function without performing the identification operation again within the group to which the user or the terminal device 16 which performed the identification operation belong. That is, when at least one user among plural users belonging to the same group performs an identification operation to identify a device, another user may use the device without identifying the device again and execute the linkage function. For example, the identified device is managed for each group, and the management information for the management is stored in the server 14. In the management information, for example, the group identification information and the device identification information indicating the identified device are associated with each other for each group. The identified device is specified for each group by referring to the management information. Further, when a predetermined time has elapsed from the time when the device is identified, the device may be made unusable for the linkage function, and when the device is identified again, the device may be made usable for the linkage function.

Further, the second exemplary embodiment and the fifth exemplary embodiment may be combined. In this case, when each of plural users performs an authentication operation (that is, a use permission request) so that each user and each terminal device 16 are authenticated and use of each device is permitted, information indicating a linkage function executable using plural devices permitted to be used is displayed. The same applies to the case of using a portion of the device, and when each user and each terminal device 16 are authenticated and use of each portion of the device is permitted, information indicating a linkage function executable using plural portions permitted to be used is displayed.

Further, the third exemplary embodiment and the fifth exemplary embodiment may be combined. In this case, when each of plural users performs a touch operation (that is, a use permission request) so that each user and each terminal device 16 are touched and authenticated and use of each device is permitted, information indicating a linkage function executable using plural devices is displayed. The same applies to the case of using a portion of the device, and when each user and each terminal device 16 are touched and authenticated and use of each portion of the device is permitted, information indicating a linkage function executable using plural portions is displayed.

Further, the fourth exemplary embodiment and the fifth exemplary embodiment may be combined. In this case, when plural devices necessary for executing a linkage function are identified by the touch operation by each of plural users, the linkage function is executed. For example, information indicating the devices necessary for executing the linkage function is displayed on the terminal devices 16A and 16B. In a case where the devices necessary for executing the linkage function are the multifunction device (B) and the notebook PC (A), the multifunction device (B) is identified by the touch operation by the user α, and the notebook PC (A) is identified by the touch operation by the user β, the linkage function is executed. The same applies to a case of using a portion of the device, and when plural portions of devices necessary for executing a linkage function are identified by the touch operation by each of plural users, the linkage function is executed.

By applying the related process 1 described above, display of information on linkage functions may be switched according to the order of identification of each device. For example, information indicating different linkage functions may be displayed between a case where the multifunction device (B) is first identified by the identification operation by the user α and the notebook PC (A) is later identified by the identification operation by the user β, and a case where the notebook PC (A) is first identified by the identification operation by the user β and the multifunction device (B) is later identified by the identification operation by the user α.

Further, when applying the related process 2 or the related process 3, a portion of a device may be identified, and information indicating a linkage function executable using the portion may be displayed. For example, when a portion (for example, a main body portion) of the multifunction device (B) is identified by the identification operation by the user α and a portion (for example, a display portion) of the notebook PC (A) is identified by the identification operation by the user β, information indicating a linkage function executable using the main body portion of the multifunction device (B) and the display portion of the notebook PC (A) is displayed.

Further, when one of the plural devices is identified and a portion of the other device is identified, the information indicating the linkage function executable using the one device and the portion of the other device may be displayed. For example, when a portion (for example, a main body portion) of the multifunction device (B) is identified by the identification operation by the user α and the notebook PC (A) is identified by the identification operation by the user β, information indicating a linkage function executable using the main body portion of the multifunction device (B) and the notebook PC (A) is displayed.

The process according to the fifth exemplary embodiment may be applied to a function implemented by software. That is, the linkage function may be a function executed by linking plural pieces of software to each other. In this case, information indicating the linkage function is displayed when plural users are authenticated by performing an authentication operation. For example, a case where software A installed in the terminal device 16A and software B installed in the terminal device 16B are linked to each other will be described. When the user α performs the authentication operation on the software A in the terminal device 16A to thereby authenticate the user α and the user β performs the authentication operation on the software B in the terminal device 16B to thereby authenticate the user β, information indicating a linkage function executable using the software A and the software B is displayed on at least one of the terminal device 16A and the terminal device 16B. The user may be authenticated in advance with respect to the software or the authentication operation may be performed when the software is activated. In the authentication operation, for example, the user is authenticated by inputting authentication information such as a user ID and a password. The specifying unit 38 of the server 14 receives information indicating that the authentication succeeds and information indicating the software from each terminal device, and specifies a linkage function executable using the plural pieces of software successfully authenticated. Information indicating the linkage function is displayed on the terminal device.

For example, it is assumed that software A is document creation software (application) and software B is spreadsheet software (application). In this case, information indicating the linkage function executable using the document creation software and spreadsheet software is displayed. For example, a linkage function of inserting a document created using the document creation software into a table created by the spreadsheet software, or linkage function of inserting a table created by the spreadsheet software into a document created using the document creation software is the linkage function executable using plural pieces of software. As another example, when presentation software and the document creation software are combined, a document created by the document creation software may be pasted to data created by the presentation application software.

In the above example, plural pieces of software installed in two or more terminal devices are used, but the linkage function may be a function executable using plural pieces of software installed in one terminal device. For example, when the user α performs the authentication operation on the software A installed in a terminal device 16 to thereby authenticate the user α and the user β performs the authentication operation on the software B installed in the same terminal device 16 to thereby authenticate the user β, information indicating a linkage function executable using the software A and the software B may be displayed on the terminal device 16. As described above, the plural pieces of software used for the linkage function may be software installed in one terminal device 16, or it may be software installed in plural terminal devices 16.

Further, when the user having the administrative authority is authenticated, the information indicating the linkage function may be displayed. For example, among the plural users who perform the authentication operation, when a user who finally performed the authentication operation has the administrative authority, the information indicating the linkage function may be displayed on the terminal device 16, and when a user who finally performed the authentication operation does not have the administrative authority, the information indicating the linkage function may not be displayed. Of course, when at least one user among the plural users performing the authentication operation has the administrative authority, the information indicating the linkage function may be displayed on the terminal device 16. Alternatively, when users not less than a predetermined ratio have the management authority, the information indicating the linkage function may be displayed on the terminal device 16, or when all the users have the management authority, the information indicating the linkage function may be displayed on the terminal device 16.

Further, similarly to the case of implementing the linkage function using the above-described devices, the technology related to the group, the related process 1 and the like may also be applied to the case of using the software. For example, in the case where plural users performing authentication operations belong to a linkable group (for example, the same group), the information indicating the linkage function may be displayed when the use of the plural pieces of software used for the linkage function is authenticated through the authentication operation by the plural users. Further, in the case where plural pieces of software subjected to the authentication operation belong to a linkable group (for example, the same group), the information indicating the linkage function may be displayed when the use of the plural pieces of software is authenticated. Further, as the related process 1 is applied, the linkage function may be changed according to the order of authentication for the plural pieces of software. In addition, the linkage function may be changed according to the user who finally performed the authentication operation, or the information indicating the linkage function may be displayed on the terminal device of the user who performed the authentication operation for the software that outputs a product.

Further, the process according to the fifth exemplary embodiment may be applied to a linkage function that may be executed by combining a device as hardware and a function implemented by software. For example, when a device is identified or the first user is authenticated for the device by the identification operation or the authentication operation by the first user, and the second user is authenticated for software through the authentication operation by the second user, information indicating a linkage function executable using the device and the software may be displayed on the terminal device.

Further, when the identified first software (for example, software A) is designated by the first user (for example, user α) and the identified second software (for example, software B) is designated by the second user (for example, user β), information indicating a linkage function executable using the first software and the second software may be displayed on the terminal device. For example, in a case where the software cannot be executed by the terminal device on which the software is installed, the software may not be identified by the terminal device, and an image (for example, an icon) associated with the software is not displayed on the terminal device, or even though the image is displayed, the software may not be executed by the terminal device, or an extension (information indicating the type of the file etc.) associated with data (electronic file) created by the software may not be displayed. Such software is not used for the linkage function. Meanwhile, when the software can be executed by the terminal device on which the software is installed, the software may be identified by the terminal device, and an image (for example, an icon) associated with the software is displayed on the terminal device, or as the image is displayed, the software is executed by the terminal device, or an extension associated with data created by the software may be displayed. Such software is usable for the linkage function. For example, When the software A identified by the terminal device 16A is designated by the user α and the software B identified by the terminal device 16B is designated by the user β, the information indicating the linkage function executable using the software A and the software B is displayed on the terminal device. When the software A and B are installed in the same terminal device (for example, one of the terminal devices 16A and 16B) and are identified by the same terminal device, and the software A and B are designated by one user (for example, one of users α and β), the information indicating the linkage function executable using the software A and the software B may be displayed on the terminal device. Even in this case, when plural users (for example, users α and β) designate the software A and B, the information indicating the linkage function may be displayed.

As another example, when first software (for example, software A) is identified by an identification operation by a first user (for example, user α) and second software (for example, software B) is identified by an identification operation by a second user (for example, user β), information indicating a linkage function executable using the first software and the second software may be displayed on the terminal device. The identification operation is, for example, a task of installing software in the terminal device. As another example, when software is installed in a terminal device and a user gives an instruction of identification of the software as an identification operation, an identification process is executed, and when the software is executable in the terminal device, the software may be identified by the terminal device. When plural pieces of software are identified, information indicating a linkage function executable using the plural pieces of software is displayed on the terminal device.

Each of the image forming device 10, the server 14 and the terminal device 16 is implemented by, for example, cooperation of hardware and software. Specifically, each of the image forming device 10, the server 14, and the terminal device 16 includes one or plural processors such as CPUs (not illustrated). As the one or plural processors read and execute a program stored in the storage device (not illustrated), the functions of each portion of the image forming device 10, the server 14, and the terminal device 16 are implemented. The program is stored in a storage device via a recording medium such as a CD or a DVD, or via a communication path such as a network. As another example, each unit of the image forming device 10, the server 14, and the terminal device 16 may be implemented by hardware resources such as a processor, an electronic circuit, an application specific integrated circuit (ASIC), or the like. A device such as a memory may be used in the implementation. As still another example, each unit of the image forming device 10, the server 14, and the terminal device 16 may be implemented by a digital signal processor (DSP), a Field programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A terminal device comprising:
a processor, configured to:
in response to a first device being identified by an identification operation by a user of the terminal device, control display of a linkage function comprising the first device executing a first function of the first device and a second device executing a second function of the second device identified by an identification operation by another user of another terminal device prior to the identification operation by the user of the terminal device to identify the first device, wherein the second device is different from the first device,
wherein the identification operation of the first device comprises directing the terminal device towards the first device and the identification operation of the second device comprises directing the another terminal device towards the second device.

2. The terminal device according to claim 1,
wherein the user and the another user are registered in one or more user groups,
wherein the processor is further configured to:
display the linkage function in a case where the user who is performing the identification operation of the first device and the another user who has performed the identification operation of the second device belong to a same user group; and
not display the linkage function in a case where the user who is performing the identification operation of the first device and the another user who has performed the identification operation of the second device do not belong to the same user group.

3. The terminal device according to claim 1, wherein when the first device and the second device belong to a linkable group and the first device and the second device are identified, the processor controls the display of the linkage function.

4. The terminal device according to claim 1, wherein the processor changes the linkage function according to an order of identification of the first device and the second device.

5. The terminal device according to claim 1, wherein when a portion of the first device and a portion of the second device are identified, the processor controls the display of the linkage function executable using the portions.

6. The terminal device according to claim 1, wherein, when a portion of one of the first device and the second device is identified and the other device is identified, the processor controls the display of the linkage function executable using the portion of the one device and the other device.

7. The terminal device according to claim 1, wherein the processor changes the linkage function according to a user who last performed the identification operation among the user and the another user.

8. The terminal device according to claim 1, wherein the processor causes a terminal device of a user who performs the identification operation on a device that outputs a product generated by executing the linkage function among the first device and the second device, to display information on the linkage function.

9. The terminal device according to claim 1, wherein the identification operation of the first device comprises capturing the first device using a camera of the terminal device and the identification operation of the second device comprises capturing the second device using a camera of the another terminal device.

10. The terminal device according to claim 1,
wherein the linkage function is automatically generated and displayed as a suggestion.

11. The terminal device of claim 10, wherein the processor is further configured to:
control display of a user interface element for receiving a response to the suggestion from the user.

12. The terminal device according to claim 11, wherein the processor is configured to:
control display of a user interface element for receiving an agreement or a rejection to the suggestion from the user.

13. The terminal device according to claim 10, wherein the processor is further configured to:
prompt the user to respond whether to execute the linkage function.

14. The terminal device according to claim 1,
wherein the linkage function is specified in accordance with a combination of the first device identified by the identification operation by the user and the second device identified by the identification operation by the another user.

15. A non-transitory computer readable medium storing a program causing a computer to execute information processing, the information processing comprising:
in response to a first device being identified by an identification operation by a first user of a first terminal device, controlling display of a linkage function comprising the first device executing a first function of the first device and a second device executing a second function of the second device identified by an identification operation by another user of another terminal device prior to the identification operation by the user of the terminal device to identify the first device, wherein the second device is different from the first device,
wherein the identification operation of the first device comprises directing the first terminal device towards the first device and the identification operation of the second device comprises directing the second terminal device towards the second device.

16. A system comprising:
one or more processors, configured to:
in response to a first device being identified by an identification operation by a user of a first terminal device, automatically specify a linkage function comprising the first device executing a first function of the first device and a second device executing a second function of the second device identified by an identification operation by another user of another terminal device prior to the identification operation by the user of the terminal device to identify the first device, wherein the second device is different from the first device; and
perform display control of the linkage function comprising the first device executing the first function and the second device executing the second function, wherein the identification operation of the first device comprises directing the terminal device towards the first device and the identification operation of the second device comprises directing the another terminal device towards the second device.

17. The system according to claim 16, wherein the one or more processors are further configured to:
perform control so that the linkage function is executed by the first function and the second device executing the second function.

18. An information processing method comprising:
in response to a first device being identified by an identification operation by a first user of a first terminal device, automatically specifying a linkage function executable by the first device executing a first function of the first device and a second device executing a second function of the second device identified by an identification operation by a second user of a second terminal device prior to the identification operation of the first device, wherein the second device is different from the first device; and
in response to the linkage function being specified, performing display control of the linkage function comprising the first device executing the first function and the second device executing the second function,
wherein the identification operation of the first device comprises directing the terminal device towards the first device and the identification operation of the second device comprises directing the another terminal device towards the second device.

19. The method of claim 18, further comprising:
in response to receipt of a user operation on the displayed linkage function, performing control so that the linkage function is executed by the first device executing the first function and the second device executing the second function.

20. The method of claim 18, further comprising:
wherein the linkage function executable by the first device executing the first function and the second device executing the second function is automatically specified based on pre-stored information indicating a combination of the first function and the second function.

21. The method of claim 20,
wherein the pre-stored information indicates an order of execution of the first function and the second function.

* * * * *